(12) United States Patent
Wakizaka et al.

(10) Patent No.: US 8,322,869 B2
(45) Date of Patent: Dec. 4, 2012

(54) OPTICAL FILM, POLARIZING PLATE, AND IMAGE DISPLAY APPARATUS

(75) Inventors: Daiki Wakizaka, Minami-Ashigara (JP); Takato Suzuki, Minami-Ashigara (JP)

(73) Assignee: FUJIFILM Corporation, Tokyo (JP)

( * ) Notice: Subject to any disclaimer, the term of this patent is extended or adjusted under 35 U.S.C. 154(b) by 931 days.

(21) Appl. No.: 12/239,372

(22) Filed: Sep. 26, 2008

(65) Prior Publication Data

US 2009/0091835 A1    Apr. 9, 2009

(30) Foreign Application Priority Data

Sep. 28, 2007 (JP) .................. P2007-256686
Dec. 27, 2007 (JP) .................. P2007-337818

(51) Int. Cl.
*G02B 27/00* (2006.01)
(52) U.S. Cl. ................... 359/601; 359/599
(58) Field of Classification Search .............. None
See application file for complete search history.

(56) References Cited

U.S. PATENT DOCUMENTS

| | | |
|---|---|---|
| 2005/0063062 A1 | 3/2005 | Ito |
| 2007/0121211 A1* | 5/2007 | Watanabe et al. ........... 359/601 |
| 2007/0177271 A1 | 8/2007 | Matsunaga |
| 2007/0195431 A1 | 8/2007 | Asakura |
| 2007/0229804 A1* | 10/2007 | Inoue et al. ........... 356/213 |
| 2007/0291367 A1* | 12/2007 | Hamamoto et al. .......... 359/601 |
| 2009/0021834 A1 | 1/2009 | Iwata et al. |
| 2009/0080081 A1* | 3/2009 | Inoeu et al. ........... 359/601 |

FOREIGN PATENT DOCUMENTS

| | | |
|---|---|---|
| EP | 2 161 596 | 3/2010 |
| JP | 2006-145587 A | 6/2006 |
| JP | 2006-145737 A | 6/2006 |
| JP | 2006-146027 A | 6/2006 |
| WO | WO 2006/088204 A1 | 8/2006 |
| WO | WO 2006088202 A1 * | 8/2006 |

OTHER PUBLICATIONS

Extended European Search Report for European Appln. No. 08017048.3 dated May 21, 2010 (7 pages).
Office Action dated Aug. 28, 2012 issued in Japanese Application No. 2008-244680 (4 pages) with partial English translation of the reasons for rejection (4 pages).

* cited by examiner

*Primary Examiner* — Alessandro Amari
(74) *Attorney, Agent, or Firm* — Birch, Stewart, Kolasch & Birch, LLP

(57) ABSTRACT

An optical film includes, in the following order, a support; an antiglare layer having an uneven surface; a high refractive index layer; and a low refractive index layer, wherein an arithmetic average roughness (Ra) of the optical film is: 0.03 µm<Ra<0.4 µm, an average distance of unevenness (Sm) of the optical film is: 80 µm<Sm<700 µm, a region of 0°<θ<0.5° (θ(0.5)) of the optical film, where θ is a tilting angle of the unevenness, accounts for 40% or more, and an integral reflectance of the optical film is 1.5% or less.

16 Claims, 2 Drawing Sheets

OPTICAL FILM, POLARIZING PLATE, AND IMAGE DISPLAY APPARATUS

BACKGROUND OF THE INVENTION

1. Field of the Invention

The present invention relates to an optical film, a polarizing plate using the optical film, and an image display apparatus using the optical film or the polarizing plate.

2. Description of the Related Art

An optical film, particularly, an antireflection film is generally positioned on the outermost surface of a display in order to prevent contrast reduction due to reflection of external light or reflection of images in an image display device such as a cathode ray tube display device (CRT), a plasma display (PDP), an electroluminescence display (ELD), or a liquid crystal display apparatus (LCD). For this reason, the antireflection film is required to have, other than high antireflection performance, high transmittance, high physical strengths (such as scratch resistance), chemical resistance, weather resistances (such as wet heat resistance and light resistance).

Such an antireflection film often employs the following: a low refractive index layer which is a thin film layer with a layer thickness of 200 nm or less is provided at least on the outermost surface, so that antireflection is effected by optical interference of the low refractive index layer. However, for one layer thin film interference type in which antireflection is effected with one layer of the low refractive index layer of the simplest structure, there is no practical low refractive index material satisfying a reflectance of 0.5% or less, and having a neutral tint, high scratch resistance, chemical resistance, and weather resistances. In contrast, there is known a multilayer thin film interference type antireflection film for preventing reflection by multilayer optical interference, such as a two layer thin film interference type in which a high refractive index layer is formed between a transparent support and a low refractive index layer, or a three layer thin film interference type in which an intermediate refractive index layer and a high refractive index layer are successively formed between a transparent support and a low refractive index layer. Particularly, for preventing reflection in a wide wavelength range, and implementing low reflectance while suppressing reflected color, the three layer thin film interference type is desirable.

As the thin film layers (such as a high refractive index layer, an intermediate refractive index layer, and a low refractive index layer) for use in the multilayer thin film interference type antireflection film, multilayer films including transparent thin film layers of metal oxides in a lamination have been widely used in the related art. In general, the transparent thin films of metal oxides are formed by a chemical vapor deposition (CVD) method or a physical vapor deposition (PVD) method, particularly, a vacuum deposition method which is one kind of the physical vapor deposition methods, or a sputtering method.

However, the method for forming transparent thin films of metal oxides by vapor deposition or sputtering is low in productivity, and is not suitable for mass production. Thus, there is proposed a method of formation by a wet deposition method high in productivity, particularly a coating method.

Alternatively, there is also commonly employed the following: an antiglare layer having an uneven shape is formed in order to prevent the reduction of the visibility due to reflection of external light, or reflection of a fluorescent lamp or the like. The formation of the antiglare layer having an uneven shape is generally accomplished in the following manner. On the surface of a transparent base material, a resin containing inorganic oxide fine particles of silica or the like, or organic resin beads is coated for formation. However, while the formation of the antiglare layer can prevent reflection with ease, the following phenomenon occurs: the screen looks whitish due to surface scattering of external light, and tightness of black is degraded. Under such circumstances, the following is carried out: one layer of a thin film interference layer is provided on the antiglare layer, thereby to implement both prevention of reflection and tightness of black.

In order to further improve the reflection and the tightness of black, it is preferable to form two or three thin film interference type antireflection layers on the antiglare layer. However, when a thin film on a nanometer scale is tried to be coated on the uneven surface of the antiglare layer by the foregoing coating method good in productivity, nonuniform coating or cissing occurs due to the unevenness. In some cases, this results in nonuniform film thickness, so that optimal light interference does not occur as designed, and thereby the reflectively is not reduced. For this reason, it is difficult to implement both the low reflection and the antiglare property.

In order to improve such nonuniform coating and cissing, the following means are tried: after surface treating the antiglare layer surface, an aging treatment is carried out (JP-A-2006-145737); and an intermediate layer is provided between an antiglare layer and an antireflection layer (JP-A-2006-145587). Alternatively, the following means is tried: hollow spherical silica fine particles in a low refractive index layer are arranged so as to be present in a larger amount at the concave parts than at the convex parts (JP-A-2006-146027).

However, the optical films proposed in the related art are not enough for reducing the reflectance.

SUMMARY OF THE INVENTION

It is an aspect of the present invention to provide an optical film which has at least two layers of thin film interference layers on an antiglare layer, and undergoes less reflection of external light, is excellent in tightness of black, and is excellent in film thickness uniformity, and has a very low reflectance. It is another aspect of the invention to provide a polarizing plate and an image display apparatus using the optical film.

The present inventors conducted a close study in order to solve the foregoing problems. As a result, they found that the problems can be solved and the objects can be achieved by implementing the following configurations, leading to the completion of the present invention. Namely, the present invention achieves the aspects with the following configurations.

[1] An optical film comprising, in the following order:

a support;

an antiglare layer having an uneven surface;

a high refractive index layer; and a low refractive index layer, wherein an arithmetic average roughness (Ra) of the optical film is: 0.03 μm<Ra<0.4 μm, an average distance of unevenness (Sm) of the optical film is: 80 μm<Sm<700 μm, a region of 0°<θ<0.5° (θ (0.5)) of the optical film where θ is a tilting angle of the unevenness, accounts for 40% or more, and an integral reflectance of the optical film is 1.5% or less.

[2] The optical film of [1], wherein
the antiglare layer contains at least one kind of light transmissive particles having an average particle diameter larger than an average film thickness of the antiglare layer by 0.01 to 4.0 μm.

[3] The optical film of [2], wherein
an amount of the light transmissive particles to be added is 0.01 to 1 mass % based on a total solid content of the antiglare layer.

[4] The optical film of [2], wherein
the number per unit area in the antiglare layer of the light transmissive particles having a larger average particle diameter than the average film thickness of the antiglare layer is 10 to 1500 particles/mm$^2$.

[5] The optical film of [2], wherein
the antiglare layer contains second light transmissive particles having a smaller average particle diameter than the average film thickness of the antiglare layer.

[6] The optical film of [1], wherein
the antiglare layer contains at least one kind of fine particles, and
the fine particles are cohesive metal oxide fine particles.

[7] The optical film of [6], wherein
an amount of the metal oxide fine particles to be added is 0.01 to 5 mass % based on a total solid content of the antiglare layer.

[8] The optical film of [6], wherein
the antiglare layer contains second light transmissive particles having a smaller average particle diameter than an average film thickness of the antiglare layer.

[9] The optical film of [1], wherein
the high refractive index layer contains fine particles of an oxide of at least one metal selected from Si, Al, Ti, Zr, Sb, Zn, Sn, and In.

[10] The optical film of [9], wherein
the fine particles of the oxide of at least one metal are contained in an amount of 30 mass % or more based on a total solid content of the high refractive index layer.

[11] The optical fin of [1], wherein
the high refractive index layer comprises a fluorine type or silicone type levelling agent.

[12] The optical film of [1], further comprising:
an intermediate refractive index layer having a refractive index higher than that of the antiglare layer and lower than that of the high refractive index layer, provided between the antiglare layer and the high refractive index layer.

[13] The optical film of [12], wherein
the intermediate refractive index layer contains fine particles of an oxide of at least one metal selected from Si, Al, Ti, Zr, Sb, Zn, Sn, and In.

[14] The optical film of [13] wherein
the fine particles of the oxide of at least one metal are contained in an amount of 30 mass % or more based on a total solid content of the intermediate refiactive index layer.

[15] The optical film of [12], wherein
the intermediate refractive index layer comprises a fluorine type or silicone type levelling agent.

[16] A polarizing plate comprising:
a polarizing film; and
a pair of protective films provided on the both sides of the polarizing film,
wherein
at least one of the pair of the protective films is the optical film of [1].

[17] An image display apparatus comprising:
the optical film of [1] on an outermost surface of the display.

[18] An image display apparatus comprising:
the polarizing plate of [16] on an outermost surface of the display.

DETAILED DESCRIPTION OF THE INVENTION

Figure 1A:
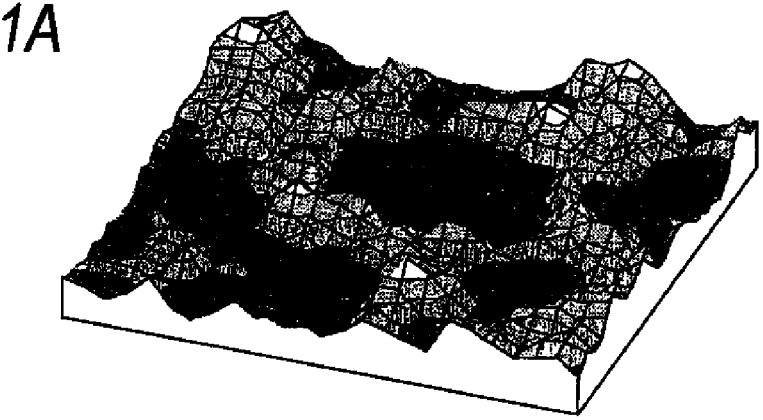
FIGS. 1A to 1C are respectively schematic views each for illustrating the outline of the measurement method of the tilting angle.

Below, an optical film of the present invention will be described in details.

The optical film of the invention is an optical film including at least an antiglare film having an uneven surface, a high reflective index layer, and a low refractive index layer stacked in this order, characterized in that the arithmetic average roughness (Ra) of the optical film, the average distance of the unevenness (Sm), the tilting angle θ of the unevenness, and the integral reflectance of the optical film respectively fall in within their corresponding specific ranges.

<Antiglare Layer>

The antiglare layer which the film of the invention has is formed for the purpose of imparting the antiglare property due to the surface scattering, and preferably the hard coat property for improving the scratch resistance of the film, to the film.

As the methods for imparting the antiglare property, there are known the method in which a mat-like shape film having fine unevenness on the surface is laminated for the formation as described in JP-A-6-16851; the method in which the formation is achieved by curing and shrinkage of a ionizing radiation curable resin due to the difference in ionizing radiation dose as described in JP-A-2000-206317; the method in which the weight ratio of the good solvent to the light transmissive resin is reduced by drying, and thereby, the light transmissive fine particles and the light transmissive resin are solidified while causing gelation thereof to form unevenness on the coating film surface as described in JP-A-2000-338310; the method in which surface unevenness is given by external pressure as described in JP-A-2000-275404; the method in which surface unevenness is formed by utilizing occurrence of phase separation in the process during which a solvent evaporates from a mixed solution of a plurality of polymers as described in JP-A-2005-195819; and other methods. These known methods can be utilized in order to form the antiglare layer in the film of the invention.

The antiglare layer usable in the invention preferably includes a binder capable of imparting the hard coat property, and light transmissive particles for imparting the antiglare property. It is preferably a layer having unevenness formed on the surface by projections of the light transmissive particles themselves or the projections formed by the aggregates of a plurality of particles.

Further, the antiglare layer is preferably formed by using a paint for forming the antiglare layer containing a binder forming material, light transmissive particles, and a solvent.

Then, the antiglare layer formed by using the paint for forming the antiglare layer includes a binder and light transmissive particles dispersed in the binder. It preferably has both the antiglare property and the hard coat property.

(Light Transmissive Particles)

As one of preferred forms of the invention, it is preferable in terms of imparting the antiglare property that the antiglare layer contains therein at least one kind of the light transmissive particles for imparting the antiglare property thereto, and that the average particle diameter of the light transmissive particles is larger than the average film thickness of the antiglare layer by 0.01 to 4.0 µm. In order to implement both the antiglare property and the uniform lamination of thin film interference layers by an increase in proportion of the flat part of the film surface, the average particle diameter is further preferably 0.1 to 3.0 µm larger, and most preferably 0.5 to 2.5 µm larger. Whereas, when the average particle diameter of the light transmissive particles is 4 µm or less, it is preferably 0.1 to 2.5 µm larger, and most preferably 0.1 to 2.0 µm larger.

The average film thickness of the antiglare layer is determined in the following manner. The cross section of the optical film is observed under an electron microscope, and the film thicknesses are measured at 30 sites randomly, and from the average value thereof, the average film thickness is calculated.

It is preferable that one projection of the antiglare layer is formed of substantially five or less light transmissive particles. It is more preferable that the projection is formed of substantially one light transmissive particle. Herein, the term "substantially" means that 90% or more of the projections defined as described above satisfy the preferred form.

As for the kind of the light transmissive particles, there are preferably used the ones satisfying the foregoing particle diameter and the value of the internal haze of the antiglare layer described later. However, it is more preferable that the projection is formed of substantially one light transmissive particle. Therefore, it is preferable that particles having good dispersibility are selected.

As the particles having good dispersibility, light transmissive organic resin particles such as polymethyl methacrylate particles and particles of a copolymer of polymethyl methacrylate and polystyrene are preferable. The polymethyl methacrylate ratio in the copolymer particles is preferably 40 mass % to 100 mass %, from the viewpoint of the dispersibility, further preferably 50 mass % to 100 mass %, and most preferably 75 mass % to 100 mass %.

When the light transmissive particles are used, for the dispersion stability and precipitation prevention of the particles in a binder or in a coating solution, an inorganic filler with such a size as not to cause visible light scattering such as silica, or a dispersant such as an organic compound (which may be a monomer or a polymer) may be added.

Incidentally, when an inorganic filler is added, a larger amount of the inorganic filler to be added is more effective for preventing the light transmissive particles from precipitating. However, the inorganic filler is preferably used in such a range as not to adversely affect the transparency of the coating film. Therefore, preferably, an inorganic filler with a particle diameter of 0.5 µm or less may be allowed to be contained therein in an amount of less than about 0.1 part by mass per 100 parts by mass of the binder in such a degree as not to impair the transparency of the coating film. A dispersant such as an organic compound is preferably added in an amount of 0.1 to 20 parts by mass per 100 parts by mass of the light transmissive particles. It is added in an amount of further preferably 0.1 to 15 parts by mass, and in particular preferably 0.5 to 10 parts by mass. When the amount is 0.1 part by mass or more, the addition effect on the dispersion stability becomes evident. When the amount is 20 parts by mass or less, the components not contributing to the dispersion stability increases in amount. Thus, problems such as bleed-out preferably do not occur.

As described above, for the dispersion stability and precipitation prevention in the binder or in the paint for forming the antiglare layer, the surface of each light transmissive particle may be surface treated. The kind of a surface treatment agent is appropriately selected according to the binder and the solvent to be used. The surface treatment agent is preferably added in an amount of 0.1 to 30 parts by mass per 100 parts by mass of the light transmissive particles. It is added in an amount of further preferably 1 to 25 parts by mass, and in particular preferably 3 to 20 parts by mass. When the amount is 0.1 part by mass or more, the amount of surface treatment with respect to the dispersion stability will not be insufficient. When the amount is 30 parts by mass or less, the components not contributing to the dispersion stability increases in amount. Thus, problems such as bleed-out preferably do not occur.

In the invention, for the particle diameter distribution of the light transmissive particles to be used, monodispersible particles, namely, particles with a uniform particle diameter are preferred from the viewpoints of control of the haze value and the diffusibility, and the homogeneity of the coated surface conditions. The CV value indicative of the uniformity of the particle diameter is preferably 0 to 10%, more preferably 0 to 8%, and further preferably 0 to 5%. Further, when particles with a particle diameter larger than the average particle diameter by 20% or more are defined as coarse particles, the proportion of the coarse particles is preferably 1% or less, more preferably 0.1% or less, and further preferably 0.01% or less, of the total number of particles. It is also an important means to classify the light transmissive particles having such a particle diameter distribution after preparation or synthesis reaction. By increasing the fiequency of classification, or enhancing the degree, it is possible to obtain particles having a desirable distribution. For the classification, methods such as an air force classification method, a centrifugal classification method, a precipitation classification method, a filtration classification method, and an electrostatic classification method are preferably used. The average particle diameter of the light transmissive particles is obtained by observing the light transmissive particles under an optical microscope, and performing calculation from the average value of the diameters of 100 particles observed.

It is preferable from the viewpoint of reducing the density of the unevenness, increasing the proportion of the flat parts of the film surface, and uniformly stacking a thin film interference layer that the amount of the light transmissive particles having a larger average particle diameter than the average film thickness of the antiglare layer added is 0.01 to 1 mass % based on the total solid content. The amount is more preferably 0.1 to 1 mass %, further preferably 0.1 to 0.7 mass %, and most preferably 0.1 to 0.45 mass %.

The number per unit area in the antiglare layer of the light transmissive particles having a larger average particle diameter than the average film thickness of the antiglare layer is preferably 10 to 1500 particles/mm$^2$. It is more preferably 10 to 400 particles/mm$^2$, further preferably 10 to 250 particles/mm$^2$, and in particular preferably 10 to 150 particles/mm$^2$. The number of the light transmissive particles can be obtained by observing 10 visual fields in a 500 µm×500 µm range of the optical film under an optical microscope and counting the respective numbers, and performing calculation from the average value.

As distinct from a conventionally known antiglare layer, the antiglare layer in the invention expresses the antiglare property by particles having a larger average particle diameter than the average film thickness of the antiglare layer in an amount as very small as 0.01 to 1 mass %. This results in a structure in which the proportion of the flat parts of the film surface is very large. Thus, the film thickness nonuniformity due to the unevenness is less likely to occur when a plurality of thin film layers are stacked on the antiglare layer. As a result, a low reflectance can be implemented.

In this case, the particles project than the antiglare layer by at least 0.01 to 4.0 μm, and thus express the antiglare property. For this reason, even when the proportion of the flat parts is large, the antiglare property will not be impaired.

(Second Light Transmissive Particles)

Whereas, in order to obtain the necessary light scatterability, second light transmissive particles having different average particle diameter from that of the light transmissive particles may be used in combination. It is possible for the foregoing light transmissive particles to impart the antiglare property. Whereas, it is possible for the second light transmissive particles to impart another optical characteristic. For example, when an antiglare antireflection film is bonded to a 133-, or more ppi high definition display, a deficiency in displayed image quality referred to as "glare" may occur. In the invention, the term "glare" does not denote the presence or absence of glare of reflection of illumination such as electric light discussed in connection with the antiglare property. However, the "glare" results from the following phenomenon. The pixels are enlarged or reduced due to the lens effect caused by the unevenness present on the antiglare antireflection film surface, so that the uniformity of the luminance is lost. Accordingly, R, G, and B look glaring to human eyes. However, this can be largely improved by using light transmissive particles with a smaller particle diameter than that of the light transmissive particles for imparting the antiglare property, and with a different refractive index from that of the binder in combination.

When the second light transmissive particles are used in combination in the invention, the second light transmissive particles preferably have a smaller average particle diameter than the average film thickness of the antiglare layer. Specifically, the average particle diameter of the second light transmissive particles is preferably 10% to 90% of the average film thickness of the antiglare layer because the average diameter within such a range can impart the internal scattering property without contributing to the surface unevenness, and therefore less likely to reduce the flat part of the film. It is further preferably 20% to 80%.

The second light transmissive particles having good dispersibility are preferred. As the particles having good dispersibility, light transmissive organic resin particles such as polymethyl methacrylate particles and particles of a copolymer of polymethyl methacrylate and polystyrene are preferable. The polymethyl methacrylate ratio in the copolymer particles is preferably 40 mass % to 100 mass % from the viewpoint of the dispersibility, and further preferably 50 mass % to 100 mass %, and most preferably 75 mass % to 100 mass %.

In the invention, as the second light transmissive particle, there can be preferably used a core-shell type particle in which the core includes a material having a difference in refractive index from the binder, and allowing the light scattering property to be exerted, and the shell includes a material having high compatibility with a binder and excellent dispersibility.

As the material for allowing the light scattering property to be exerted, mention may be made of polymethyl methacrylate, crosslinked poly(acrylic-styrene) copolymer, melamine resin, polycarbonate, polystyrene, crosslinked polystyrene, polyvinyl chloride, benzoguanamine-melamine formaldehyde, or the like.

As the material having excellent dispersibility, mention may be made of polymethyl methacrylate or the like.

When the second light transmissive particles have inferior dispersibility, and form large agglomerates, the antiglare layer surface has a roughened surface. This degrades the film thickness uniformity when two layers or more of a high refractive index layer and a low refractive index layer are provided as thin film interference layers on the antiglare layer. Thus, an optical film low in reflectance may not be obtained. Therefore, it is preferable to adopt the particles having good dispersibility. This does not apply to the case where the dispersibility is improved by the use of a dispersant or the like even if the particles have inferior dispersibility.

It is preferable in terms of imparting the internal scattering property and improving the glare that the mixing ratio of the second light transmissive particles is set at 0.01 mass % to 30 mass % based on the total solid content. It is furhter preferable that the mixing ratio is set at 0.01 to 25 mass %.

(Metal Oxide Fine Particles)

Another preferred form of the invention is an optical film in which an antiglare layer contains at least one kind of fine particles therein, and the fine particles are cohesive metal oxide fine particles.

The cohesive metal oxide particles are used for the purpose of [1] imparting the surface unevenness, [2] adjusting the refractive index, [3] increasing the hardness, [4] improving the brittleness and curl, of the antiglare layer, and other purposes. However, for imparting of the surface unevenness of the antiglare layer in the invention, from the viewpoints of transparency and the low cost, cohesive silica particles and cohesive alumina particles are preferred as the metal oxide fine particles. Among them, the cohesive silica in which particles with a primary particle diameter of several tens nanometers form aggregates is preferred in terms of being capable of imparting proper surface unevenness with stability. The cohesive silica is synthesized by, for example, the neutralization reaction of sodium silicate and sulfuric acid, with a so-called wet process. However, the invention is not limited thereto. The wet process can be further largely classified into a precipitation process and a gelation process. However, in the invention, either method is adoptable. The secondary particle diameter of the cohesive silica is preferably within a range of 0.1 to 10.0 μm. However, it is selected in combination with the layer thickness of the antiglare layer containing the particles. Adjustment of the secondary particle diameter is carried out with degree of dispersion of the particles (control by mechanical dispersion using a sand mill or the like, chemical dispersion using a dispersant or the like is carried out). Particularly, the value obtained by dividing the secondary particle diameter of the cohesive silica particles by the layer thickness of the antiglare layer containing them is preferably 0.1 to 1.5, and more preferably 0.3 to 1.0.

The secondary particle diameter of the cohesive silica particles or the like to be preferably used as the metal oxide particles is measured by a Coulter Counter method.

The amount of the metal oxide particles to be added is preferably set at 0.01 mass % to 5 mass % based on the total solid content of the antiglare layer in terms of reducing the density of the unevenness, and thereby increasing the proportion of the flat parts of the film surface, and stacking the thin film interference layer uniformly. It is more preferably 0.1 mass % to 5 mass %, further preferably 0.1 mass % to 3 mass %, and most preferably 0.1 mass % to 2 mass %.

The cohesive metal oxide particles, and preferably in addition to the cohesive silica particles, light transmissive resin fine particles are also preferably used in combination for the purpose of imparting the internal scattering property. As the light transmissive resin fine particles, the foregoing (second light transmissive particles) can be preferably used.

(Binder)

The binder of the antiglare layers of both the forms in the invention preferably contains one of or both of a thermosetting resin or an ionizing radiation curable compound, and formed from hardening.

Particularly, the binder is preferably the one formed by the crosslinking reaction or the polymerization reaction of an ionizing radiation curable compound. Namely, the antiglare layer is preferably formed in the following manner. A paint for forming the antiglare layer containing ionizing radiation curable multifunctional monomers and multifunctional oligomers as a binder forming material is coated on a support, and the crosslinking reaction or the polymerization reaction of the multifunctional monomers and multifunctional oligomers are effected. The functional groups of ionizing radiation curable multifunctional monomers and multifunctional oligomers are preferably photo-(ultraviolet ray), electron beam, or radiation polymerizable ones. Out of these, photopolymerizable functional groups are preferred. As the photopolymerizable functional groups, mention may be made of unsaturated polymerizable functional groups such as a (meth)acryloyl group, a vinyl group, a styryl group, and an allyl group, and the like. Out of these, a (meth)acryloyl group is preferred.

As the specific examples of the binder forming material, a (compound having a polymerizable unsaturated bond) of a <low refractive index layer> described later can be preferably used.

To the binder forming material, high refractive index monomers or inorganic particles not causing visible light scattering such as $ZrO_2$, $TiO_2$, or $SiO_2$, i.e., inorganic particles with an average particle size of 100 nm or less, or both of them can be added for the purpose of controlling the refractive index of the antiglare layer. The inorganic particles also have an effect of suppressing the curing and shrinkage due to the crosslinking reaction in addition to the effect of controlling the refractive index. In the invention, after the formation of the antiglare layer, the polymers generated from polymerization of compounds having a polymerizable unsaturated bond such as the multifunctional monomers and/or high refractive index monomers, and inorganic particles dispersed in the polymers are inclusively referred to as binders.

The content of the binder in the antiglare layer is preferably 50 to 99 parts by mass per 100 parts by mass of the total solid content in terms of keeping the proportion of the flat parts of the film surface even when the light transmissive particles for imparting the internal scatterability are used in combination. It is further preferably 70 to 99 parts by mass.

The hardness of the antiglare layer is preferably H or more, further preferably 2H or more, and most preferably 3H or more in the pencil hardness test.

The average film thickness of the antiglare layer is preferably set at 2 to 35 μm from the viewpoint of compatibility between the hardness and the curl. It is further preferably set at 2 to 30 μm, more preferably set at 2 to 25 μm, and most preferably set at 2 to 10 μm.

Therefore, the average particle diameter of the light transmissive particles is preferably 2.01 to 39 μm, further preferably 2.01 to 34 μm, more preferably 2.01 to 29 μm, and most preferably 2.01 to 14 μm.

The refractive index at a wavelength of 550 nm of the antiglare layer is preferably set at 1.48 to 1.70, and further preferably set at 1.48 to 1.60. In the invention, all the values of the refractive index to be specifically shown from this point denote values at a wavelength of 550 nm.

<Low Refractive Index Layer>

The low refractive index layer which is an essential component layer in the optical film of the invention can be provided as the outermost layer in order to enhance the antireflection performance. The refractive index of the low refractive index layer is preferably 1.25 to 1.52, more preferably 1.25 to 1.46, still more preferably 1.30 to 1.40 and in particular preferably 1.30 to 1.37.

The thickness of the low refractive index layer is preferably 30 to 200 nm, and further preferably 70 to 150 nm. The haze of the low refractive index layer is preferably 3% or less, further preferably 2% or less, and most preferably 1% or less. The specific hardness of the low refractive index layer is preferably H or more, further preferably 2H or more, and most preferably 3H or more in the pencil hardness test under a load of 500 g. Whereas, in order to improve the stain proof performance of the optical film, the contact angle to water of the surface is preferably 90 degrees or more, further preferably 95 degrees or more, and in particular preferably 100 degrees or more.

The low refractive index layer is preferably formed in such a form as to contain a binder and fine particles. Below, the respective components will be described.

As the binder forming material which the low refractive index layer contains, a fluorine-containing copolymer prepared by copolymerizing fluorine-containing vinyl monomers with other copolymerizable components can be preferably used.

As the fluorine-containing vinyl monomers, mention may be made of fluoroolefins (e.g., fluoroethylene, vinylidene fluoride, tetrafluoroethylene, and hexafluoropropylene), partially or fully fluorinated alkyl ester derivatives of (meth) acrylic acid (e.g., BISCOAT 6FM (trade name, manufactured by Osaka Organic Chemical Industry, Ltd.), R-2020 (trade name, manufactured by Daikin Industries, Ltd.), fully or partially fluorinated vinyl ethers, and the like. However, perfluoroolefins are preferred. Hexafluoropropylene is particularly preferred from the viewpoints of the refractive index, the solubility, the transparency, the availability, and the like. An increase in composition ratio of the fluorine-containing vinyl monomers can reduce the refractive index. However, the film strength is reduced. In the invention, the fluorine-containing vinyl monomers are preferably introduced such that the fluorine content of the fluorine-containing copolymer is 20 to 60 mass %. The case of 25 to 55 mass % is more preferable, and the case of 30 to 50 mass % is in particular preferable.

As the other copolymerizable components to be copolymerized with the fluorine-containing vinyl monomers, mention may be preferably made of the monomers indicated with the following items (a), (b), and (c) for imparting the crosslinking reactivity.

(a) Monomers previously having a self-crosslinkable functional group in the molecule, such as glycidyl(meth)acrylate and glycidyl vinyl ether, (b) Monomers having a carboxyl group, a hydroxy group, amino group, a sulfo group, or the like (e.g., (meth)acrylic acid, methylol(meth)acylate, hydroxyalkyl(meth)acrylate, allyl acrylate, hydroxyethyl vinyl ether, hydroxybutyl vinyl ether, maleic acid, and crotonic acid), and (c) Monomers having a group reacting with the functional groups of the foregoing items (a) and (b), and other than these, a crosslinkable functional group (monomers which can be synthesized, for example, by a technique of allowing acrylic acid chloride to act on a hydroxy group).

As for the monomers (c), the crosslinkable functional groups are preferably photopolymerizable groups. Herein, as the photopolymerizable groups, for example, mention may be made of a (meth)acryloyl group, an alkenyl group, a cinnamoyl group, a cinnamylidene acetyl group, a benzalacetophenone group, a styryl pyridine group, an α-phenylmaleimide group, a phenyl azide group, a sulfonyl azide group, a carbonyl azide group, a diazo group, an o-quinone azide group, a furyl acryloyl group, a cumalin group, a pyrone group, an anthracene group, a benzophenone group, a stilbene group, a dithiocarbamate group, a xanthate group, a 1,2,3-thiadiazole group, a cyclopropene group, and an azadioxabicyclo group. These may be used alone, or two or more thereof. Out of these, a (meth)acryloyl group and a cinnamoyl group are preferred, and a (meth)acryloyl group is particularly preferred.

As a specific method for preparing a fluorine-containing copolymer containing a photopolymerizable group, mention may be made of the following methods. However, the invention is not limited thereto.

a. A method in which the crosslinkable functional group-containing copolymer containing a hydroxyl group is allowed to react with (meth)acrylic acid chloride for esterification;

b. A method in which the crosslinkable functional group-containing copolymer containing a hydroxyl group is allowed to react with a (meth)acrylic acid ester having an isocyanate group for urethanization;

c. A method in which the crosslinkable functional group-containing copolymer containing an epoxy group is allowed to react with methacrylic acid for esterification; and d. A method in which the crosslinkable functional group-containing copolymer containing a carboxyl group is allowed to react with a (meth)acrylic acid ester containing an epoxy group for esterification.

The amount of the photopolymerizable groups to be introduced can be arbitrarily controlled. From the viewpoints of the coating surface condition stability, reduction of faults in surface conditions when inorganic particles are present, improvement of the film strength, and the like, it is also preferable to leave carboxyl groups, hydroxyl groups, and the like in a given amount.

For the fluorine-containing copolymer useful for the invention, it is also possible to appropriately copolymerize other vinyl monomers than the repeating units derived from the fluorine-containing vinyl monomers and the repeating units each having a (meth)acryloyl group on the side chain from the various viewpoints including the adhesion to a base material, Tg of the polymer (which contributes to the film hardness), the solubility in a solvent, the transparency, the slipping property, and the dust proof and stain proof properties. These vinyl monomers may be used in combination of a plurality thereof according to the intended purpose, and these are introduced in a total amount preferably in the range of 0 to 65 mol %, more preferably in the range of 0 to 40 mol %, and in particular preferably in the range of 0 to 30 mol % based on the amount of the copolymer.

The vinyl monomers usable in combination have no particular restriction. Examples thereof may include: olefins (such as ethylene, propylene, isoprene, vinyl chloride, and vinylidene chloride), acrylic acid esters (such as methyl acrylate, ethyl acrylate, 2-ethylhexyl acrylate, and 2-hydroxyethyl acrylate), methacrylic acid esters (such as methyl methacrylate, ethyl methacrylate, butyl methacrylate, and 2-hydroxyethyl methacrylate), styrene derivatives (such as styrene, p-hydroxymethylstyrene, and p-methoxystyrene), vinyl ethers (such as methyl vinyl ether, ethyl vinyl ether, cyclohexyl vinyl ether, hydroxyethyl vinyl ether, and hydroxybutyl vinyl ether), vinyl esters (such as vinyl acetate, vinyl propionate, and vinyl cinnamate), unsaturated carboxylic acids (such as acrylic acid, methacrylic acid, crotonic acid, maleic acid, and itaconic acid), acrylamides (such as N,N-dimethylacrylamide, N-tert-butylacrylamide, and N-cyclohexylacrylamide), and methacrylamides (N,N-dimethylmethacrylamide), and acrylonitrile.

The fluorine-containing copolymers particularly useful for the invention are random copolymers of perfluoroolefin and vinyl ethers or vinyl esters. In particular preferably, it has a group crosslinkable alone (a radical reactive group such as a (meth)acryloyl group or a ring opening polymerizable group such as an epoxy group or an oxetanyl group, or the like). These crosslinkable group-containing polymerization units preferably account for 5 to 70 mol % of the total polymerization units of the polymer. The case of 30 to 60 mol % is in particular preferred. As for the preferred polymers, mention may be made of the ones described in JP-A-2002-243907, JP-A-2002-372601, JP-A-2003-26732, JP-A-2003-222702, JP-A-2003-294911, JP-A-2003-329804, JP-A-2004-4444, and JP-A-2004-45462.

To the fluorine-containing copolymer of the invention, a polysiloxane structure is preferably introduced for the purpose of imparting the stain proof property. The method of introducing the polysiloxane structure has no restriction. However, for example, preferred are: a method in which a polysiloxane block copolymer component is introduced by the use of a silicone macroazo initiator as described in each publication of JP-A-6-93100, JP-A-11-189621, JP-A-11-228631, and JP-A-2000-313709; and a method in which a polysiloxane graft copolymer component is introduced by the use of a silicone macromer as described in each publication of JP-A-2-251555 and JP-A-2-308806. As particularly preferred compounds, mention may be made of the polymers of Examples 1, 2, and 3 of JP-A-11-189621, or copolymers A-2 and A-3 of JP-A-2-251555. These polysiloxane components are in an amount of preferably 0.5 to 10 mass %, and in particularly preferably 1 to 5 mass % based on the amount of the fluorine-containing copolymer.

The preferred molecular weight of the fluorine-containing copolymer preferably usable in the invention is 5000 or more, preferably 10000 to 500000, and most preferably 15000 to 200000 in terms of the mass average molecular weight. Use of fluorine-containing copolymers having different average molecular weights in combination can improve the surface conditions of the coating film and the damage resistance.

(Compound having Polymerizable Unsaturated Bond)

As the binder forming materials, the foregoing fluorine-containing copolymers, and as described in JP-A-10-25388 and JP-A-2000-17028, the compounds having polymerizable unsaturated bonds may be appropriately used in combination. Alternatively, use with the compounds having fluorine-containing multifunctional, polymerizable unsaturated bonds as described in JP-A-2002-145952 is also preferable. As the compounds having polymerizable unsaturated bonds, mention may be made of compounds having polymerizable functional groups such as a (meth)acryloyl group, a vinyl group, a styryl group, and an allyl group. Out of these, a (meth)acryloyl group is preferred. In particular preferably, it is possible to use a compound having two or more (meth)acryloyl groups in one molecule. These compounds preferably provides large synergistic effects on the scratch resistance or the improvement of the scratch resistance after chemical treatment especially when compounds having polymerizable unsaturated groups are used for the polymer main body.

Specific examples of the compounds having polymerizable unsaturated bonds may include:

(meth)acrylic acid diesters of alkylene glycol such as neopentyl glycol acrylate, 1,6-hexanediol(meth)acrylate, and propylene glycol di(meth)acrylate;

(meth)acrylic acid diesters of polyoxyalkylene glycol such as triethylene glycol di(meth)acrylate, dipropylene glycol di(meth)acrylate, polyethylene glycol di(meth)acrylate, and polypropylene glycol di(meth)acrylate;

(meth)acrylic acid diesters of polyhydric alcohol such as pentaerythritol di(meth)acrylate; and (meth)acrylic acid diesters of an ethylene oxide or propylene oxide adduct such as 2,2-bis{4-(acryloxy.diethoxy)phenyl}propane and 2-2-bis{4-(acryloxy.polypropoxy)phenyl}propane.

Further, epoxy(meth)acrylates, urethane(meth)acrylates, and polyester(meth)acrylates are also preferably used as the photopolymerizable multifunctional monomers.

Out of these, esters of polyhydric alcohol and (meth)acrylic acid are preferred. Further preferably, multifunctional monomers having 3 or more (meth)acryloyl groups per molecule are preferred. Examples thereof may include: pentaerythritol tetra(meth)acrylate, pentaerythritol tri(meth)acrylate, trimethylolpropane tri(meth)acrylate, EO-modified trimethylolpropane tri(meth)acrylate, PO-modified trimethylolpropane tri(meth)acrylate, EO-modified phosphoric acid tri(meth)acrylate, trimethylolethane tri(meth)acrylate, ditrimethylolpropane tetra(meth)acrylate, dipentaerythritol tetra(meth)acrylate, dipentaerythritol penta(meth)acrylate, dipentaerythritol hexa(meth)acrylate, pentaerythritol hexa(meth)acrylate, 1,2,3-cyclohexane tetramethacrylate, polyurethane polyacrylate, polyester polyacrylate and caprolactone-modified tris(acryloxyethyl)isocyanurate. In this specification, the terms "(meth)acrylate", "(meth)acrylic acid" and "(meth)acryloyl" represent "acrylate or methacrylate", "acrylic acid or methacrylic acid", and "acryloyl or methacryloyl", respectively.

As specific compounds of the multifunctional acrylate type compounds having a (meth)acryloyl group, mention may be made of an esterification product of a polyol with a (meth)acrylic acid, such as KAYARAD DPHA, KAYARAD DPHA-2C, KAYARAD PET-30, KAYARAD TMPTA, KAYARAD TPA-320, KAYARAD TPA-330, KAYARAD RP-1040, KAYARAD T-1420, KAYARAD D-310, KAYARAD DPCA-20, KAYARAD DPCA-30, KAYARAD DPCA-60 and KAYARAD GPO-303 manufactured by NIPPON KAYAKU Co., Ltd., and V#3PA, V#400, V#36095D, V#1000 and V#1080 manufactured by Osaka Organic Chemical Industry Ltd. Further, there can also be preferably used tri- or higher functional urethane acrylate compounds such as SHIKOH UV-1400B, SHIKOH UV-1700B, SHIKOH UV-6300B, SHIKOH UV-7550B, SHIKOH UV-7600B, SHIKOH UV-7605B, SHIKOH UV-7610B, SHIKOH UV-7620EA, SHIKOH UV-7630B, SHIKOH UV-7640B, SHIKOH UV-6630B, SHIKOH UV-7000B, SHIKOH UV-7510B, SHIKOH UV-7461TE, SHIKOH UV-3000B, SHIKOH UV-3200B, SHIKOH UV-3210EA, SHIKOH UV-3310EA, SHIKOH UV-3310B, SHIKOH UV-3500BA, SHIKOH UV-3520TL, SHIKOH UV-3700B, SHIKOH UV-6100B, SHIKOH UV-6640B, SHIKOH UV-2000B, SHIKOH UV-2010B, SHIKOH UV-2250EA, and SHIKOH UV-2750B (manufactured by the Nippon Synthetic Chemical Industry Co., Ltd.), UL-503LN (manufactured by Kyoeisha Chemical Co., Ltd.), UNIDIC 17-806, UNIDIC 17-813, UNIDIC V-4030, and UNIDIC V-4000BA (manufactured by Dainippon Ink and Chemicals, Inc.), EB-1290K, EB-220, EB-5129, EB-1830, and EB-4858 (manufactured by Daicel-UCB Company Ltd.), Hi-Coap AU-2010, and Hi-Coap AU-2020 (manufactured by Tokushiki Co., Ltd.), ARONIX M-1960 (produced by Toagosei Co., Ltd.), ART-RESIN UN-3320HA, UN-3320HC, UN-3320HS, UN-904, and HDP-4T; and a tri- or higher functional polyester compounds such as ARONIX M-8100, M-8030, and M-9050 (manufactured by Toagosei Co., Ltd.) and KRM-8307 (manufactured by DAICEL-CYTEC Company Ltd.), and the like.

Further, mention may also be made of a resin having three or more (meth)acryloyl groups, such as a polyester resin, a polyether resin, an acrylic resin, an epoxy resin, an urethane resin, an alkyd resin, a spiroacetal resin, a polybutadiene resin, or a polythiol polyene resin having a relatively low molecular weight; and an oligomer or prepolymer of a multifunctional compound such as polyhydric alcohol, or the like.

Further, as the bifunctional (meth)acrylate compounds, mention may be made of the compounds specifically represented by the following formulae. However, the invention is not limited thereto.

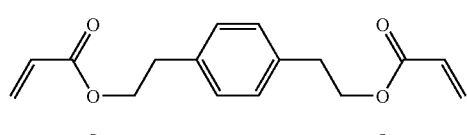

A-1

A-2

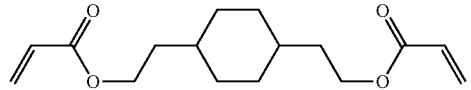

A-3

A-4

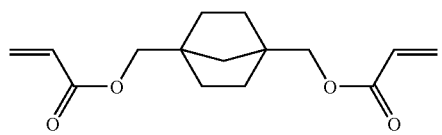

A-5

A-6

A-7

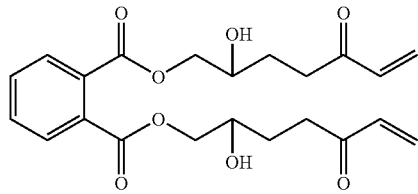

A-8

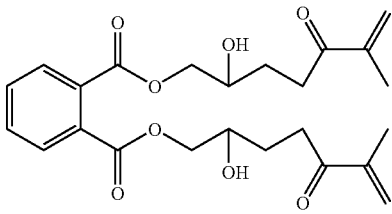

A-9
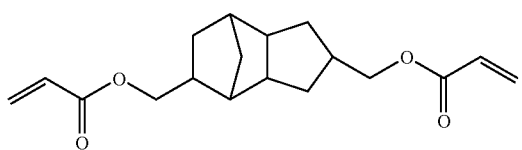
A-10
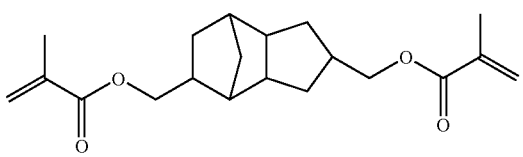
A-11
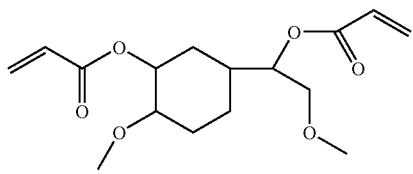
A-12
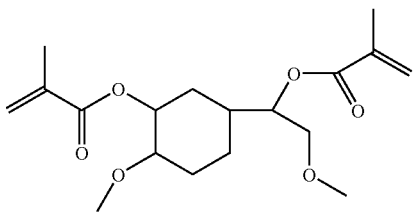
A-13
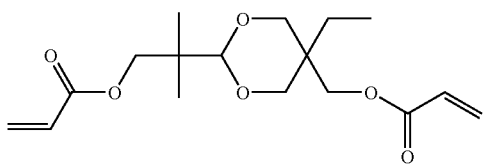
A-14
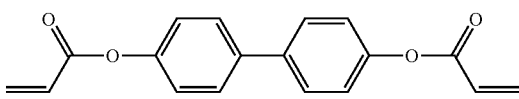
A-15
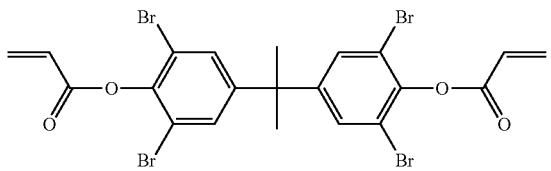
A-16
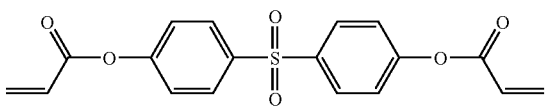
A-17
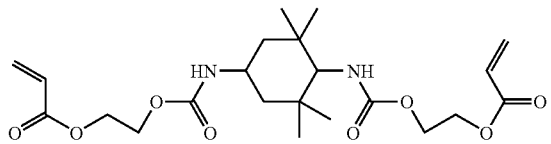
A-18
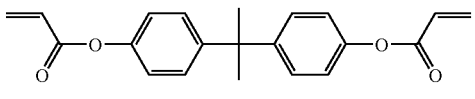
A-19
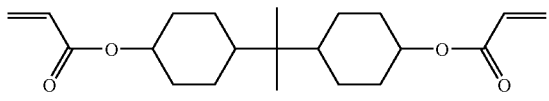
A-20
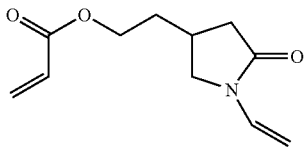
A-21
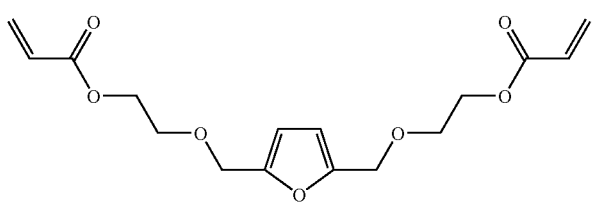
A-22
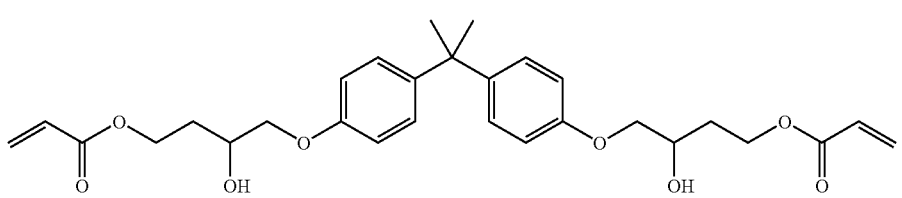

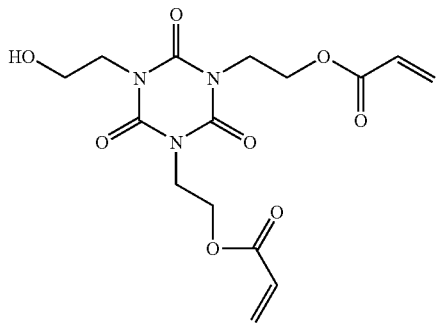

A-23

Further, dendrimers described, for example, in JP-A-2005-76005 and JP-A-2005-36105, or norbornene ring-containing monomers described, for example, in JP-A-2005-60425 can also be used. Whereas, the fluorine-containing multifunctional (meth)acrylate represented by the chemical formula (2) of JP-A-2002-105141 can also be used.

The multifunctional monomers may be used in combination of two or more thereof.

Polymerization of these monomers having ethylenically unsaturated groups can be carried out through irradiation with ionizing radiation or heating in the presence of a radical photopolymerization initiator or a heat radical polymerization initiator.

For the polymerization reaction of the photopolymerizable multifunctional monomers, a photopolymerization initiator is preferably used. As the photopolymerization initiators, a radical photopolymerization initiator and a cation polymerization initiator are preferred. The radical photopolymerization initiator is particularly preferred.

(Fluorine-Containing Polymerizable Compound)

In the invention, there can be also preferably used a fluorine-containing multifunctional monomer which is a fluorine-containing compound having three or more polymerizable groups, in which the fluorine content is 35.0 mass % or more of the molecular weight of the fluorine-containing compound, and the calculated value of the total inter-crosslink molecular weight is 300 or less when the polymerizable groups are polymerized.

The fluorine-containing multifunctional monomer is preferably represented by the following formula (1) or (2).

$$Rf\text{-}\{CH_2\text{—}OC(O)CH\text{=}CH_2\}_n.\qquad \text{Formula (1)}$$

$$Rf\text{-}\{OC(O)CH\text{=}CH_2\}_n.\qquad \text{Formula (2)}$$

where in the formula, Rf represents a chain or cyclic n valent hydrocarbon fluoride which includes at least a carbon atom, and a fluorine atom, and may include an oxygen atom and/or a hydrogen atom, in which n represents an integer of 3 or more. Rf preferably includes substantially only a carbon atom and a fluorine atom, or only a carbon atom, a fluorine atom, and an oxygen atom.

Herein, the calculation value of the inter-crosslinking molecular weight represents the total atomic weight of atomic groups interposed between (a) and (a), (b) and (b), or (a) and (b), where (a) represents a carbon atom substituted with 3 or more in total of carbon atom(s) and/or silicon atom(s) and/or oxygen atom(s), and (b) represents a silicon atom substituted with 3 or more in total of carbon atom(s) and/or oxygen atom(s) in a polymer in which the polymerizable groups of the fluorine-containing multifunctional monomers are all polymerized. Here, the "atom substituted with" means an atom bonded with all via single bonds. When the inter-crosslinking molecular weight is 300 or more, the hardness of the coating film may be reduced.

Specifically, in addition to X-2 to 4, X-6, X-8 to 14, and X21 to 32 described in paragraph Nos. [0023] to [0027] of JP-A-2006-28409, the following compounds (X-33) can also be preferably used.

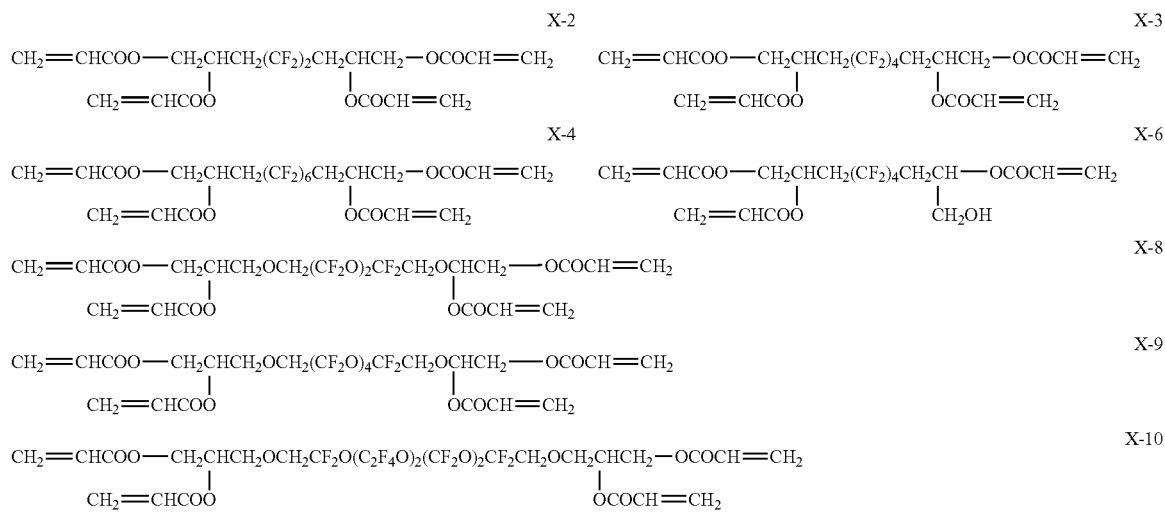

-continued
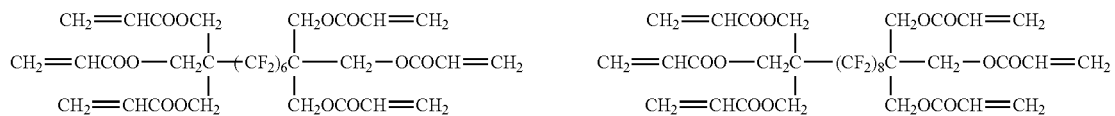
X-11
X-12
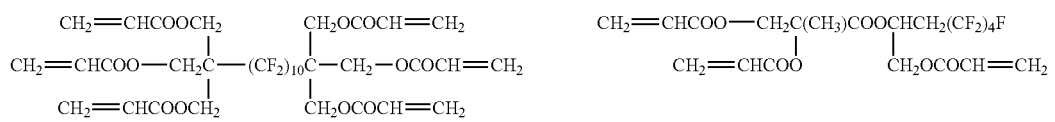
X-13
X-14
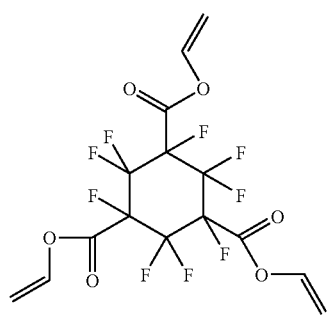
X-21
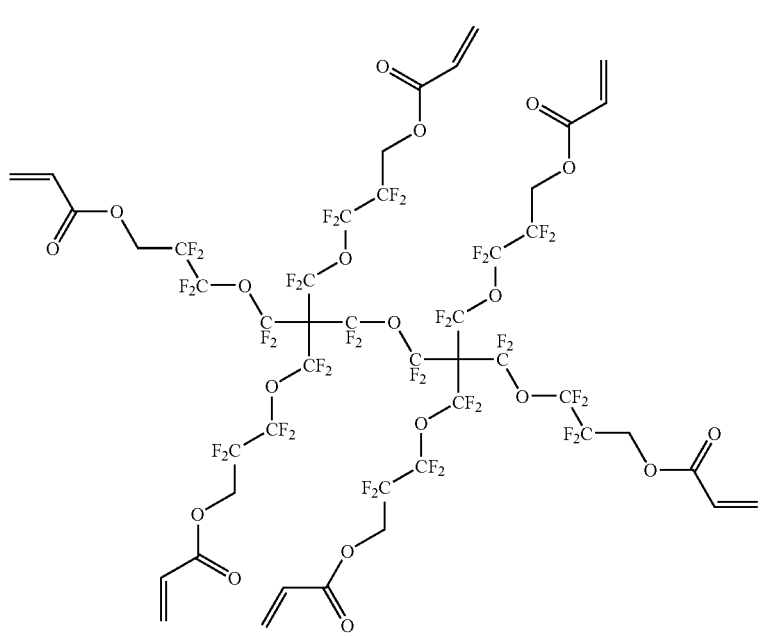
X-22

X-23
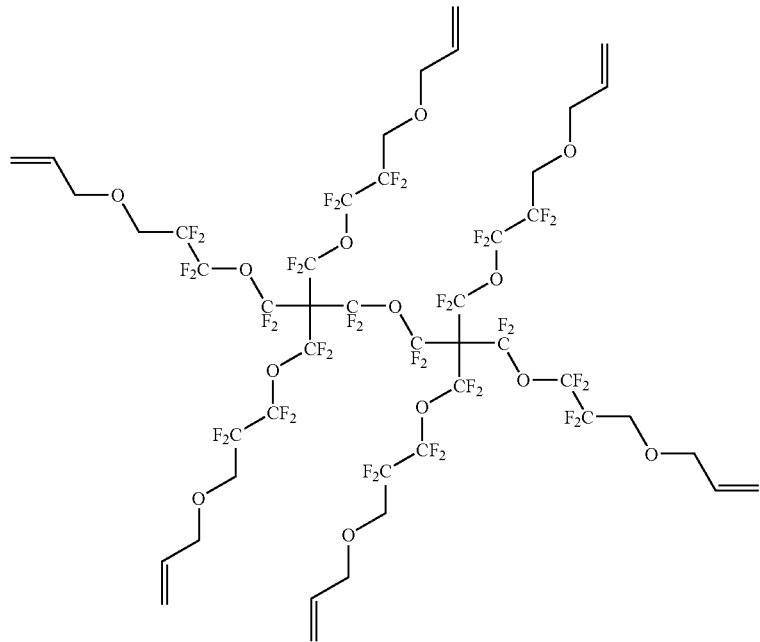
X-24
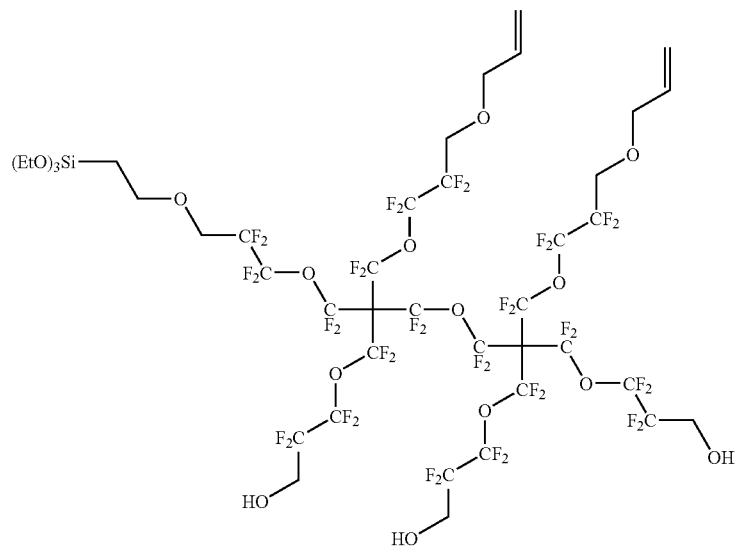

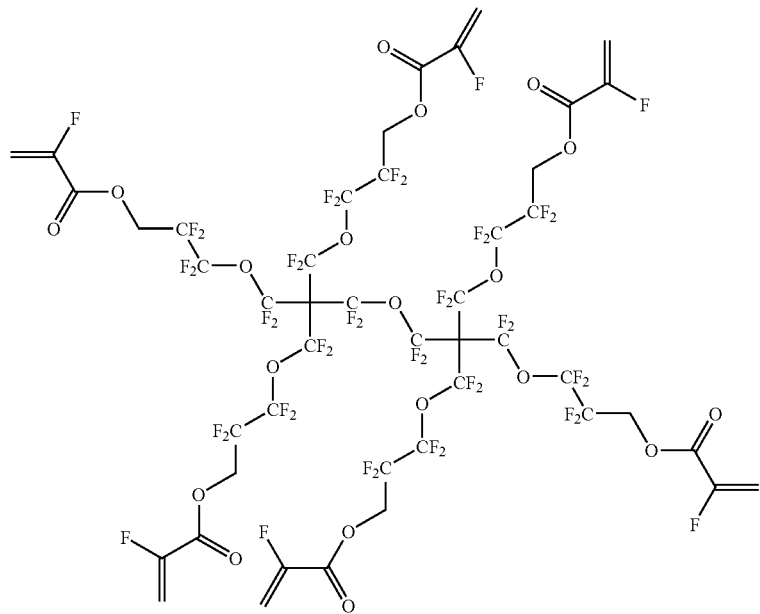
X-25
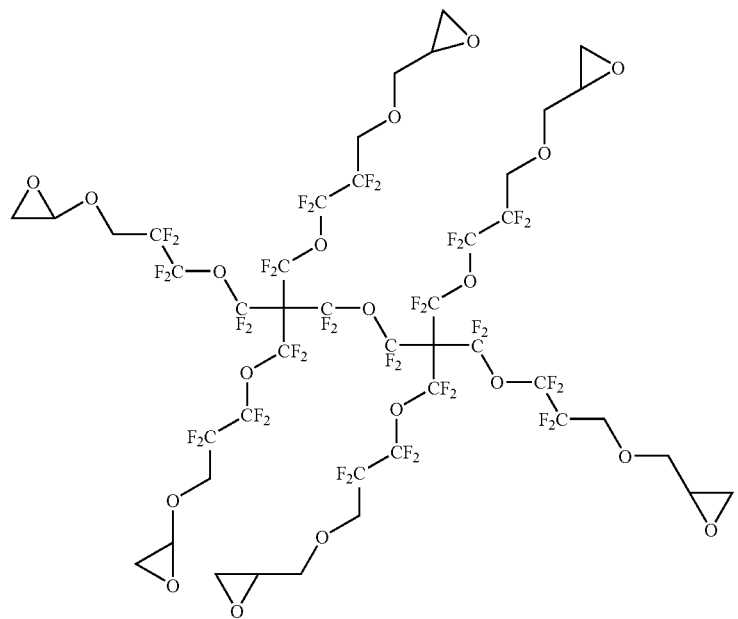
X-26

-continued
X-27
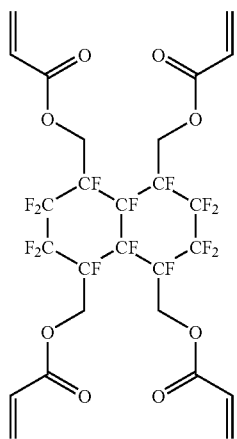
X-28
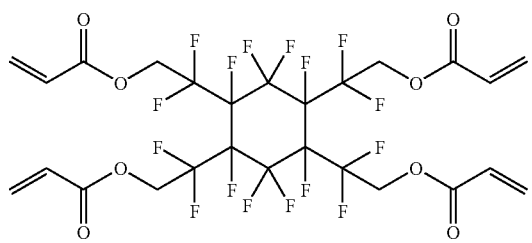
X-29
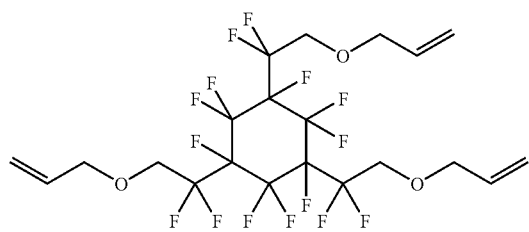
X-30
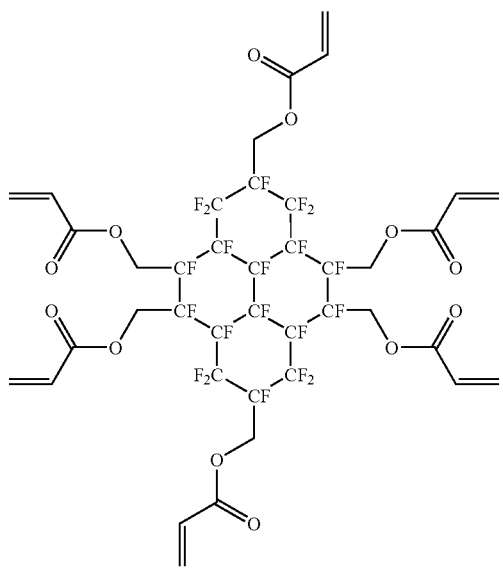
X-31
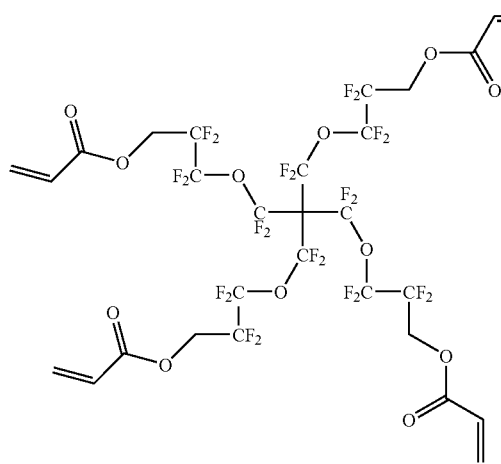
X-32
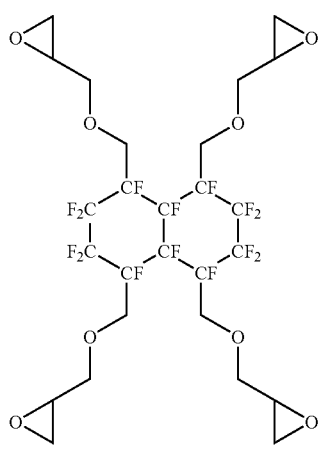

-continued
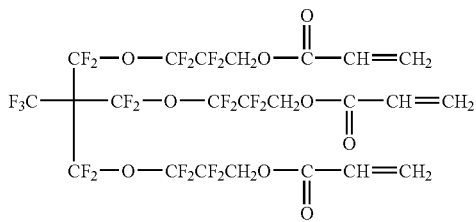
(X-33)
Whereas, the following M-1 to M-16 described in paragraph Nos. [0062] to of JP-A-2006-284761 can also be preferably used.
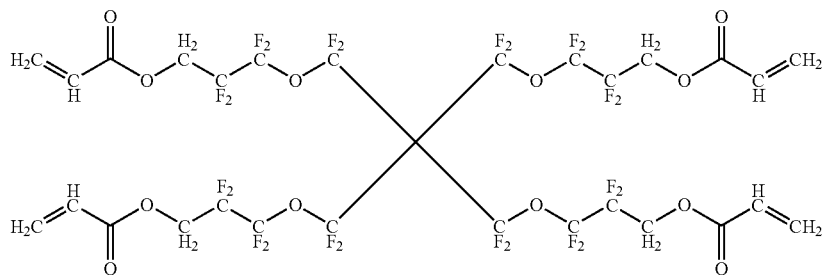
M-1
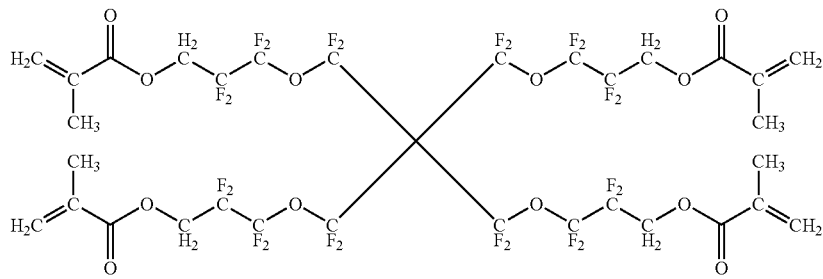
M-2
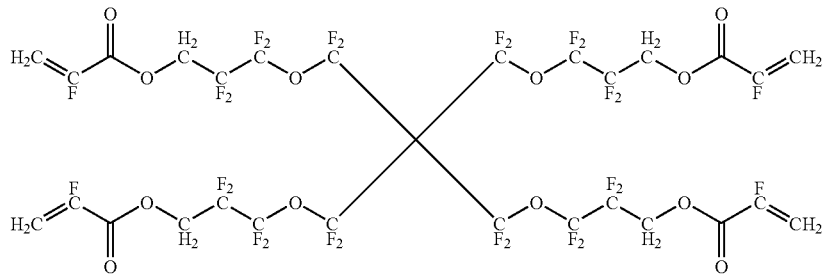
M-3
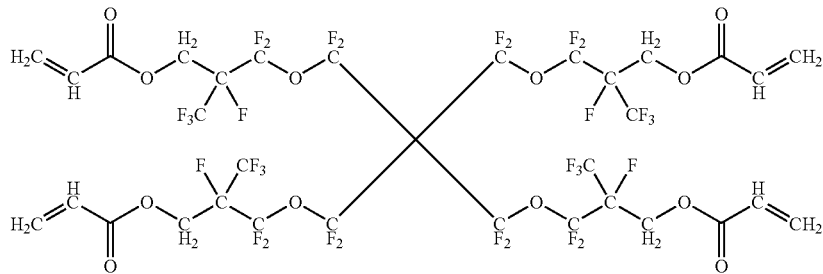
M-4

-continued
M-5
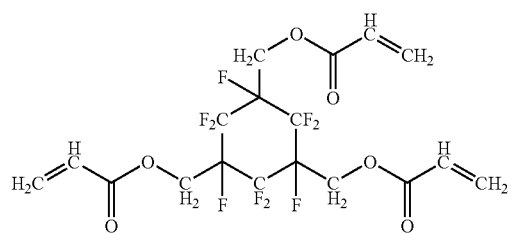
M-6
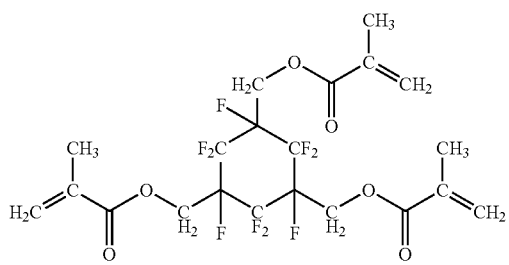
M-7
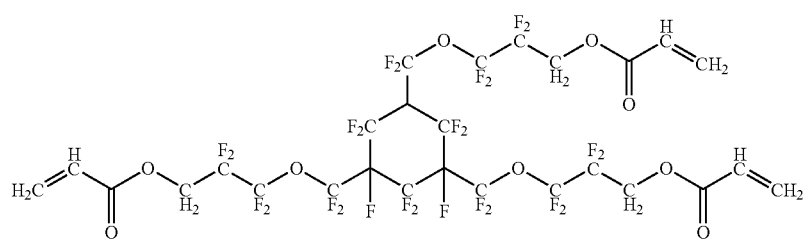
M-8
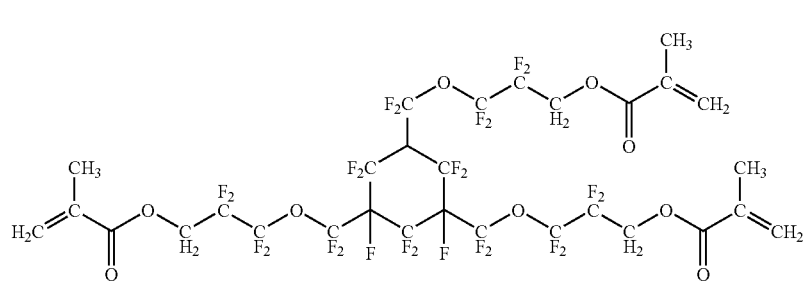
M-9
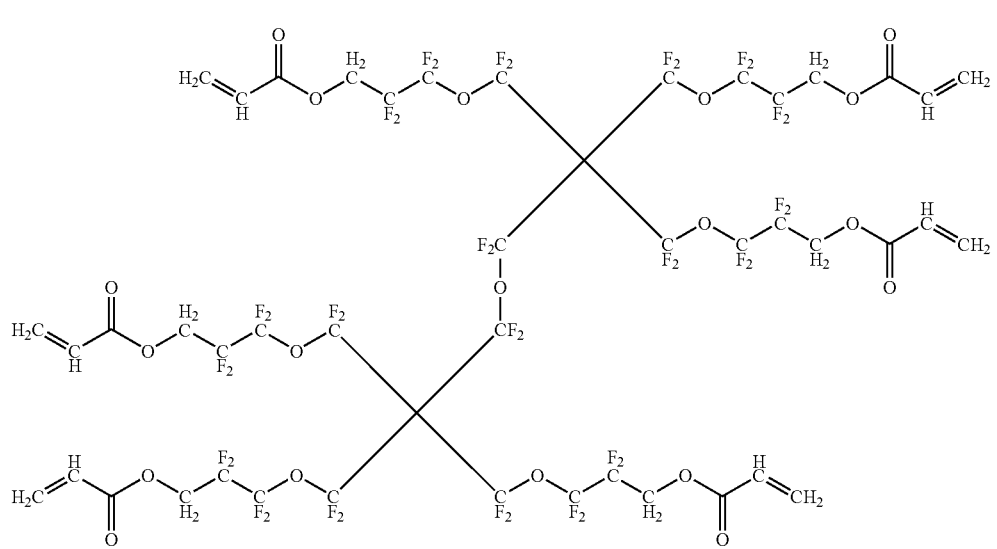

-continued
M-10
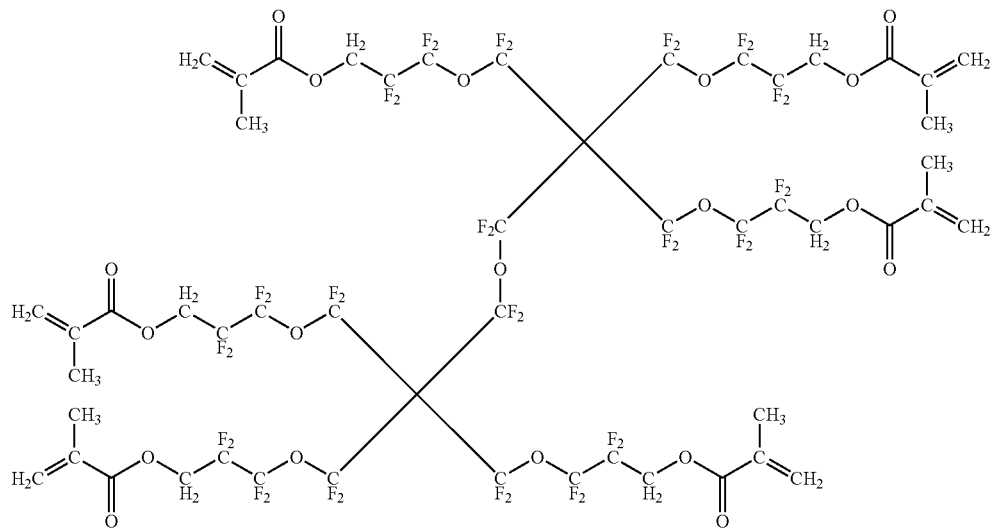
M-11
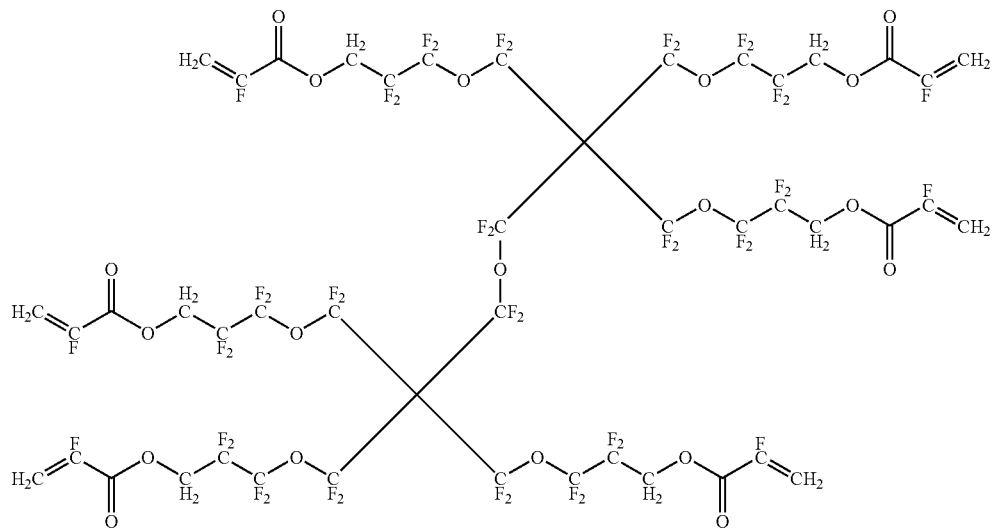
M-12
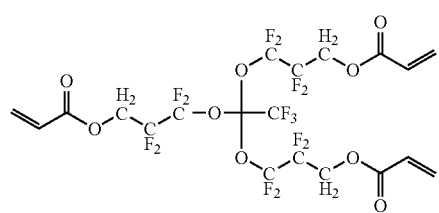
M-13
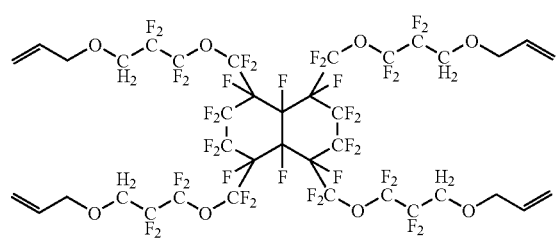
M-14
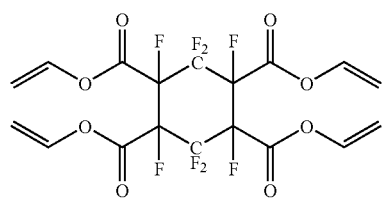

M-15
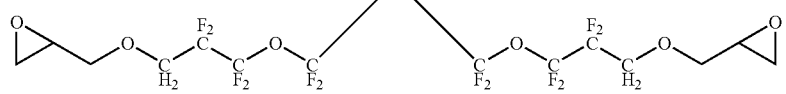
M-16
Whereas, the following compounds MA1 to MA20 can also be preferably used.
MA1
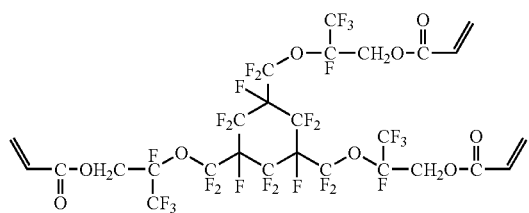
MA2
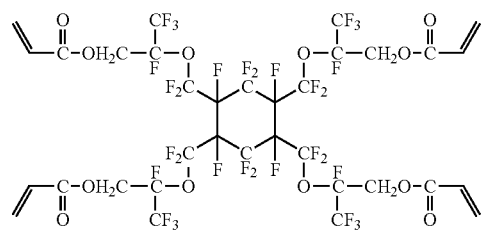
MA3
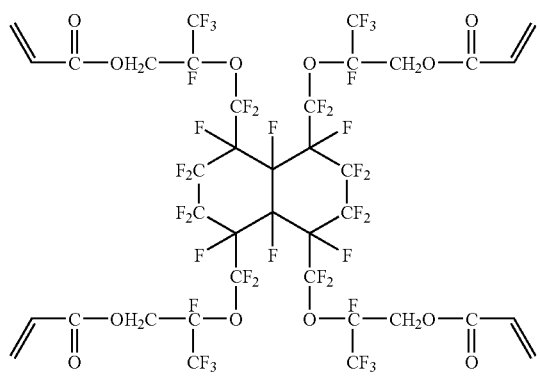
MA4
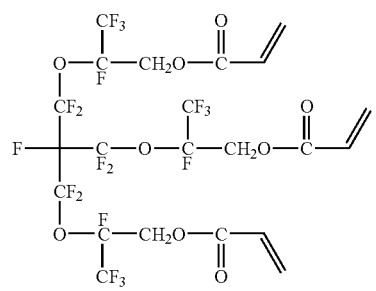
MA5
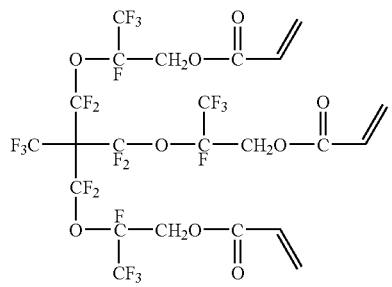
MA6
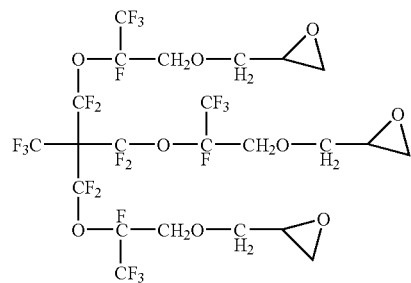

-continued
MA7 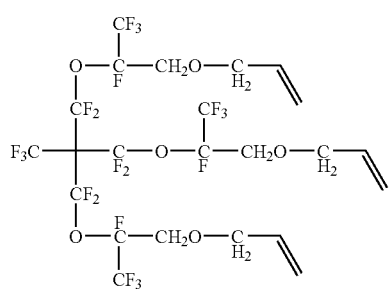
MA8 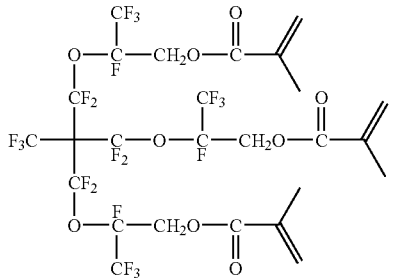
MA9 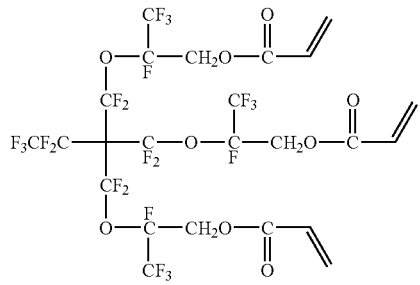
MA10 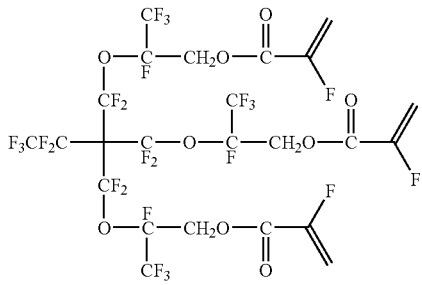
MA11 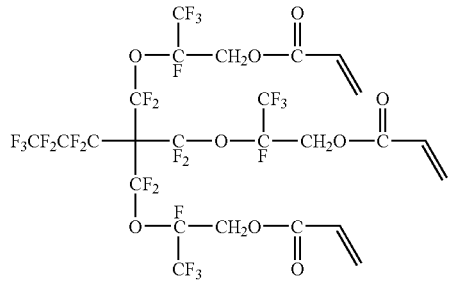
MA12 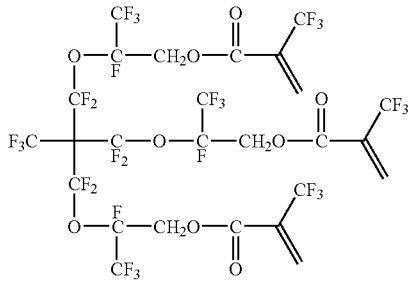
MA13 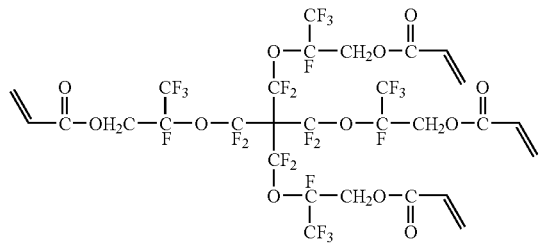
MA14 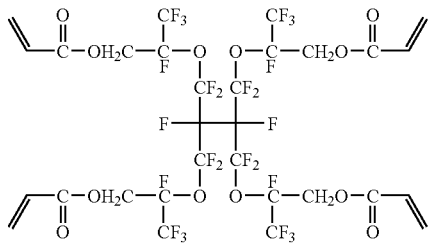
MA15 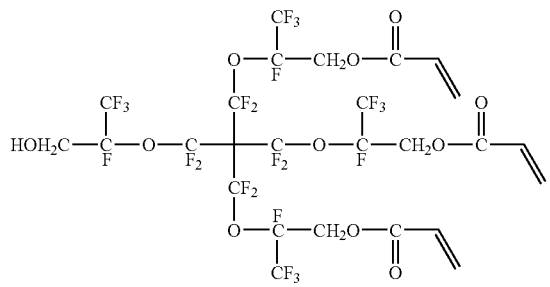
MA16 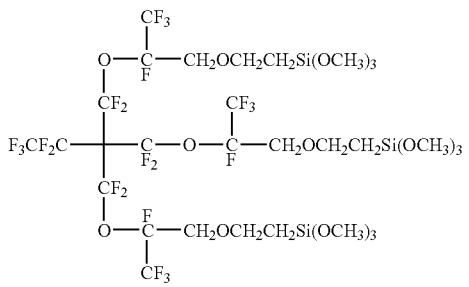

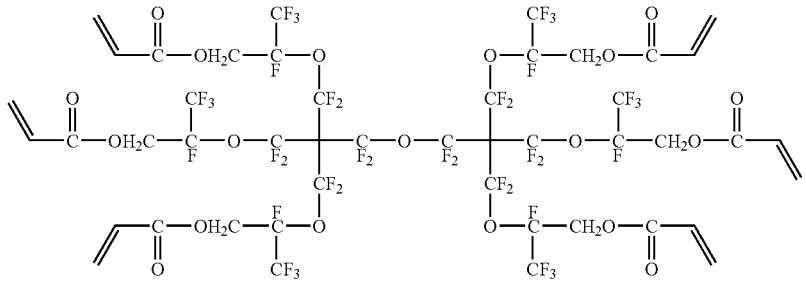
MA17

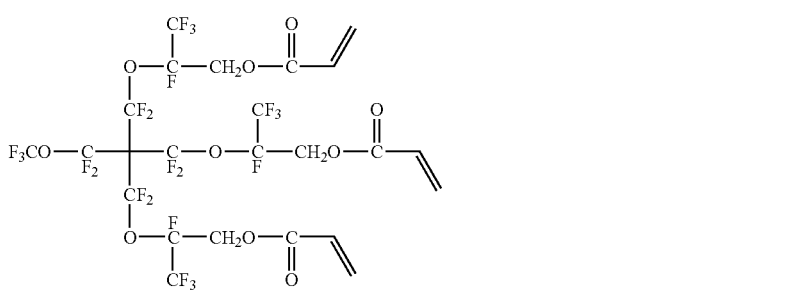
MA18

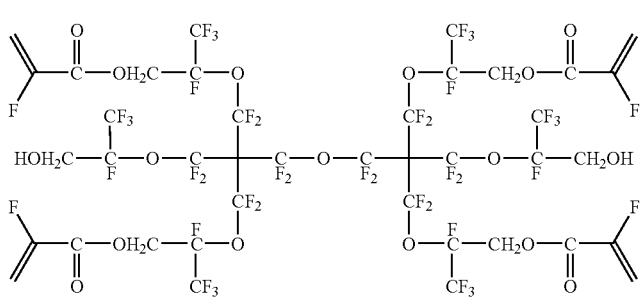
MA19

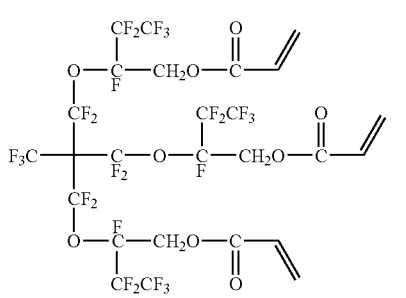
MA20

Out of these, from the viewpoints of compatibility between the scratch resistance and the low refractive index, X-22 and M-1 are in particular preferably used, and M-1 is most preferably used.

Whereas, the following compounds described in the paragraph Nos. 0135 to 0149 of WO2005/059601 can also be preferably used.

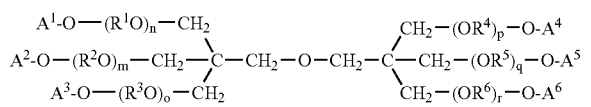
(I)

(In the general formula (I), each of $A^1$ to $A^6$ independently represents an acryloyl group, a methacryloyl group, an α-fluoroacryloyl group, or a trifluoromethacryloyl group, each of n, m, o, p, q, and r independently represents an integer of 0 to 2, and each of $R^1$ to $R^6$ independently represents an alkylene group having 1 to 3 carbon atoms, or a fluoroalkylene group having 1 to 3 carbon atoms, in which one or more hydrogen atoms are substituted by fluorine atoms.)

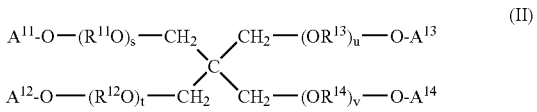
(II)

(In the general formula (II), each of $A^{11}$ to $A^{14}$ independently represents an acryloyl group, a methacryloyl group, an α-fluoroacryloyl group, or a trifluoromethacryloyl group, each of s, t, u, and v independently represents an integer of 0 to 2, and each of $R^{11}$ to $R^{14}$ independently represents an alkylene group having 1 to 3 carbon atoms, or a fluoroalkylene group having 1 to 3 carbon atoms, in which one or more hydrogen atoms are substituted by fluorine atoms.)

Further, the compounds described in the paragraph Nos. 0014 to 0028 of JP-A-2006-291077 can also be preferably used.

(Inorganic Fine Particles)

In the invention, various kinds of inorganic fine particles in the low refractive layer can be used for controlling the refractive index, improving the film thickness uniformity upon coating on the antiglare layer, improving the cissing, and improving the physical characteristics such as the hardness, the optical characteristics such as reflectance and scattering property, and the like. The inorganic fine particles preferably have low reflectance, and for example, porous or hollow structured silica particles are preferably used in the low refractive index layer. The amount of the inorganic fine particles to be added to the low refractive index layer is preferably 20 mass % to 70 mass %, more preferably 30 mass % to 60 mass %, and further preferably 40 mass % to 60 mass %, based on the solid content of each layer. When the amount of the particles added is less than 20 mass %, the scratch resistance of the low refractive index layer is degraded. The inorganic fine particles may be used in combination of a plurality thereof.

(Porous or Hollow Fine Particles)

In order to reduce the refractive index, porous or hollow structured fine particles are in particular preferably used in the low refractive index layer. The void ratio of these particles is preferably 10 to 80%, further preferably 20 to 60%, and most preferably 30 to 60%. It is preferable from the viewpoint of reducing the refractive index and keeping the durability of the particles to set the void ratio of the hollow fine particles within the foregoing range.

When the porous or hollow particles are silica particles, the fine particles has a refractive index of preferably 1.10 to 1.40, further preferably 1.15 to 1.35, and most preferably 1.15 to 1.30. The refractive index herein denotes the refractive index of the whole particles, and does not denote the refractive index of only the silica of the shell forming the silica particle.

The methods for manufacturing the porous or hollow silica are described in, for example, JP-A-2001-233611 and JP-A-2002-79616. Particularly preferred are particles each having a void inside the shell of which the pores are closed. Incidentally, the refractive index of these hollow silica particles can be calculated by the method described in JP-A-2002-79616.

The coating amount of the porous or hollow silica is preferably 1 mg/m² to 100 mg/m², more preferably 5 mg/m² to 80 mg/m², and further preferably 10 mg/m² to 60 mg/m². Too small coating amount results in reduction of the effects of reducing the refractive index and the effects of improving the scratch resistance. Too large coating amount results in formation of fine unevenness on the low refractive index layer surface. Thus, the outward appearances such as tightness of black, or the integral reflectance is degraded.

The average particle diameter of the porous or hollow silica is preferably 30% or more and 150% or less, more preferably 35% or more and 80% or less, and further preferably 40% or more and 60% or less of the thickness of the low refractive index layer. Namely, when the thickness of the low refractive index layer is 100 nm, the particle diameter of the hollow silica is preferably 30 nm or more and 150 nm or less, more preferably 35 nm or more and 100 nm or less, and further preferably 40 nm or more and 65 nm or less.

In the invention, the void-containing fine particles may have a size distribution. The coefficient of variation thereof is preferably 60% to 5%, and further preferably 50% to 10%. Whereas, two or three or more kinds of particles having different average particle sizes may also be used in mixture.

When the particle diameter of the silica fine particles is too small, the proportion of the void parts decreases, so that reduction of the refractive index cannot be expected. Too large particle diameter results in formation of fine unevenness on the low refractive index layer surface. Thus, the outward appearances such as tightness of black, or the integral reflectance is degraded. The silica fine particles may be any of crystalline and amorphous, or are preferably monodispersible particles. The particle is most preferably in a spherical form, but even an amorphous particle does not matter.

Whereas, hollow silica particles different in average particle size can be used in combination of two or more thereof. Herein, the average particle diameter of the hollow silica can be determined from an electron micrograph.

In the invention, the specific surface area of the hollow silica particles is preferably 20 to 300 m²/g, further preferably 30 to 120 m²/g, and most preferably 40 to 90 m²/g. The surface area can be determined by using nitrogen with a BET method.

In the invention, void-free silica particles can be used in combination with hollow silica. The particle size of the void-free silica is preferably 30 nm or more and 150 nm or less, further preferably 35 nm or more and 100 nm or less, and most preferably 40 nm or more and 80 nm or less.

(Surface Treatment Method of Inorganic Fine Particles)

The surface treatment method of inorganic fine particles will be described by taking porous or hollow inorganic fine particles as an example. In order to improve the dispersibility into the coating composition for forming the low refractive index layer, the surface of each inorganic fine particle is preferably treated by a hydrolysate and/or a partial condensate of organosilane. For the treatment, any of an acid catalyst and a metal chelate compound, or both are further preferably used. The structure of organosilane has no particular restriction. However, the one having a (meth)acryloyl group at the end is preferred.

(Organosilane Compound)

At least one layer of the antiglare layer, the low refractive index layer, the intermediate refractive index layer, and the high refractive index layer forming the optical film of the invention preferably contains, in the coating solution forming the layer, at least one component of a hydrolysate and/or a partial condensate of an organosilane compound, or a so-called sol component (which may be hereinafter referred to as such) from the viewpoint of the scratch resistance.

Particularly, in the antireflection film, the low refractive index layer preferably contains the sol component in order to implement both the antireflection performance and the scratch resistance. The sol component becomes a part of a binder of the layer by coating the coating composition, followed by condensation by drying and heating steps to form a cured product. Whereas, when the cured product has a polymerizable unsaturated bond, a binder having a three dimensional structure is formed through irradiation with an active ray.

The organosilane compound is preferably the one expressed by the following general formula 1:

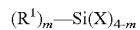
General formula 1

$(R^1)_m—Si(X)_{4-m}$

In the general formula 1, $R^1$ represents a substituted or unsubstituted alkyl group, or a substituted or unsubstituted aryl group. Alkyl groups are preferably alkyl groups having 1 to 30 carbon atoms, more preferably the ones having 1 to 16 carbon atoms, and in particular preferably the ones having 1 to 6 carbon atoms. Specific examples of the alkyl groups may include methyl, ethyl, propyl, isopropyl, hexyl, decyl, and hexadecyl. As aryl groups, mention may be made of phenyl, naphthyl, and the like, and preferably a phenyl group.

X represents a hydroxyl group or a hydrolyzable group. Examples thereof may include an alkoxy group (an alkoxy group having 1 to 5 carbon atoms is preferred, and examples thereof may include a methoxy group and an ethoxy group), a halogen atom (e.g., Cl, Br, or I), and a group represented by $R^2COO$ (where $R^2$ is preferably a hydrogen atom, or an alkyl group having 1 to 6 carbon atoms, examples of which may include $CH_3COO$ and $C_2H_5COO$). It is preferably an alkoxy group, and in particular preferably a methoxy group or an ethoxy group.

m represent an integer of 1 to 3, and preferably 1 or 2.

When a plurality of X's are present, each of a plurality of X's may be the same as or different from every other X.

The substituent contained in $R^1$ has no particular restriction. However, mention may be made of a halogen atom (such as fluorine, chlorine, or bromine), a hydroxyl group, a mercapto group, a carboxyl group, an epoxy group, an alkyl group (such as methyl, ethyl, i-propyl, propyl, or t-butyl), an aryl group (such as phenyl or naphthyl), an aromatic heterocyclic group (such as furyl, pyrazolyl, or pyridyl), an alkoxy group (such as methoxy, ethoxy, i-propoxy, or hexyloxy), aryloxy (such as phenoxy), an alkylthio group (such as methylthio or ethylthio), an arylthio group (such as phenylthio), an alkenyl group (such as vinyl or 1-propenyl), an acyloxy group (such as acetoxy, acryloyloxy, or methacryloyl), an alkoxycarbonyl group (such as methoxycarbonyl or ethoxycarbonyl), an aryloxycarbonyl group (such as phenoxycarbonyl), a carbamoyl group (such as carbamoyl, N-methylcarbamoyl, N,N-dimethylcarbamoyl, or N-methyl-n-octylcarbamoyl), an acylamino group (such as acetylamino, benzoylamino, acrylamino, or methacrylamino), or the like. These substituents may be further substituted.

$R^1$ is preferably a substituted alkyl group or a substituted aryl group.

As an organosilane compound, an organosilane compound having a vinyl polymerizable substituent represented by the following general formula 2, synthesized by using the compound of the general formula 2 as a staring material is also preferable.

General Formula 2

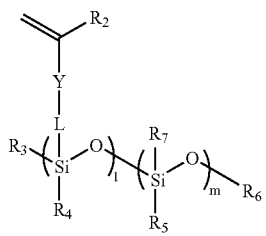

In the general formula 2, $R_2$ represents a hydrogen atom, a methyl group, a methoxy group, an alkoxycarbonyl group, a cyano group, a fluorine atom, or a chlorine atom. As an alkoxycarbonyl group, mention may be made of a methoxycarbonyl group, an ethoxycarbonyl group, or the like. A hydrogen atom, a methyl group, a methoxy group, a methoxycarbonyl group, a cyano group, a fluorine atom, and a chlorine atom are preferred, a hydrogen atom, a methyl group, a methoxycarbonyl group, a fluorine atom, and a chlorine atom are further preferred, and a hydrogen atom and a methyl group are particularly preferred.

Y represents a single bond, or *—COO—**, *—CONH—**, or *—O—**. A single bond, *—COO—**, and *—CONH—** are preferred, a single bond and *—COO—** are further preferred, and *—COO—** is particularly preferred. * represents the linking site to =C($R_1$)—, and ** represents the linking site to L.

L represents a divalent linking chain. Specifically, mention may be made of a substituted or unsubstituted alkylene group, a substituted or unsubstituted arylene group, a substituted or unsubstituted alkylene group having therein a linking group (e.g., ether, ester, or amido), and a substituted or unsubstituted arylene group having therein a linking group. A substituted or unsubstituted alkylene group, a substituted or unsubstituted arylene group, and an alkylene group having therein a linking group are preferred, an unsubstituted alkylene group, an unsubstituted arylene group, an alkylene group having therein an ether or ester linking group are further preferred, and an unsubstituted alkylene group, and an alkylene group having therein an ether or ester linking group are particularly preferred. As the substituents, mention may be made of halogen, a hydroxyl group, a mercapto group, a carboxyl group, an epoxy group, an alkyl group, an aryl group, and the like. These substituents may be further substituted.

l represents a numerical value satisfying the mathematical expression of l=100−m, and m represents a numerical value of 0 to 50, preferably a numerical value of 0 to 40, and in particular preferably a numerical value of 0 to 30.

Each of $R_3$ to $R_5$ is preferably a halogen atom, a hydroxyl group, an unsubstituted alkoxy group, or an unsubstituted alkyl group. Each of $R_3$ to $R_5$ is more preferably a chlorine atom, a hydroxyl group, or an unsubstituted alkoxy group having 1 to 6 carbon atoms, further preferably a hydroxyl group, or an alkoxy group having 1 to 3 carbon atoms, and in particular preferably a hydroxyl group or a methoxy group.

$R_6$ represents a hydrogen atom or an alkyl group. An alkyl group is preferably a methyl group, an ethyl group, or the like. $R_7$ is preferably the group defined for $R_1$ of the general formula 1 or a hydroxyl group, more preferably a hydroxyl group or an unsubstituted alkyl group, further preferably a hydroxyl group or an alkyl group having 1 to 3 carbon atoms, and in particular preferably a hydroxyl group or a methyl group.

The compounds of the general formula 1 may be used in combination of two or more thereof. Particularly, the compound of the general formula 2 is synthesized by using two compounds of the general formula 1 as starting materials. Below, non-limiting specific examples of the starting materials for the compound of the general formula 1 and the compound represented by the general formula 2 will be shown.

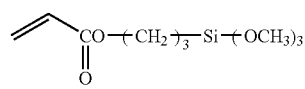

SI-1

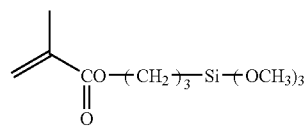

SI-2

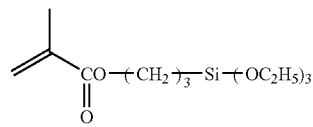

SI-3

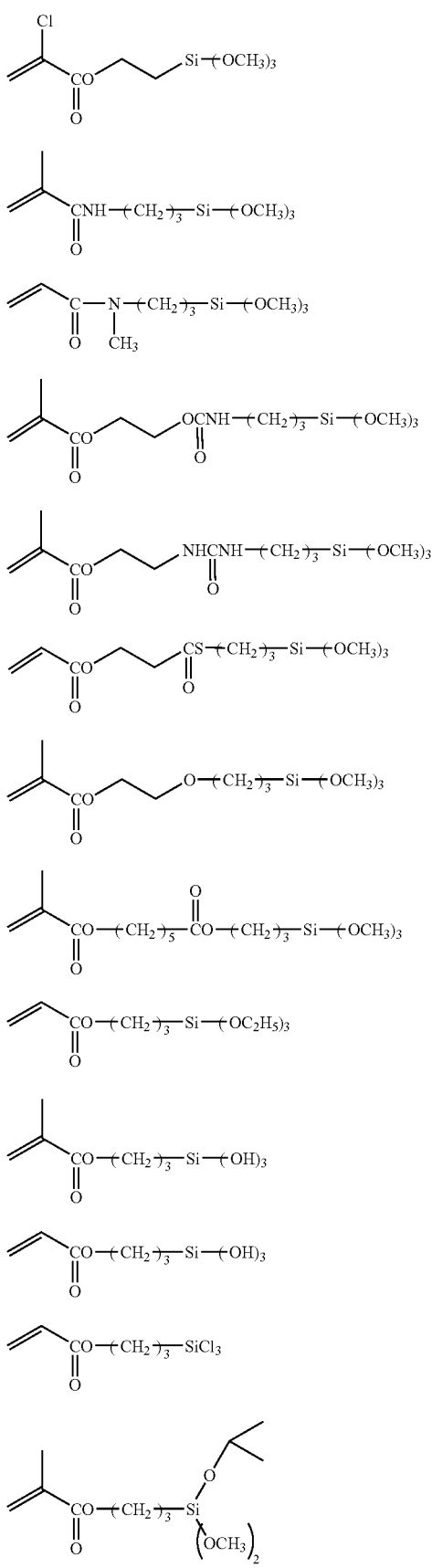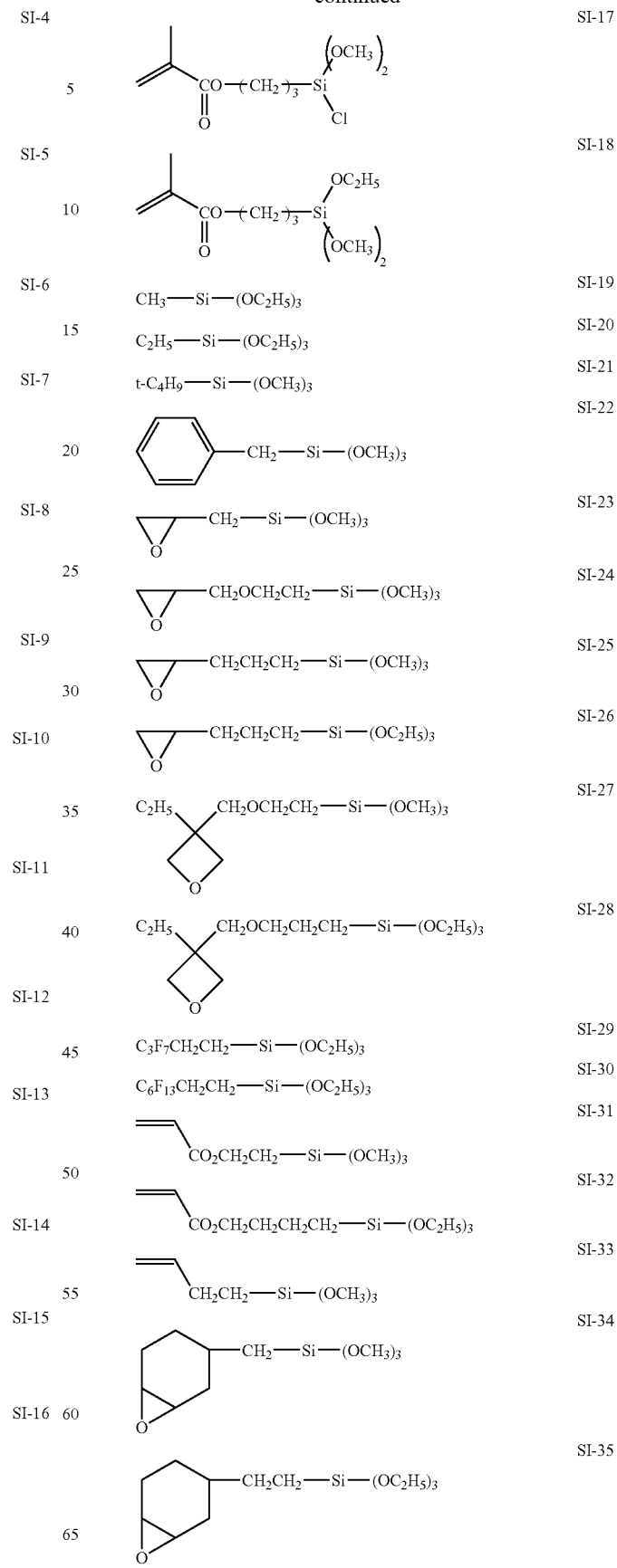

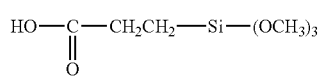 SI-36

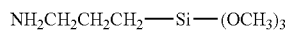 SI-37

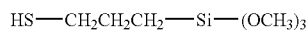 SI-38

SI-39

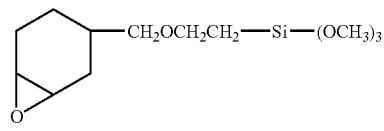

SI-40

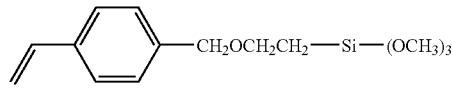

SI-41

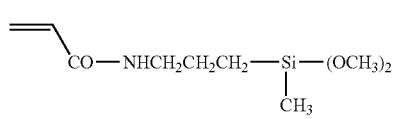

SI-42

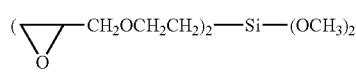

SI-43

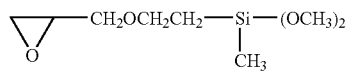

SI-44

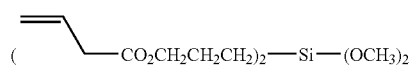

SI-45

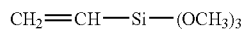

SI-46

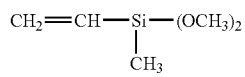

SI-47

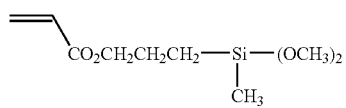

SI-48 Methyltrimethoxysilane

In order to obtain the intended effects of the invention, the content of the organosilane containing the vinyl polymerizable group in a hydrolysate and/or a partial condensate of organosilane is preferably 30 mass % to 100 mass %, more preferably 50 mass % to 100 mass %, and further preferably 70 mass % to 95 mass % of the total amount of the hydrolysate and/or the partial condensate of organosilane.

At least any of the hydrolysate and/or the partial condensate of organosilane is preferably suppressed in volatility for stabilizing the coated product performance. Specifically, the amount of volatilization per hour at 105° C. is preferably 5 mass % or less, more preferably 3 mass % or less, and in particular preferably 1 mass % or less.

The sol component for use in the invention is prepared by hydrolysis and/or partial condensation of the oiganosilane.

The hydrolysis condensation reaction is carried out by adding 0.05 to 2.0 mol, preferably 0.1 to 1.0 mol of water per mole of the hydrolyzable group (X), and stirring the mixture in the presence of a catalyst for use in the invention at 25 to 100° C.

In at least any of a hydrolysate and/or a partial condensate of the organosilane, the mass average molecular weight of any of a hydrolysate of organosilane containing a vinyl polymerzable group and a partial condensate thereof is preferably 450 to 20000, more preferably 500 to 10000, further preferably 550 to 5000, and further preferably 600 to 3000 when components with a molecular weight of less than 300 are excluded.

Herein, the mass average molecular weight and the molecular weight are the molecular weights expressed in polystyrene equivalents based on solvent THF, differential refractometer detection by means of a GPC analysis apparatus using columns of TSK gel GMHxL, TSK gel G4000HxL, and TSK gel G2000 HxL (all are trade names of the products manufactured by Tosoh Corporation). The content is the area % of the peak within the foregoing molecular weight range when the peak area of the components with a molecular weight of 300 or more is taken as 100%.

The degree of dispersion (mass average molecular weight/ number average molecular weight) is preferably 3.0 to 1.1, more preferably 2.5 to 1.1, further preferably 2.0 to 1.1, and in particular preferably 1.5 to 1.1.

The hydrolysates and partial condensates of the organosilane compounds for use in the invention will be described in details.

The hydrolysis reaction of organosilane, and the subsequent condensation reaction are generally carried out in the presence of a catalyst. As the catalysts, mention may be made of inorganic acids such as hydrochloric acid, sulfuric acid, and nitric acid; organic acids such as oxalic acid, acetic acid, butyric acid, maleic acid, citric acid, formic acid, methanesulfonic acid, and toluenesulfonic acid; inorganic bases such as sodium hydroxide, potassium hydroxide, and ammonia; organic bases such as triethylamine and pyridine; metal alkoxides such as triisopropoxy aluminum, tetrabutoxy zirconium, tetrabutyl titanate, and dibutyl tin dilaurate; a metal chelate compound having a metal such as Zr, Ti, or Al as a center metal, and the like; F-containing compounds such as KF and NH$_4$F, and the like.

The catalysts may be used alone, or used in combination of a plurality thereof.

The hydrolysis/condensation reaction of organosilane can be carried out without a solvent or in a solvent. However in order to uniformly mix the components, an organic solvent is preferably used. For example, alcohols, aromatic hydrocarbons, ethers, ketones, and esters are preferable.

The solvent is preferably the one which dissolves organosilane and the catalyst. Whereas, use of the organic solvent as a coating solution or a part of the coating solution is preferable from the viewpoint of the process. It is preferably the one which does not impair the solubility or dispersibility when mixed with other materials such as fluorine-containing polymers.

The reaction is carried out in the following manner. Per mole of a hydrolyzable group of organosilane, 0.05 to 2 mol, and preferably 0.1 to 1 mol of water is added. The mixture is stirred at 25 to 100° C. in the presence of or in the absence of the solvent, and in the presence of the catalyst.

To the coating solution for use in the invention, in addition to the composition containing the sol component and the metal chelate compound, at least any of a β-diketone compound and a β-ketoester compound is preferably added.

Preferably, the content of a hydrolysate and a partial condensate of the organosilane compound is small for the antireflection layer which is a relatively thin film, and large for the hard coat layer or the antiglare layer which is a thick film. In view of the expression of the effects, the refractive index, the shape and surface conditions of the film, and the like, the content is preferably 0.1 to 50 mass %, more preferably 0.5 to 30 mass %, and most preferably 1 to 15 mass % of the total solid content of the inclusion layer (addition layer).

<High Refractive Index Layer, Intermediate Refractive Index Layer>

The film of the invention has a high refractive index layer for enhancing the antireflection property. Further, an intermediate refractive index layer can also be provided.

In this specification, below, the high refractive index layer and the intermediate refractive index layer may be generically referred to as a high refractive index layer. Incidentally, in the invention, the terms "high", "intermediate", and "low" of the high refractive index layer, the intermediate refractive index layer, and the low refractive index layer, respectively, denote the relation in relative magnitude of refractive index among the layers. Further, in terms of the relation with the support, the refractive indices preferably satisfy the relation of support>low refractive index layer, high refractive index layer>support.

Whereas, in the invention, the intermediate refractive index layer is a layer which has a higher refractive index than that of the antiglare layer and has a lower refractive index than that of the high refractive index layer. It is preferably provided between the antiglare layer and the high refractive index layer.

From the foregoing description, when "antiglare layer/high refractive index layer/low refractive index layer" and the interference layer are in a two-layered configuration, they may be referred to as "antiglare layer/intermediate refractive index layer/low refractive index layer".

Further, in this specification, the high refractive index layer, the intermediate refractive index layer, and the low refractive index layer may be generically referred to as an antireflection layer.

In order to form the high refractive index layer and the low refractive index layer on the antiglare layer for manufacturing the optical film, the refractive index of the high refractive index layer can be 1.53 to 2.30 and is preferably 1.55 to 2.30, more preferably 1.55 to 2.00, and further preferably 1.55 to 1.70.

When the intermediate refractive index layer, the high refractive index layer, and the low refractive index layer are sequentially coated in the increasing order of distance from the support to form an optical film, the refractive index of the high refractive index layer is preferably 1.60 to 2.30, and further preferably 1.65 to 2.20. The refractive index of the intermediate refractive index layer is adjusted so as to be the value between the refractive index of the low refractive index layer and the refractive index of the high refractive index layer. The refractive index of the intermediate refractive index layer is preferably 1.55 to 1.80, more preferably 1.60 to 1.75 and further preferably 1.60 to 1.70.

The high refractive index layer and the intermediate refractive index layer for use in the invention preferably contain inorganic fine particles for controlling the refractive index and improving the coatability onto the antiglare layer. They are preferably formed in the following manner. In the dispersion prepared by dispersing the inorganic particles in the dispersion medium, preferably, a binder precursor (such as the ionizing radiation curable multifunctional monomer or multifunctional oligomer described later) necessary for the matrix formation, a photopolymerization initiator, and the like are further added to prepare coating solutions for forming the high refractive index layer and the intermediate refractive index layer. The resulting coating solutions for forming the high refractive index layer and the intermediate refractive index layer are coated on a transparent support, and cured by the crosslinking reaction or the polymerization reaction of an ionizing radiation curable compound (such as a multifunctional monomer or a multifunctional oligomer).

As the binder precursors for use in the high refractive index layer and the intermediate refractive index layer, the compounds described as the (compounds having polymerizable unsaturated bonds) can be preferably used. These compounds may be used in combination of two or more thereof.

The binder precursor of the high refractive index layer and the intermediate refractive index layer is preferably added in an amount of 5 to 80 mass % based on the solid content of the coating solution of the layer.

For the high refractive index layer and the intermediate refractive index layer, it is also possible to preferably use a binder precursor obtainable by the crosslinking or polymerization reaction of an ionizing radiation curable compound containing an aromatic ring, an ionizing radiation curable compound containing a halogen element other than fluorine (e.g., Br, I, or Cl), an ionizing radiation curable compound containing an atom such as S, N, or P, or the like.

(Inorganic Fine Particles)

In the invention, various kinds of inorganic fine particles can be used for controlling the refractive index, improving the film thickness uniformity upon coating on the antiglare layer, improving the cissing, and improving the physical characteristics such as the hardness, the optical characteristics such as reflectance and scattering property, and the like. The amount of the inorganic fine particles to be added to the high refractive index layer and the intermediate refractive index layer to be added is preferably 30 mass % to 90 mass %, further preferably 40 mass % to 80 mass %, and most preferably 50 mass % to 75 mass % based on the solid content of each layer. When the amount of the particles added is less than 30 mass %, undesirably, on the antiglare layer, cissing occurs and the film thickness uniformity is degraded. Two kinds or more inorganic particles may be used in combination in each layer.

As the inorganic fine particles, mention may be made of particles of oxides of at least one metal selected from silicon, zirconium, titanium, aluminum, indium, zinc, tin, and antimony, specific examples of which may include $SiO_2$, $ZrO_2$, $TiO_2$, $Al_2O_3$, $In_2O_3$, $ZnO$, $SnO_2$, $Sb_2O_3$, ITO, and ATO. Namely, in the invention, the high refractive index layer and the intermediate refractive index layer preferably contain oxide fine particles of at least one metal selected from Si, Al, Ti, Zr, Sb, Zn, Sn, and In. Alternatively, as the inorganic fine particles, other than these, $BaSO_4$, $CaCO_3$, talc, kaolin, and the like can also be used.

For forming the high refractive index layer and the intermediate refractive index layer, preferred is a cured product of a coating composition including inorganic particles having a high refractive index with the binder precursor, and an initiator, and an organic-substituted silicon compound dispersed in a solvent.

As the inorganic particles in this case, particularly, $ZrO_2$ or $TiO_2$ is preferably used from the viewpoint of the refractive index.

The particles of $TiO_2$ are in particular preferably inorganic particles containing at least one element selected from cobalt, aluminum, and zirconium, and containing $TiO_2$ as a main component. The main component denotes the component of which the content (mass %) is the highest of those of the components forming the particle.

The particles containing TiO2 as a main component in the invention has a refractive index of preferably 1.90 to 2.80, more preferably 2.10 to 2.80, and most preferably 2.20 to 2.80.

The crystal structure of the particle containing $TiO_2$ as a main component includes preferably a rutile, a rutile/anatase mixed crystal, anatase, or amorphous structure as a main component, and in particular preferably a rutile structure as a main component. The main component denotes the component of which the content (mass %) is the highest of those of the components forming the particle.

By allowing the particles containing $TiO_2$ as a main component to contain at least one element selected from Co (cobalt), Al (aluminum), and Zr (zirconium), it is possible to inhibit the photocatalyic activity possessed by $TiO_2$. This can improve the weather resistances of the film of the invention.

The particularly preferred element is Co (cobalt). Whereas, these elements may also be preferably used in combination of two or more thereof.

The inorganic particles containing $TiO_2$ as a main component of the invention may have a core/shell structure as described in JP-A-2001-166104 by the surface treatment.

The particle diameter of each inorganic fine particle for use in the invention has been preferably reduced to as small as possible in the dispersion medium. The weight average diameter is 1 to 200 nm, preferably 5 to 150 nm, further preferably 10 to 100 nm, and in particular preferably 10 to 80 nm. By reducing the size of the inorganic fine particles to 100 nm or less, it is possible to form a film not impairing the transparency. The particle diameter of each inorganic fine particle can be measured by means of a light scattering method or an electron micrograph.

The inorganic fine particle has a specific surface area of preferably 10 to 400 $m^2/g$, more preferably 20 to 200 $m^2/g$, and most preferably 30 to 150 $m^2/g$.

The inorganic fine particles for use in the invention are preferably added in the form of a dispersion in the dispersion medium to the coating solution for forming each layer.

As the dispersion medium for the inorganic fine particles, a liquid having a boiling point of 60 to 170° C. is preferably used. Examples of the dispersion medium include: water, alcohols (e.g., methanol, ethanol, isopropanol, butanol, and benzyl alcohol), ketones (e.g., acetone, methyl ethyl ketone, methyl isobutyl ketone, and cyclohexanone), esters (e.g., methyl acetate, ethyl acetate, propyl acetate, butyl acetate, methyl formate, ethyl formate, propyl formate, and butyl formate), aliphatic hydrocarbons (e.g., hexane and cyclohexane), hydrocarbon halides (e.g., methylene chloride, chloroform, and carbon tetrachloride), aromatic hydrocarbons (e.g., benzene, toluene, and xylene), amides (e.g., dimethylformamide, dimethylacetamide, and n-methylpyrrolidone), ethers (e.g., diethyl ether, dioxane, and tetrahydrofuran), and ether alcohols (e.g., 1-methoxy-2-propanol). Toluene, xylene, methyl ethyl ketone, methyl isobutyl ketone, cyclohexanone, and butanol are particularly preferred.

Particularly preferred dispersion media are methyl ethyl ketone, methyl isobutyl ketone, and cyclohexanone.

The inorganic fine particles are dispersed by means of a dispersing machine. Examples of the dispersing machine may include a sand grinder mill (e.g., a beads-mill equipped with pins), a high speed impeller mill, a pebble mill, a roller mill, an attritor, and a colloid mill. A sand grinder mill and a high speed impeller mill are particularly preferred. Whereas, a pre-dispersing treatment may also be performed. Examples of the dispersing machine to be used for the pre-dispersing treatment may include a ball mill, a three-roller mill, a kneader, and an extruder.

(Electrically Conductive Particles)

To the optical film of the invention, various electrically conductive particles can be used in order to impart the electrical conductivity thereto.

The electrically conductive particles are preferably formed from an oxide or a nitride of a metal. Examples of the oxide or the nitride of a metal may include tin oxide, indium oxide, zinc oxide, and titanium nitride. Tin oxide and indium oxide are particularly preferred. The electrically conductive inorganic particles can contain the metal oxide or nitride as a main component, and can further contain other elements. The main component denotes the component of which the content (mass %) is the highest of those of the components forming the particle. Examples of the other elements may include Ti, Zr, Sn, Sb, Cu, Fe, Mn, Pb, Cd, As, Cr, Hg, Zn, Al, Mg, Si, P, S, B, Nb, In, V, and a halogen atom. In order to enhance the electric conductivity of tin oxide and indium oxide, Sb, P, B, Nb, In, V, and a halogen atom are preferably added. Sb-containing tin oxide (ATO) and Sn-containing indium oxide (ITO) are particularly preferred. The proportion of Sb in ATO is preferably 3 to 20 mass %. The proportion of Sn in ITO is preferably 5 to 20 mass %.

The electrically conductive inorganic particles may be subjected to a surface treatment. The surface treatment is carried out by using an inorganic compound or an organic compound. Examples of the inorganic compound for use in the surface treatment may include alumina and silica. A silica treatment is particularly preferred. Examples of the organic compound for use in the surface treatment may include polyol, alkanolamine, stearic acid, a silane coupling agent, and a titanate coupling agent. The silane coupling agent is most preferred. Two or more surface treatments may be carried out in combination.

The electrically conductive inorganic particle preferably has a rice-grain shape, a spherical shape, a cubic shape, a spindle shape, or an indefinite shape. Whereas, the electrically conductive inorganic particles may be used in combination of two or more thereof in a specific layer or in the form of a film.

The electrically conductive inorganic particles can be used for forming the antistatic layer in the state of a dispersion.

In the invention, at least one layer of the thin film layers which the antireflection film has can be configured to be an electrically conductive layer. Namely, at least any layer of the low refractive index layer, the intermediate refractive index layer, and the high refractive index layer which are thin film layers are imparted with the electric conductivity, thereby to be converted into the electrically conductivity layer. This can simplify the process, and hence is very preferable. In this case, the material for the electrically conductive layer is preferably selected so that the film thickness and the refractive index of the layer satisfy the conditions for the previously described intermediate refractive index layer and high refractive index layer. The low refractive index layer is the surface layer or the surface vicinity layer of the antireflection film. For this reason, it is most preferable in view of the electrostatic prevention on the film surface that the low refractive index layer is imparted with the electric conductivity. However, electrically conductive particles and compounds are often materials with a high refractive index. Thus, unfavorably, it is difficult to obtain a desirable refractive index. Electrically conductive particles and compounds are materials with a high refractive index. For this reason, it is easy to impart the electric conductivity to the intermediate refractive index layer and the high refractive index layer.

It is possible to design the high refractive index layer and the intermediate refractive index layer each with an appropriate thickness according to the intended purpose. In order to form the high refractive index layer and the low refractive index layer in this order on the antiglare layer, and thereby manufacturing an optical film, the film thickness of the high refractive index layer is preferably 30 to 200 nm, more preferably 50 to 170 nm, and in particular preferably 60 to 150 nm.

When three layers of thin film layers of the intermediate refractive index layer, the high refractive index layer, and the low refractive index layer are coated in the order closer to the support, thereby to manufacture an optical film, the film thickness of the intermediate refractive index layer is preferably 30 to 150 nm, further preferably 40 to 100 nm, and most preferably 40 to 70 nm. The film thickness of the high refractive index layer is preferably 30 to 200 nm, further preferably 50 to 150 nm, and most preferably 90 to 140 nm.

As described above, when thin film layers having different refractive indices are stacked, thereby to implement the low reflectance by optical interference, it is preferable that a plurality of thin film layers each with a thickness of about 200 nm or less are stacked. These layers each have a thickness of as very small as 200 nm or less, and they are different from such a layer as to be referred to as an overcoat layer or a surface adjustment layer for controlling the unevenness of the antiglare layer. In this case, the unevenness shape in the antiglare layer in the invention is very important for the following reason. For the surface unevenness shape in a conventional antiglare layer, when the thin film layers are formed by coating, the film thickness nonuniformity of the thin film layers caused by the unevenness occurs, and the reflectance is not sufficiently reduced.

When the high refractive index layer and the intermediate refractive index layer do not contain particles imparting the antiglare function, they preferably have a lower haze. The haze is preferably 5% or less, further preferably 3% or less, and in particular preferably 1% or less.

The high refractive index layer and the intermediate refractive index layer are preferably formed on the transparent support directly, or with another layer interposed therebetween.

[Levelling Agent]

For at least one layer of the invention, various levelling agents are preferably used. Use for the high refractive index layer or the intermediate refractive index layer of the invention can improve the film thickness nonuniformity and cissing of the coating matters due to the surface unevenness of the antiglare layer. Namely, in the invention, the high refractive index layer preferably contains a levelling agent. Further, the intermediate refractive index layer preferably contains a levelling agent. Whereas, use for the antiglare layer enables improvement of the surface conditions (inconsistency prevention).

The levelling agent is specifically preferably a fluorine type levelling agent, or a silicone type levelling agent. Particularly, use of both of a fluorine type levelling agent and a silicone type levelling agent is more preferable because of its high effects of improving the film thickness nonuniformity and cissing. Further, as the levelling agent, an oligomer or a polymer is more preferable than a low molecular weight compound.

When a levelling agent is added, the levelling agent promptly moves to the surface of the coated solution film, and it is unevenly distributed. The levelling agent is still unevenly distributed on the surface also after drying. Therefore, each surface energy of the film of the high refractive index layer and the intermediate refractive index layer, and the antiglare layer to which the levelling agent has been added is reduced by the levelling agent. From the viewpoints of preventing the film thickness nonuniformity or cissing of the high refractive index layer and the intermediate refractive index layer, and inconsistency of the antiglare layer, a lower surface energy of the film is preferable.

The surface energy of the antiglare layer ($\gamma s^v$: unit, mJ/m$^2$) can be determined experimentally using pure water H$_2$O and methylene iodide CH$_2$I$_2$ on the antiglare layer with reference to *J. Appl. Polym. Sci.*, vol. 13, p. 1741 (1969) of D. K. Owens. At this step, the contact angles of pure water and methylene iodide are assumed to be $\theta_{H2O}$ and $\theta_{CH2I2}$, respectively. Thus, $\gamma s^d$ and $\gamma s^h$ are determined by the following simultaneous equations (1) and (2). The value $\gamma s^v$ ($=\gamma s^d + \gamma s^h$) expressed as the sum thereof is defined as the energy converted value of the surface tension of the antiglare layer (based on mJ/m$^2$ unit in place of mN/m unit). The sample is required to be subjected to humidity control for a given time or more under prescribed temperature and humidity conditions prior to the measurement. Preferably, the temperature at this step is 20° C. to 27° C., and the humidity falls within a range of 50 to 65 RH %. The humidity control time is preferably 2 hours or more.

$$1+\cos\theta_{H_2O} = 2\sqrt{\gamma s_d}(\sqrt{\gamma H_2O^d}/\gamma H_2O^v) + 2\sqrt{\gamma s^h}(\sqrt{\gamma H_2O^h}/\gamma H_2O^v) \tag{1}$$

$$1+\cos\theta_{CH_2I_2} = 2\sqrt{\gamma s^d}(\sqrt{\gamma CH_2I_2^d}/\gamma CH_2I_2^v) + 2\sqrt{\gamma s^h}(\sqrt{\gamma CH_2I_2^h}/\gamma CH_2I_2^v) \tag{2}$$

Where, $\gamma H_2O^d=21.8°$, $\gamma H_2O^h=51.0°$, $\gamma H_2O^v=72.8°$, $\gamma CH_2I_2^d=49.5°$, $\gamma CH_2I_2^h=1.3°$, $\gamma CH_2I_2^v=50.8°$.

The preferable surface energy of the high refractive index layer, the intermediate refractive index layer, and the antiglare layer falls within a range of 45 mJ/m$^2$ or less, more preferably within a range of 20 to 45 mJ/m$^2$, and further preferably within a range of 20 to 40 mJ/m$^2$. By setting the surface energy of the layer at 45 mJ/m$^2$ or less, effects of making uniform the thickness of the film on the antiglare layer and improving cissing can be obtained. However, when an upper layer such as a low refractive index layer is further coated on the layer to which the levelling agent is added, the levelling agent is preferably the one which flows out/moves to the upper layer. The surface energy of the layer after immersing the layer in the solvent (e.g., methyl ethyl ketone, methyl isobutyl ketone, toluene, or cyclohexane) of the coating solution for the upper layer overlying the layer to which the levelling agent is added, followed by rinsing is preferably rather higher. The surface energy is preferably 35 to 70 mJ/m$^2$.

Below, a preferable fluorine type levelling agent as the levelling agent will be described. A silicone type levelling agent will be described later.

(Fluorine Type Levelling Agent)

The fluorine type levelling agent is preferably a polymer having a fluoroaliphatic group, and further usefully a polymer of the repeating unit (polymerization unit) corresponding to the monomer of the following item (i), or an acrylic resin or a methacrylic resin containing the repeating unit polymerization unit) corresponding to the monomer of the following item (i) and the repeating unit (polymerization unit) corresponding to the monomer of the following item (ii), and a copolymer with a vinyl type monomer copolymerizable therewith. As such monomers, there can be used the ones described in *Polymer Handbook 2nd ed.*, J. Brandrup, Wiley Interscience issued in (1975), Second chapter, P. 1 to 483. For example, mention may be made of a compound having one addition polymerizable unsaturated bond selected from acrylic acid, methacrylic acid, acrylic acid esters, methacrylic acid esters, acrylamides, methacrylamides, allyl compounds, vinyl ethers, vinyl esters, and the like.

(i) Fluoroaliphatic group-containing monomer represented by the following general formula (4-1)

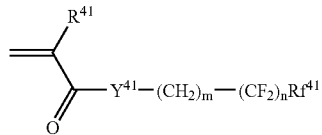

General Formula (4-1)

In the general formula (4-1), $R^{41}$ represents a hydrogen atom, a halogen atom, or a methyl group, and preferably a hydrogen atom or a methyl group. $Y^{41}$ represents an oxygen atom, a sulfur atom, or —N($R^{42}$)—, preferably an oxygen atom or —N($R^{42}$)—, and further preferably an oxygen atom. $R^{42}$ represents a hydrogen atom or an alkyl group having 1 to 8 carbon atoms which may have a substituent, more preferably a hydrogen atom or an alkyl group having 1 to 4 carbon atoms, and further preferably a hydrogen atom or a methyl group. $R_f^{41}$ represents —$CF_3$ or $CF_2H$.

In the general formula (4-1), m represents an integer of 1 to 6 preferably 1 to 3, and further preferably 1. n represent an integer of 1 to 11, preferably 1 to 9, and further preferably 1 to 6. $R_f^{41}$ is preferably —$CF_2H$.

Whereas, the (co)polymer having a fluoroaliphatic group may contain therein two or more kinds of polymerization units derived from the fluoroaliphatic group-containing monomer represented by the general formula (4-1) as the constituent components.

(ii) Monomer represented by the following general formula (4-2) copolymerizable with the foregoing (i):

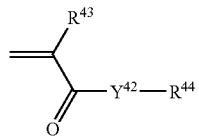

General Formula (4-2)

In the general formula (4-2), $R^{43}$ represents a hydrogen atom, a halogen atom, or a methyl group, and it is more preferably a hydrogen atom or a methyl group. $Y^{42}$ represents an oxygen atom, a sulfur atom, or —N($R^{45}$)—, and it is more preferably an oxygen atom or —N($R^{45}$)—, and further preferably an oxygen atom. $R^{45}$ represents a hydrogen atom or an alkyl group having 1 to 8 carbon atoms, and it is more preferably a hydrogen atom or an alkyl group having 1 to 4 carbon atoms, and further preferably a hydrogen atom or a methyl group. $R^{44}$ represents a straight chain, branched, or cyclic alkyl group having 1 to 60 carbon atoms which may have a substituent, or an aromatic group (e.g., a phenyl group or a naphthyl group) which may have a substituent. The alkyl group may contain a poly(alkyleneoxy) group. Further, it is more preferably a straight chain, branched, or cyclic alkyl group having 1 to 20 carbon atoms, and much preferably a straight chain or branched alkyl group having 1 to 10 carbon atoms. The amount of the fluoroaliphatic group-containing monomers represented by the general formula (4-1) for use in production of a (co)polymer having a preferable fluoroaliphatic group is 10 mass % or more, preferably 50 mass % or more, more preferably 70 to 100 mass %, and further preferably 80 to 100 mass % based on the total amount of the monomers of the copolymer.

Below, non-limiting specific structure examples of the (co) polymer having a preferable fluoroaliphatic group will be shown. Incidentally, the numerals in the formula shows the molar ratio of each monomer component. Mw represents the mass average molecular weight.

TABLE 1

$$-\left(CH_2-\underset{\underset{CO_2-CH_2-(CF_2)_n-H}{|}}{\overset{\overset{R}{|}}{C}}\right)_{100}-$$

| | R | n | Mw |
|---|---|---|---|
| FP-1 | H | 4 | 8000 |
| FP-2 | H | 4 | 16000 |
| FP-3 | H | 4 | 33000 |
| FP-4 | $CH_3$ | 4 | 12000 |
| FP-5 | $CH_3$ | 4 | 28000 |
| FP-6 | H | 6 | 8000 |
| FP-7 | H | 6 | 14000 |
| FP-8 | H | 6 | 29000 |
| FP-9 | $CH_3$ | 6 | 10000 |
| FP-10 | $CH_3$ | 6 | 21000 |
| FP-11 | H | 8 | 4000 |
| FP-12 | H | 8 | 16000 |
| FP-13 | H | 8 | 31000 |
| FP-14 | $CH_3$ | 8 | 3000 |
| FP-15 | $CH_3$ | 8 | 10000 |
| FP-16 | $CH_3$ | 8 | 27000 |
| FP-17 | H | 10 | 5000 |
| FP-18 | H | 10 | 11000 |
| FP-19 | $CH_3$ | 10 | 4500 |
| FP-20 | $CH_3$ | 10 | 12000 |
| FP-21 | H | 12 | 5000 |
| FP-22 | H | 12 | 10000 |
| FP-23 | $CH_3$ | 12 | 5500 |
| FP-24 | $CH_3$ | 12 | 12000 |

TABLE 2

$$-\left(CH_2-\underset{\underset{CO_2-(CH_2)_p-(CF_2)_q-H}{|}}{\overset{\overset{R^1}{|}}{C}}\right)_x-\left(CH_2-\underset{\underset{CO_2-(CH_2)_r-(CF_2)_s-H}{|}}{\overset{\overset{R^2}{|}}{C}}\right)_{100-x}-$$

| | x | $R^1$ | p | q | $R^3$ | r | s | Mw |
|---|---|---|---|---|---|---|---|---|
| FP-25 | 50 | H | 1 | 4 | $CH_3$ | 1 | 4 | 10000 |
| FP-26 | 40 | H | 1 | 4 | H | 1 | 6 | 14000 |
| FP-27 | 60 | H | 1 | 4 | $CH_3$ | 1 | 6 | 21000 |
| FP-28 | 10 | H | 1 | 4 | H | 1 | 8 | 11000 |
| FP-29 | 40 | H | 1 | 4 | H | 1 | 8 | 16000 |
| FP-30 | 20 | H | 1 | 4 | $CH_3$ | 1 | 8 | 8000 |
| FP-31 | 10 | $CH_3$ | 1 | 4 | $CH_3$ | 1 | 8 | 7000 |
| FP-32 | 50 | H | 1 | 6 | $CH_3$ | 1 | 6 | 12000 |
| FP-33 | 50 | H | 1 | 6 | $CH_3$ | 1 | 6 | 22000 |
| FP-34 | 30 | H | 1 | 6 | $CH_3$ | 1 | 6 | 5000 |
| FP-35 | 40 | $CH_3$ | 1 | 6 | H | 3 | 6 | 8000 |
| FP-36 | 10 | H | 1 | 6 | H | 1 | 8 | 7000 |
| FP-37 | 30 | H | 1 | 6 | H | 1 | 8 | 17000 |
| FP-38 | 50 | H | 1 | 6 | H | 1 | 8 | 16000 |
| FP-39 | 50 | $CH_3$ | 1 | 6 | H | 3 | 8 | 19000 |
| FP-40 | 50 | H | 1 | 8 | $CH_3$ | 1 | 8 | 5000 |
| FP-41 | 80 | H | 1 | 8 | $CH_3$ | 1 | 8 | 10000 |
| FP-42 | 50 | $CH_3$ | 1 | 8 | H | 3 | 8 | 14000 |
| FP-43 | 90 | H | 1 | 8 | $CH_3$ | 3 | 8 | 9000 |
| FP-44 | 70 | H | 1 | 8 | H | 1 | 10 | 7000 |
| FP-45 | 90 | H | 1 | 8 | H | 3 | 10 | 12000 |
| FP-46 | 50 | H | 1 | 8 | H | 1 | 12 | 10000 |
| FP-47 | 70 | H | 1 | 8 | $CH_3$ | 3 | 12 | 8000 |

TABLE 3

$$-\left(CH_2-\underset{\underset{CO_2-CH_2-(CF_2)_n-H}{|}}{\overset{R^1}{\underset{|}{C}}}\right)_x-\left(CH_2-\underset{\underset{CO_2-R^3}{|}}{\overset{R^2}{\underset{|}{C}}}\right)_{100-x}$$

|  | x | $R^1$ | n | $R^2$ | $R^3$ | Mw |
|---|---|---|---|---|---|---|
| FP-48 | 90 | H | 6 | H | $C_2H_5$ | 9000 |
| FP-49 | 80 | H | 6 | H | $C_2H_5$ | 24000 |
| FP-50 | 60 | H | 6 | H | $C_2H_5$ | 36000 |
| FP-51 | 90 | H | 6 | H | $C_4H_9(n)$ | 15000 |
| FP-52 | 80 | H | 6 | H | $C_4H_9(n)$ | 17000 |
| FP-53 | 60 | H | 6 | H | $C_4H_9(n)$ | 10000 |
| FP-54 | 90 | H | 6 | H | $C_4H_9(iso)$ | 16000 |
| FP-55 | 80 | H | 6 | H | $C_4H_9(iso)$ | 16000 |
| FP-56 | 60 | H | 6 | H | $C_4H_9(iso)$ | 21000 |
| FP-57 | 90 | H | 6 | H | $C_4H_9(t)$ | 14000 |
| FP-58 | 80 | H | 6 | H | $C_4H_9(t)$ | 12000 |
| FP-59 | 60 | H | 6 | H | $C_4H_9(t)$ | 13000 |
| FP-60 | 90 | H | 6 | H | $C_6H_{13}(n)$ | 10000 |
| FP-61 | 80 | H | 6 | H | $C_6H_{13}(n)$ | 8000 |
| FP-62 | 60 | H | 6 | H | $C_6H_{13}(n)$ | 12000 |
| FP-63 | 80 | H | 4 | H | $C_2H_5$ | 25000 |
| FP-64 | 80 | H | 4 | H | $C_4H_9(n)$ | 32000 |
| FP-65 | 80 | H | 4 | H | $C_4H_9(iso)$ | 28000 |
| FP-66 | 80 | H | 4 | H | $C_4H_9(t)$ | 25000 |
| FP-67 | 80 | H | 4 | H | $C_6H_{13}(n)$ | 20000 |
| FP-68 | 80 | H | 8 | H | $C_2H_5$ | 5000 |
| FP-69 | 80 | H | 8 | H | $C_4H_9(n)$ | 6000 |
| FP-70 | 80 | H | 8 | H | $C_4H_9(iso)$ | 5000 |
| FP-71 | 80 | H | 8 | H | $C_4H_9(t)$ | 7000 |
| FP-72 | 80 | H | 8 | H | $C_6H_{13}(n)$ | 5000 |
| FP-78 | 80 | H | 4 | $CH_3$ | $C_2H_5$ | 12000 |
| FP-79 | 80 | H | 4 | $CH_3$ | $C_4H_9(n)$ | 14000 |
| FP-80 | 80 | H | 4 | $CH_3$ | $C_4H_9(iso)$ | 20000 |
| FP-81 | 80 | H | 4 | $CH_3$ | $C_4H_9(t)$ | 22000 |
| FP-82 | 80 | H | 4 | $CH_3$ | $C_6H_{13}(n)$ | 18000 |
| FP-83 | 80 | $CH_3$ | 4 | $CH_3$ | $C_2H_5$ | 8000 |
| FP-84 | 80 | $CH_3$ | 4 | $CH_3$ | $C_4H_9(n)$ | 8000 |
| FP-85 | 80 | $CH_3$ | 4 | $CH_3$ | $C_4H_9(iso)$ | 7000 |
| FP-86 | 80 | $CH_3$ | 4 | $CH_3$ | $C_4H_9(t)$ | 12000 |
| FP-87 | 80 | $CH_3$ | 4 | $CH_3$ | $C6H13(n)$ | 5000 |

The amount of the polymerization units of the fluoroaliphatic group-containing monomers forming the (co)polymer having a fluoroaliphatic group is preferably more than 10 mass %, and more preferably 50 to 100 mass %. It is most preferably 75 to 100 mass % when importance is placed on the prevention of the unevenness of the antiglare layer. Whereas, it is most preferably 50 to 75 mass % when the low refractive index layer is coated on the antiglare layer (described based on the total amount of the polymerization units forming the (co)polymer having a fluoroaliphatic group).

(Silicone Type Levelling Agent)

Then, a silicone type levelling agent will be described.

Preferred examples of the silicone type compound may include the ones having a plurality of dimethylsilyloxy units as repeating units, and having a substituent at the terminal of the compound chain and/or the side chain thereof. The compound chain containing dimethylsilyloxy as a repeating unit may contain therein other structural unit than dimethylsilyloxy. The substituents may be the same or different, and a plurality of the substituents are preferably present. Preferred examples of the substituent may include the groups containing a polyether group, an alkyl group, an aryl group, an aryloxy group, an acryloyl group, a methacryloyl group, a vinyl group, an aryl group, a cinnamoyl group, an epoxy group, an oxetanyl group, a hydroxyl group, a fluoroalkyl group, a polyoxyalkylene group, a carboxyl group, an amino group, and the like.

The molecular weight has no particular restriction. However, it is preferably 100,000 or less, more preferably 50,000 or less, in particular preferably 1000 to 30000, and most preferably 10000 to 20000.

The silicon atom content of the silicone type compound has no particular restriction. However, it is preferably 18.0 mass % or more, in particular preferably 25.0 to 37.8 mass %, and most preferably 30.0 to 37.0 mass %.

Preferred non-limiting examples of the silicone type compound may include "X-22-174DX", "X-22-2426", "X-22-164B", "X22-164C" "X-22-170DX", "X-22-176D", and "X22-1821", (all are trade names) manufactured by Shin-Etsu Chemical Co., Ltd.; "FM-0725", "FM-7725", "FM-4421", "FM-5521", "FM-6621", and "FM-1121", (all are trade names) manufactured by Chisso Corporation; "DMS-U22", "RMS-033", "RMS-083", "UMS-182", "DMS-H21", "DMS-H31", "HMS-301", "FMS121", "FMS123", "FMS131", "FMS141", and "FMS221", (all are trade names), manufactured by Gelest Co.; "SH200", "DC11PA", "SH28PA", "ST80PA", "ST86PA", "ST97PA2, "SH550", "SH710", "L7604", "FZ-2105", "FZ-2123", "FZ2162", "FZ-2191", "FZ-2203", "FZ-2207", "FZ-3704", "FZ-3736", "FZ-3501", "FZ-3789", "L-77", "L-720", "L-7001", "L-7002", "L-7604", "Y-7006", "SS-2801", "SS-2802", "SS-2803", "SS-2804", and "SS-2805" (all are trade names), manufactured by Dow Corning Toray Co., Ltd.; and "TSF400", "TSF401", "TSF410", "TSF433", "TSF4450", and "TSF4460", (all are trade names), manufactured by GE Toshiba Silicone Co.

The amount of the fluorine-containing levelling agent or the silicone type levelling agent to be added based on the amount of the coating solution is preferably 0.001 to 1.0 mass %, and more preferably 0.01 mass % to 0.2 mass % when the levelling agent is used for the hard coat layer and the antiglare layer. The agent is preferably added in an amount of 0.1 to 5.0 mass %, and more preferably added in an amount of 0.1 to 3.0 mass % based on the solid content when it is used for the intermediate refractive index layer, the high refractive index layer, and the low refractive index layer.

(Dispersant)

For dispersion of the particles for use in the invention, various dispersants can be used.

The dispersant preferably further contains a crosslinkable or polymerizable functional group. As the crosslinkable or polymerizable functional groups, mention may be made of ethylenically unsaturated groups capable of addition reaction/polymerization reaction by radical species (such as a (meth)acryloyl group, an allyl group, a styryl group, and a vinyloxy group), cationic polymerizable groups (such as an epoxy group, an oxatanyl group, and a vinyloxy group), and polycondensable groups (such as a hydrolyzable silyl group and an N-methylol group). Preferred are functional groups having ethylenically unsaturated groups.

For the dispersion of inorganic particles, particularly, for the dispersion of the inorganic particles containing $TiO_2$ as a main component, dispersants having anionic groups are preferably used. The dispersants more preferably have anionic groups, and crosslinkable or polymerizable functional groups, and in particular preferably, the dispersants are the dispersants having the crosslinkable or polymerizable groups at the side chains.

The anionic groups are effectively groups having acidic protons such as a carboxyl group, a sulfonic acid group (sulfo), a phosphoric acid group (phosphono), and a sulfonamido group, or salts thereof, especially preferably, a carboxyl group, a sulfonic acid group, and a phosphoric acid group, or salts thereof, and in particular preferably a carboxyl group and a phosphoric acid group. A plurality of anionic groups may be contained per molecule in the dispersant, however, the number of anionic groups per molecule contained in the dispersant is, on an average, preferably 2 or more, more preferably 5 or more, and in particular preferably 10 or more. As for the anionic groups to be contained in the dispersant, a plurality of types of anionic groups may also be contained per molecule.

In the dispersant having anionic groups in the side chains, the composition ratio of anionic group-containing repeating units is in the range of $10^{-4}$ to 100 mol %, preferably 1 to 50 mol %, and in particular preferably 5 to 20 mol % based on the total amount of the repeating units.

The dispersant preferably further contains a crosslinkable or polymerizable functional group. As the crosslinkable or polymerizable functional groups, mention may be made of ethylenically unsaturated groups capable of addition reaction/polymerization reaction by radical species (such as a (meth)acryloyl group, an allyl group, a styryl group, and a vinyloxy group), cationic polymerizable groups (such as an epoxy group, an oxatanyl group, and a vinyloxy group), and polycondensable groups (such as a hydrolyzable silyl group and an N-methylol group). Preferred are functional groups having ethylenically unsaturated groups.

The number of the crosslinkable or polymerizable functional groups contained per molecule in the dispersant is, on an average, preferably 2 or more, more preferably 5 or more, and in particular preferably 10 or more. Whereas, as for the crosslinkable or polymerizable functional groups to be contained in the dispersant, a plurality of kinds thereof may also be contained per molecule.

In the preferred dispersant for use in the invention, examples of the repeating unit having an ethylenically unsaturated group at the side chain may include repeating units of poly-1,2-butadiene and poly-1,2-isoprene structures or (meth)acrylic acid esters or amides. The ones in each of which a specific residue (R group of —COOR or —CONHR) is bonded thereto are usable. Examples of the specific residue (R group) may include: —$(CH_2)_n$—$CR^{21}$=$CR^{22}R^{23}$, —$(CH_2O)_n$—$CH_2CR^{21}$=$CR^{22}R^{23}$, —$(CH_2CH_2O)_n$—$CH_2CR^{21}$=$CR^{22}R^{23}$, —$(CH_2)_n$—NH—CO—O—$CH_2CR^{21}$=$CR^{22}R^{23}$, —$(CH_2)_n$—O—CO—$CR^{21}$=$CR^{22}R^{23}$, and —$(CH_2CH_2O)_2$—X (where each of $R^{21}$ to $R^{23}$ is a hydrogen atom, a halogen atom, or an alkyl group, an aryl group, an alkoxy group, or an aryloxy group, having 1 to 20 carbon atoms, and $R^{21}$ and $R^{22}$ or $R^{23}$ may also combine with each other to form a ring; n is an integer of 1 to 10; and X is a dicyclopentadiene residue.). Specific examples of R in the ester residue may include: —$CH_2CH$=$CH_2$ (corresponding to allyl(meth)acrylate polymer described in JP-A-64-17047), —$CH_2CH_2O$—$CH_2CH$=$CH_2$, —$CH_2CH_2OCOCH$=$CH_2$, —$CH_2CH_2OCOC(CH_3)$=$CH_2$, —$CH_2C(CH_3)$=$CH_2$, —$CH_2CH$=$CH$—$C_6H_5$, —$CH_2CH_2OCOCH$=$CH$—$C_6H_5$, —$CH_2CH_2$—NH-COO—$CH_2CH$=$CH_2$, and $CH_2CH_2O$—X (where X is a dicyclopentadienyl residue). Specific examples of R in the amide residue may include: —$CH_2CH$=$CH_2$, —$CH_2CH_2$—Y (where Y is a 1-cyclohexenyl residue), and —$CH_2CH_2$—OCO—CH=$CH_2$, and —$CH_2CH_2$—OCO—$C(CH_3)$=$CH_2$.

In the dispersant having the ethylenically unsaturated group, to the unsaturated bond group, a free radical (a polymerization initiator radial or a growing radical in the process of polymerization of a polymerizable compound) is added, and addition polymerization occurs directly or through chain polymerization of the polymerizable compound between the molecules. This results in the formation of crosslinking, which causes curing. Alternatively, the atoms in the molecules (such as hydrogen atoms on the carbon atoms adjacent to the unsaturated bond groups) are attracted by free radicals to generate polymer radicals. These combine with each other to form crosslinking between the molecules, which causes curing.

The weight average molecular weight (Mw) of the dispersant having anionic groups, and crosslinkable or polymerizable functional groups, and having the crosslinkable or polymerizable functional groups at side chains has no particular restriction. However, it is preferably 1000 or more. The weight average molecular weight (Mw) of the dispersant is more preferably 2000 to 1000000, further preferably 5000 to 200000, and in particular preferably 10000 to 100000.

The crosslinkable or polymerizable functional group-containing units may constitute all the repeating units other than the anionic group-containing repeating units. However, these account for 5 to 50 mol %, and in particular preferably 5 to 30 mol % of the total amount of the crosslinkable or polymerizable repeating units.

The dispersants may be copolymers with appropriate monomers other than the monomers having the crosslinkable or polymerizable functional groups and the anionic groups. The copolymerizable components have no particular restriction. However, these are selected from various viewpoints such as the dispersion stability, the compatibility with other monomer components, and the strength of the formed film. Preferred examples thereof may include methyl(meth)acrylate, n-butyl(meth)acrylate, t-butyl(meth)acrylate, cyclohexyl(meth)acrylate, and styrene.

The forms of the dispersants have no particular restriction. However, the dispersants are preferably block copolymers or random copolymers, and in particular preferably random copolymers in terms of the cost and the ease of synthesis.

The amount of the dispersant to be used based on the amount of the inorganic particles preferably falls within a range of 1 to 50 mass %, more preferably falls within a range of 5 to 30 mass %, and most preferably falls within a range of 5 to 20 mass % based on the solid content. Further, the dispersants may be used in combination of two or more thereof.

Below, specific examples of the dispersant to be preferably used in the invention will be shown. However, the dispersant of the invention is not limited thereto. Incidentally each represents a random copolymer unless otherwise specified.

| | x | y | z | R | Mw |
|---|---|---|---|---|---|
| P-(1) | 80 | 20 | 0 | — | 40,000 |
| P-(2) | 80 | 20 | 0 | — | 110,000 |
| P-(3) | 80 | 20 | 0 | — | 10,000 |
| P-(4) | 90 | 10 | 0 | — | 40,000 |
| P-(5) | 50 | 50 | 0 | — | 40,000 |
| P-(6) | 30 | 20 | 50 | $CH_2CH_2CH_3$ | 30,000 |
| P-(7) | 20 | 30 | 50 | $CH_2CH_2CH_2CH_3$ | 50,000 |
| P-(8) | 70 | 20 | 10 | $CH(CH_3)_3$ | 60,000 |
| P-(9) | 70 | 20 | 10 | —$CH_2CHCH_2CH_2CH_2CH_3$ \| $CH_2CH_3$ | 150,000 |

-continued

| | | | | | |
|---|---|---|---|---|---|
| | ![structure](x,y,z terpolymer with CO2CH2CH=CH2, CO2H, COOR) | | | | |
| | x | y | z | R | Mw |
| P-(10) | 40 | 30 | 30 | —CH2—C6H5 | 15,000 | x/y/z represents the molar ratio.

| | ![structure](80/20 copolymer with CO2CH2CH=CH2 and A) | |
|---|---|---|
| | A | Mw |
| P-(11) | —CH2—CH(COOH)— | 20,000 |
| P-(12) | —CH2—CH(CO2CH2CH2COOH)— | 30,000 |
| P-(13) | —CH2—CH(C6H4-SO3Na)— | 100,000 |
| P-(14) | —CH2—C(CH3)(CO2CH2CH2SO3H)— | 20,000 |

-continued

| | | Mw |
|---|---|---|
| P-(15) | —CH2—C(CH3)(CO2CH2CH2OP(O)(OH)2)— | 50,000 |
| P-(16) | —CH2—CH(CO2CH2CH2O(CH2)5OP(O)(OH)2)— | 15,000 |

| | ![structure](80/20 copolymer with A and C(CH3)COOH) | |
|---|---|---|
| | A | Mw |
| P-(17) | —CH2—C(CH3)(COOCH2CH2OCH=CH—C6H5)— | 20,000 |
| P-(18) | —CH2—CH(COOCH2CH2OCCH2CH=CH2)— | 25,000 |
| P-(19) | —CH2—C(CH3)(COO—CH2—C6H4—CH=CH2)— | 18,000 |
| P-(20) | —CH2—CH(C6H4-OCCH2CH=CH2)— | 20,000 |
| P-(21) | —CH2—CH(CONHCH2CH2OCCH=CH2)— | 35,000 |

| | ![terpolymer structure with COOR1, COOH, COOR2] | | | | | |
|---|---|---|---|---|---|---|
| | R1 | R2 | x | y | z | Mw |
| P-(22) | —CH2CH2OCCH=CH2 | C4H9(n) | 10 | 10 | 80 | 25,000 |
| P-(23) | —CH2CH2OCCH=CH2 | C4H9(t) | 10 | 10 | 80 | 25,000 |

-continued
| | Structure | R | a | b | c | Mw |
|---|---|---|---|---|---|---|
| P-(24) | 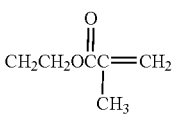 | C₄H₉(n) | 10 | 10 | 80 | 500,000 |
| P-(25) | 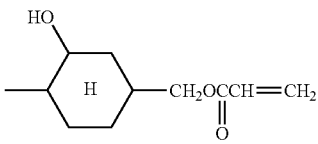 | C₄H₉(n) | 10 | 10 | 80 | 23,000 |
| P-(26) | 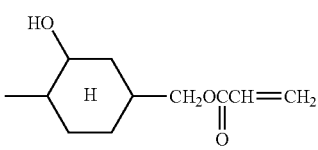 | C₄H₉(n) | 80 | 10 | 10 | 30,000 |
| P-(27) | 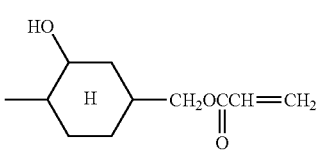 | C₄H₉(n) | 50 | 20 | 30 | 30,000 |
| P-(28) | 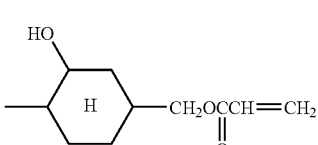 | C₄H₉(t) | 10 | 10 | 80 | 20,000 |
| P-(29) | 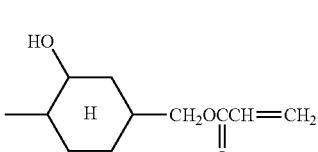 | CH₂CH₂OH | 50 | 10 | 40 | 20,000 |
| P-(30) | 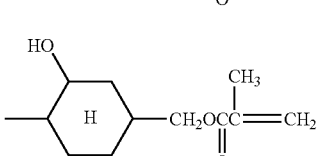 | C₄H₉(n) | 10 | 10 | 80 | 25,000 |
| | Structure | Mw |
|---|---|---|
| P-(31) | 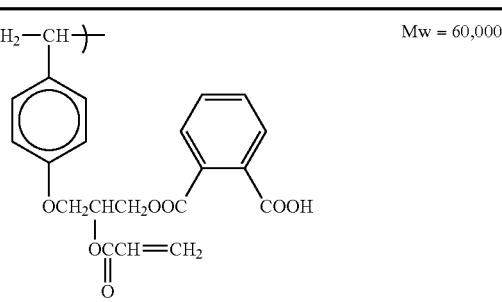 | Mw = 60,000 |
| P-(32) | 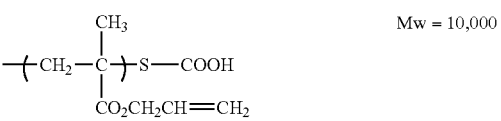 | Mw = 10,000 |
| P-(33) | 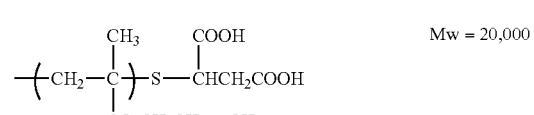 | Mw = 20,000 |

| | | |
|---|---|---|
| P-(34) | $-\!\!+\!\!CH_2-CH+_{80}\ \ +CH_2-CH+_{20}$<br>　　　　　$CO_2CH_2CH\!=\!CH_2$　$CO_2CH_2CH_2COOH$ | Mw = 30,000<br>(Block copolymer) |
| P-(35) | 　　　　　$CH_3$　　　　　COOH<br>$-\!\!+\!\!CH_2-C+_{80}\ \ +CH_2CH+_{20}$<br>　　　　　$CO_2CH_2CH_2OCCH\!=\!CH_2$<br>　　　　　　　　　　$\|$<br>　　　　　　　　　　$O$ | Mw = 15,000<br>(Block copolymer) |
| P-(36) | 　　　$CH_3$　　　　　　　$CH_3$<br>$-\!\!+\!\!CH_2-C+_{80}\ \ \triangle\ \ +CH_2-C+_{20}$<br>　　　$CO_2CH_2-$　　　　　$CO_2H$ | Mw = 8,000 |
| P-(37) | 　　　$CH_3$　　　　$CH_3$<br>$-\!\!+\!\!CH_2-C+_{80}\ \ +CH_2-C+_{20}$<br>　　　　　　　　　　COOH<br>　　　$CO_2CH_2CH_2CH_2Si(OCH_2CH_3)_3$ | Mw = 5,000 |
| P-(38) | $-\!\!+\!\!CH-CH_2-O+_{80}\ \ +CH-CH-O+_{20}$<br>　$\|$　　　　　　　　　$CH_2O\!-\!(CH_2)_{\overline{3}}\!-\!Si(OCH_2CH_3)_3$<br>　$CH_2-O\!-\!(CH_2)_{\overline{3}}\!-\!OCCH\!=\!CH_2$<br>　　　　　　　　$\|$<br>　　　　　　　　$O$ | Mw = 10,000 |

<Support>

Specific examples of the support for use in the invention may include polyester type polymers such as polyethylene terephthalate and polyethylene naphthalate, cellulose type polymers such as diacetyl cellulose and triacetyl cellulose, acrylic type polymers such as polymethyl methacrylate, styrene type polymers such as polystyrene and AS resins, and polycarbonate type polymers. Further, mention may be made of polyolefin type polymers such as polyethylene, polypropylene, cyclo type or norbornene structure containing polyolefin, ethylene-propylene copolymer, sulfone type polymers, polyether sulfone type polymers, polyether ketone type polymers, polyphenylene sulfide type polymers, vinyl alcohol type polymers, vinylidene chloride type polymers, vinyl butyral type polymers, acrylate type polymers, polyoxymethylene type polymers, epoxy type polymers, and the like.

The thickness of the support has no particular restriction. However, it is preferably set at 20 to 150 μm, and further preferably set at 40 to 80 μm.

(Layer Structure of Optical Film)

The optical film (antireflection film) of the invention is configured such that at least one antireflection layer is stacked on a transparent support (which may be hereinafter referred to as a "base material") in view of the refractive index, the film thickness, the number of layers, the order of layers, and the like.

The optical film of the invention is configured by combining the antireflection layer with an intermediate refractive index layer and a high refractive index layer having a higher refractive index than that of the base material, and a low refractive index layer having a lower refractive index than that of the base material. As examples of the structure, there are: two-layered structure of high refractive index layer/low refractive index layer from the base material side, a structure in which three layers having different refractive indices are stacked in the order of intermediate refractive index layer (a layer having a higher refractive index than that of the base material or the hard coat layer, and a lower refractive index than that of the high refractive index layer)/high refractive index layer/low refractive index layer, and other structures. A structure including a further larger number of antireflection layers stacked therein has also been proposed. Out of these, from the viewpoints of the durability, the optical characteristics, the cost, the productivity, and the like, it is preferable to coat antiglare layer/intermediate refractive index layer/high refractive index layer/low refractive index layer in this order on a base material having a hard coat layer. Further, it is also preferable to impart the hard coat property to the antiglare layer, and thereby to form a hard coating antiglare layer.

Preferred examples of the layer structure of the optical film of the invention will be shown below. In the following structures, the base material film functions as a support. Further, in the following structures, the one expressed as (antistatic layer) is configured such that a layer having other functions also has the function of the antistatic layer. By allowing the antistatic layer to have other functions than the antistatic property, it is possible to reduce the number of layers to be formed. For this reason, the structure improves the productivity, and hence it is preferable.

Support/antiglare layer/high refractive index layer/low refractive index layer,

Support/antiglare layer/intermediate refractive index layer/high refractive index layer/low refractive index layer Support/antiglare layer/high refractive index layer/low refractive index layer, /high refractive index layer/low refractive index layer, Support/hard coat layer/antiglare layer/high refractive index layer/low refractive index layer, Support/hard coat layer/antiglare layer/intermediate refractive index layer/high refractive index layer/low refractive index layer, Support/antiglare layer/high refractive index layer (antistatic layer)/low refractive index layer, Support/antiglare layer/intermediate refractive index layer (antistatic layer)/high refractive index layer/low refractive index layer, Support/antistatic layer/antiglare layer/intermediate refractive index layer/high refractive index layer/low refractive index layer, and Antistatic layer/support/antiglare layer/intermediate refractive index layer/high refractive index layer/low refractive index layer, The structure is not particularly limited to these layer structures so long as it can reduce the reflectance by optical interference.

The optical film of the invention is characterized in that the arithmetic average roughness (Ra) of the optical film is 0.03 μm<Ra<0.4 μm, the average distance of the unevenness (Sm) is 80 μm<Sm<700 μm, the area of 0°<θ<0.5° (θ (0.5)) when the tilting angle θ of the unevenness is measured is 40% or more, and the integral reflectance of the optical film is 1.5% or less.

When light transmissive particles of which the average particle diameter is larger than the average film thickness of the antiglare layer are used for imparting the antiglare property, 0.10 μm<Ra<0.40 μm is preferable, and 0.15<Ra<0.35 μm is further preferable from the viewpoint of imparting the antiglare properly. In view of glare, whitening of the surface when external light is reflected, and the like, other than imparting of the antiglare property, 0.05<Ra<0.30 μm is preferable, 0.05<Ra<0.25 μm is further preferable, and 0.05 μm<Ra<0.15 μm is most preferable. Further, In order to implement both the antiglare property and the uniform lamination of thin film interference layers by an increase in proportion of the flat parts of the film surface, the average distance of the unevenness (Sm) is preferably 150 μm<Sm<700 μm, and most preferably 200 μm<Sm<600 μm.

In the invention, the region of 0°<θ<0.5° (θ (0.5)) where θ is the tilting angle of the unevenness preferably accounts for 45% or more (preferably less than 98%). As for θ (0.5), 45% or more and less than 98% is preferable, 50% or more and less than 98% is more preferable, 60% or more and less than 98% is further preferable, and 70% or more and less than 98% is in particular preferable.

The integral reflectance of the optical film is further preferably 0.01 to 1.0%, and most preferably 0.01 to 0.75%.

When the arithmetic average roughness (Ra) of the optical film is 0.03 μm or less, the unevenness of the surface is too small, so that the antiglare property cannot be sufficiently obtained. When it is 0.4 μm or more, problems of glare, whitening of the surface when external light is reflected, and the like, and reduction of the interference ability due to film thickness nonuniformity of the thin film layers according to the unevenness occur.

An average distance of the unevenness (Sm) of 80 μm or less results in a structure in which the proportion of the flat parts of the surface unevenness is small. Accordingly, a problem of reduction of the interference ability due to film thickness nonuniformity upon coating the thin film layers occurs. 700 μm or more results in a structure in which the proportion of the flat parts of the surface is very large, so that the antiglare property cannot be sufficiently obtained.

When θ (0.5) is less than 40%, reduction of the interference ability due to film thickness nonuniformity of the thin film layers according to the unevenness occurs. When the integral reflectance is 1.5% or more, an anfireflection film good in tightness of black cannot be obtained.

With the antiglare layer of the invention, it is possible to impart sufficient antiglare property while keeping the proportion of θ (0.5) (a relatively flat region of the coating film surface) at 40% or more, and 80 μm<Sm<700 μm, which is difficult with a conventionally known antiglare film. When a plurality of thin film layers are stacked with a coating process, it is possible to implement both the sufficient antiglare property and the low reflectance.

Respective measurement methods will be described in details.

(Tilting Angle θ)

The optical film of the invention has a fine uneven structure on the surface. In the invention, the distribution of the tilting angle θ is determined in the following manner. Namely, apexes of a triangle having an area of 0.5 to 2 square micrometers are assumed to be on the transparent film base material. Thus, three perpendicular lines are extended vertically and upwardly from the points. A triangle is formed by three points at which the three perpendicular lines intersect with the film surface. The angle formed between the normal to the plane of the triangle and a perpendicular line vertically and upwardly extended from the support is referred to as the tilting angle of the surface. The tilting angle distribution of all the measurement points when the part with an area of 250000 square micrometers (0.25 square millimeter) or more of the top of the base material is divided into the triangles, is examined.

Figure 1B:
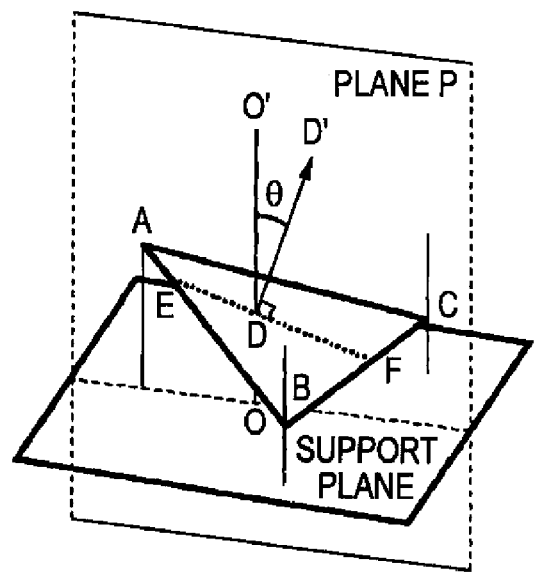
Figure 1C:
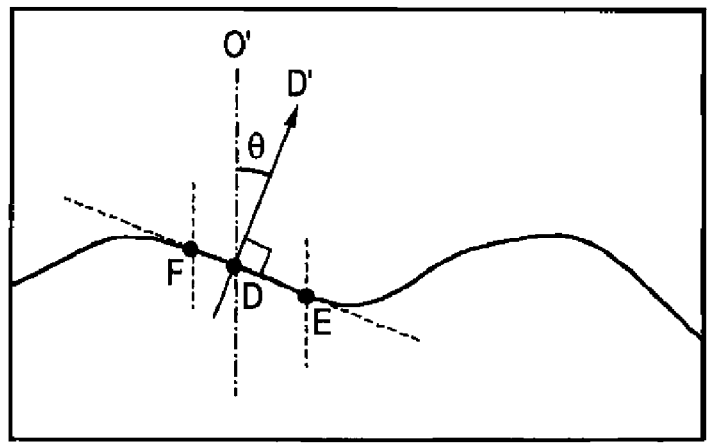
Figure 2:
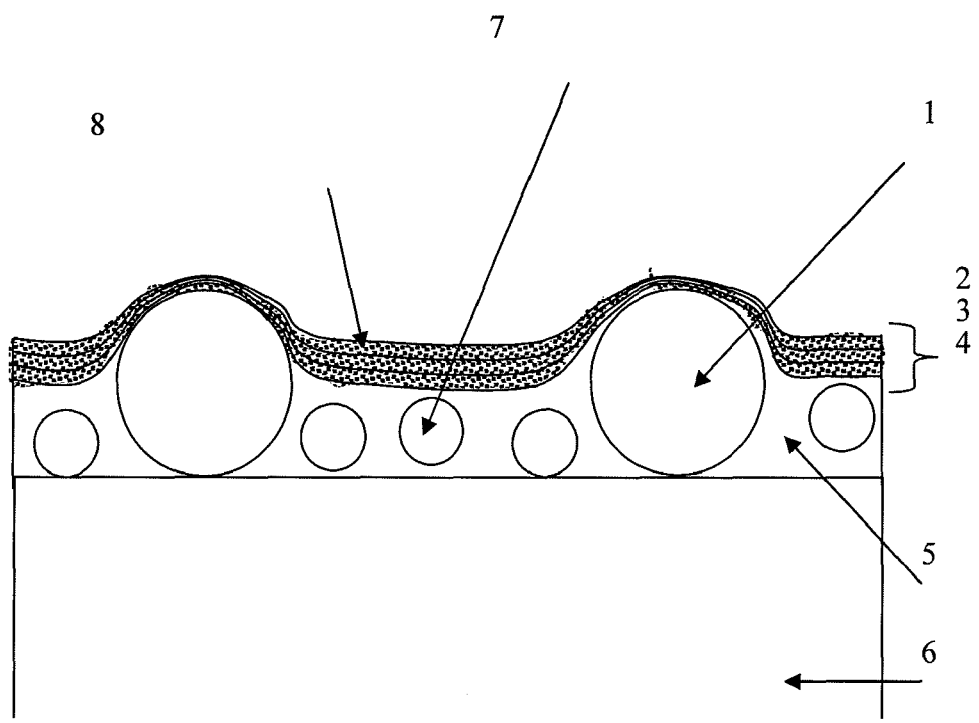
FIG. 2 is a schematic view illustrating the support, antiglare layer and light transmissive particle.

The method for measuring the tilting angle is described in details by reference to FIGS. 1A to 1C. As shown in FIG. 1A, the film is divided into such meshes each as to have an area of 0.5 to 2 square micrometers. FIG. 1B is a view where three points of the divided meshes are extracted. Perpendicular lines are vertically and upwardly extended from the three points on the support, and the points at which the three points intersect with the surface are referred as A, B, and C. The angle θ formed between the normal DD' to the plane of the triangle ABC and the perpendicular line OO' vertically and upwardly extended from the support is referred to as the tilting angle. FIG. 1C is a cross sectional view of the film cut at the plane P including the points O', D, and D'. The line segment EF is a line of intersection between the triangle ABC and the plane P. The measurement area is preferably 250000 square micrometers (0.25 square millimeters) or more of the top of the support. The face is divided into triangles on the support, and the measurement is carried out to determine the tilting angle. There are some measurement apparatuses. One example thereof will be described. The case using Model SXM520-AS150 manufactured by Micromap Corp. (U.S.A.) as the apparatus will be described. For example, when the objective lens has a magnification of 10 times, the measurement unit of the tilting angle is 0.8 square micrometer, and the measurement range is 500000 square micrometers (0.5 square millimeters). With an increase in the magnification of the objective lens, the measurement unit and the measurement range accordingly decrease. The measurement data are analyzed using a software such as MAT-LAB, whereby the tilting angle distribution can be calculated. The frequency θ (0.5) at a tilting angle of 0 to 0.5.degee. is calculated from the obtained tilting angle distribution. The measurements are carried out at different five sites, and the average value is calculated.

(Integral Reflectance)

The back side of the optical film, namely, the opposite side from the low refractive index layer thereof is surface roughened by sand paper, and then, treated with a black ink, resulting in a state with no back side reflection. The surface of the optical film is mounted on an integrating sphere of a spectrophotometer V-550 (manufactured by JASCO Corporation) to measure the reflectance (integral reflectance) in a wavelength region of 380 nm to 780 nm. Then, the average reflectance thereof at 450 nm to 650 nm is calculated.

(Evaluation of Surface Shape)

As for the surface shape of the optical film, based on JIS B-0601 (1994), the arithmetic average roughness (Ra) and the average distance (Sm) of the surface unevenness are evaluated by means of a surfcorder MODEL SE-3F manufactured by KOSAKA Laboratory Ltd. As for Sm, for the measurement, the measurement length is set at 8 mm, and the cut-off value is set at 0.8 mm.

(Evaluation of Number Per Unit Area in Antiglare Layer of Light Transmissive Particles)

The number of the light transmissive particles having a larger average particle diameter than the average film thickness of the antiglare layer is obtained by observing 10 visual fields in a 500 μm×500 μm range under an optical microscope and counting the respective numbers, and performing calculation from the average value.

A polarizing plate of the invention is a polarizing plate having a polarizing film and protective films provided on the opposite sides of the polarizing film, wherein at least one of the protective films is the optical film of the invention.

The optical film or the polarizing plate of the invention has no particular restriction on the use, but can be preferably used as an antireflection film. The antireflection film can be used in order to prevent contrast reduction due to reflection of external light or reflection of images in various image display apparatuses such as a liquid crystal display device (LCD), a plasma display panel (PDP), an electroluminescence display (ELD), a cathode ray tube (CRT), a field emission display (FED), and a surface-conduction electron-emitter display (SED).

The image display apparatus of the invention (preferably the liquid crystal display apparatus) has the optical film or the polarizing plate of the invention. The optical film or the polarizing plate of the invention is preferably placed at the surface (on the viewing side of the display screen) of the display.

EXAMPLES

Below, the invention will be further described in details by way of examples, which should not be construed as limiting the scope of the invention. Incidentally, the terms "part(s)" and "%" are based on the mass, unless otherwise stated.

Example 1

Preparation of Sol Solution A

Into a 1000-ml reaction vessel equipped with a thermometer, a nitrogen intake tube and a dropping funnel, are charged 187 g (0.80 mol) of acryloxyoxypropyl trimethoxy silane, 27.2 g (0.20 mol) of methyltrimethoxysilane, 320 g (10 mol) of methanol, and 0.06 g (0.001 mol) of KF. Thereto, 15.1 g (0.86 mol) of water is slowly added dropwise at room temperature with stirring. After completion of dropwise addition, the mixture is stirred at room temperature for 3 hours, and then heated with stirring under reflux of methanol for 2 hours. Thereafter, the low boiling content is distilled off under reduced pressure, followed by further filtration, resulting in 120 g of a sol solution a. The material thus obtained is then subjected to a GPC measurement. As a result, the mass average molecular weight is found to be 1,500. Out of the components equal to or larger than oligomer components in size, the components with a molecular weight of 1000 to 20000 are found to account for 30%.

Whereas, the measurement results of $^1$H-NMR shows that the material obtained has a structure represented by the following formula.

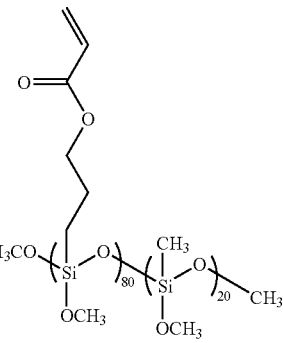

80:20 is expressed in molar ratio.

Further, the condensation ratio α by $^{29}$Si-NMR is found to be 0.56. The analysis results shows that the sol solution a is mainly composed of a straight chain structure moiety.

Whereas, the results of gas chromatography analysis shows that the remaining rate of acryloxypropyl trimethoxy silane as a raw material is 5% or less.

| (1) Preparation of coating solution for antiglare layer | |
|---|---|
| Composition of coating solution for antiglare layer 1 | |
| PET-30 | 40.0 parts by mass |
| DPHA | 10.0 parts by mass |
| IRGACURE 184 | 2.0 parts by mass |
| SX-350 (30%) | 2.0 parts by mass |
| Crosslinked acrylic-styrene particles (30%) | 13.0 parts by mass |
| SP-13 | 0.06 part by mass |
| Sol solution (a) | 11.0 parts by mass |
| Toluene | 38.5 parts by mass |
| Composition of coating solution for antiglare layer 2 | |
| PET-30 | 30.0 parts by mass |
| DPHA | 12.9 parts by mass |
| SYLYSIA 446 (secondary agglomerate diameter 6.2 μm) | 0.9 part by mass |
| IRGACURE 184 | 1.0 part by mass |
| IRGACURE 907 | 0.2 part by mass |
| SP-13 | 0.08 part by mass |
| Methyl isobutyl ketone | 40.0 parts by mass |
| Cyclohexanone | 15.0 parts by mass |
| Composition of coating solution for antiglare layer 3 | |
| DPHA | 48.4 parts by mass |
| MX-600 | 0.1 part by mass |
| IRGACURE 184 | 1.5 parts by mass |
| Methyl isobutyl ketone | 30.0 parts by mass |
| Methyl ethyl ketone | 20.0 parts by mass |

Each coating solution is filtrated through a filter made of polypropylene with a pore diameter of 30 μm to prepare the coating solutions for antiglare layer 1 to 3.

The compounds respectively used will be shown below.

DPHA: a mixture of dipentaerythritol pentaacrylate and dipentaerythritol hexaacrylate [manufactured by NIPPON KAYAKU Co., Ltd.]

PET-30: a mixture of pentaerythritol triacrylate and pentaerythritol tetraacrylate [manufactured by NIPPON KAYAKU Co., Ltd.]

IRGACURE 184: polymerization initiator [manufactured by Ciba Specialty Chemicals, Ltd.]

IRGACURE 907: polymerization initiator [manufactured by Ciba Specialty Chemicals, Ltd.]

SX-350: crosslinked polystyrene particles with an average particle diameter of 3.5 μm [refractive index 1.60, manufactured by Soken Chemicals & Engineering Co., Ltd., a 30% toluene dispersion. To be used after dispersion at 10000 rpm by means of a POLYTRON dispersing apparatus for 20 minutes.]

Crosslinked acrylic-styrene particles: average particle diameter 3.5 μm [refractive index 1.55, manufactured by Soken Chemicals & Engineering Co., Ltd., a 30% toluene dispersion. To be used after dispersion at 10000 rpm by means of a POLYTRON dispersing apparatus for 20 minutes.]

SP-13 fluorine type surface modifier

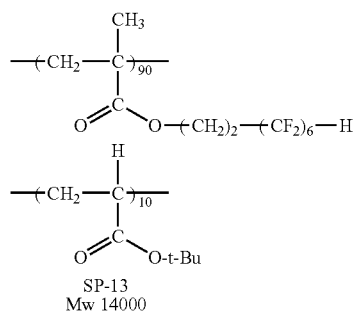

SP-13
Mw 14000

MX-600: polymethyl methacrylate fine particles, average particle diameter 6.0 μm, manufactured by Soken Chemicals & Engineering Co., Ltd.

SYLYSIA 446: cohesive silica, manufactured by FUJI Silysia Chemicals Ltd., secondary particle diameter 6.2 μm (Preparation of Coating Solution for Intermediate Refractive Index Layer A)

To 10.0 parts by mass of $ZrO_2$ fine particle-containing hard coat agent (Desolite Z7404 [refractive index 1.72, solid content concentration: 60 mass %, zirconium oxide fine particle content: 70 mass % (based on the solid content), average particle diameter of zirconium oxide fine particles: about 20 nm, and solvent composition: MIBK/MEK=9/1, manufactured by JSR), 3.0 parts by mass of a mixture of dipentaerythritol pentaacrylate and dipentaerythritol hexaacrylate (DPHA), 0.1 part by mass of a photopolymerization initiator (IRGACURE 184, manufactured by Ciba Specialty Chemicals, Ltd.), and 86.9 parts by mass of methyl isobutyl ketone are added and stirred. After sufficient stirring, the mixture is filtrated through a filter made of polypropylene with a pore diameter of 0.4 μm to prepare a coating solution for an intermediate refractive index layer A.

(Preparation of Coating Solution for Intermediate Refractive Index Layer B)

To the coating solution for an intermediate refractive index layer A, 0.1 part by mass of SP-13 is added. After sufficient stirring, the mixture is filtrated through a filter made of polypropylene with a pore diameter of 0.4 μm to prepare a coating solution for an intermediate refractive index layer B.

(Preparation of Coating Solution for Intermediate Refractive Index Layer C)

9.7 parts by mass of an acrylic acid adduct of bisphenol A diglycidyl ether (VR-77; manufactured by SHOWA HIGH-POLYMER CO., LTD.), 0.3 part by mass of a photopolymerization initiator (IRGACURE 184, manufactured by Ciba Specialty Chemicals, Ltd.), and 140 parts by mass of methyl isobutyl ketone are added and stirred.

(Preparation of Coating Solution for Intermediate Refractive Index Layer D)

5.0 parts by mass of an acrylic acid adduct of bisphenol A diglycidyl ether (VR-77; manufactured by SHOWA HIGH-POLYMER CO., LTD.), 5.23 parts by mass of $ZrO_2$ fine particle-containing hard coat agent (Desolite Z7404 [refractive index 1.72, solid content concentration: 60 mass %, zirconium oxide fine particle content: 70 mass % (based on the solid content), average particle diameter of zirconium oxide fine particles: about 20 nm, and solvent composition: MIBK/MEK=9/1, manufactured by JSR), 0.24 part by mass of a photopolymerization initiator (IRGACURE 184, manufactured by Ciba Specialty Chemicals, Ltd.), and 117 parts by mass of methyl isobutyl ketone are added and stirred.

(Preparation of Coating Solution for Intermediate Refractive Index Layer E)

5.0 parts by mass of an acrylic acid adduct of bisphenol A diglycidyl ether (VR-77; manufactured by SHOWA HIGH-POLYMER CO., LTD.), 7.43 parts by mass of $ZrO_2$ fine particle-containing hard coat agent (Desolite Z7404 [refractive index 1.72, solid content concentration: 60 mass %, zirconium oxide fine particle content: 70 mass % (based on the solid content), average particle diameter of zirconium oxide fine particles: about 20 nm, and solvent composition: MIBK/MEK=9/1, manufactured by JSR), 0.28 part by mass of a photopolymerization initiator (IRGACURE 184, manufactured by Ciba Specialty Chemicals, Ltd.), and 138 parts by mass of methyl isobutyl ketone are added and stirred.

(Preparation of Coating Solution for High Refractive Index Layer A)

To 15.0 parts by mass of $ZrO_2$ fine particle-containing hard coat agent (Desolite Z7404 [refractive index 1.72, solid content concentration: 60 mass %, zirconium oxide fine particle content: 70 mass % (based on the solid content), average particle diameter of zirconium oxide fine particles: about 20 nm, and solvent composition: MIBK/MEK=9/1, manufactured by JSR), 85.0 parts by mass of methyl isobutyl ketone is added and stirred. The resulting mixture is filtrated through a filter made of polypropylene with a pore diameter of 0.4 μm to prepare a coating solution for a high refractive index layer A.

(Preparation of Coating Solution for Low Refractive Index Layer A)

(Preparation of Hollow Silica Particle Dispersion)

To 500 parts by mass of hollow silica fine particle sol (isopropyl alcohol silica sol, CS60-IPA manufactured by CATALYSTS & CHEMICALS IND. CO., LTD., average particle diameter 60 nm, shell thickness 10 nm, silica concentration 20%, refractive index of silica particles 1.31), 20 parts by mass of acryloyloxypropyl trimethoxy silane, and 1.5 parts of diisopropoxy aluminum ethyl acetate are added and mixed. Then, 9 parts by mass of ion exchange water is added thereto. The mixture is allowed to react at 60° C. for 8 hours, and then, cooled to room temperature. 1.8 parts of acetyl acetone is added thereto, resulting in a dispersion. Thereafter, while adding cyclohexanone so as to keep the silica content roughly constant, solvent replacement by distillation under reduced pressure, under a pressure of 30 Torr is carried out. Finally, a dispersion with a solid content concentration of 18.2% is obtained by concentration control. The IPA residual amount of the resulting dispersion is analyzed by gas chromatography. As a result, it is found to be 0.5% or less.

By using the resulting hollow silica particle dispersion, a coating solution for a low refractive index layer A with the following composition is prepared.

| Composition of coating solution for low refractive index layer A | |
| --- | --- |
| DPHA | 1.0 part by mass |
| P-1 | 1.6 parts by mass |
| Hollow silica particle dispersion (18.2%) | 26.4 parts by mass |
| RMS-033 | 0.4 part by mass |
| IRGACURE 907 | 0.3 part by mass |
| M-1 | 1.9 parts by mass |
| MEK | 168.4 parts by mass |

"P-1": fluorine-containing copolymer P-3 described in JP-A-2004-45462 (weight average molecular weight about 50000)

DPHA: a mixture of dipentaerythritol pentaacrylate and dipentaerythritol hexaacrylate manufactured by NIPPON KAYAKU Co., Ltd., IRGACURE 907: polymerization initiator (manufactured by Nihon Ciba-Geigy K.K.), M-1: the fluorine-containing multifunctional acrylate, RMS-033: methacryloxy-modified silicone (manufactured by Gelest Co., Ltd.)

(Coating of Antiglare Layer 101)

A triacetyl cellulose film (TAC-80U, manufactured by Fuji Photo Film, Co., Ltd.) is wound in a roll form. Thus, by means of a coater having a throttle die, the coating solution for an antiglare layer 1 is directly extruded and coated. Coating is carried out under the condition of a transfer speed of 30 m/min. After drying at 30° C. for 15 seconds and at 90° C. for 20 seconds, an ultraviolet ray of an exposure dose of 90 mJ/cm$^2$ is further applied thereto using a 160 W/cm air cooled metal halide lamp (manufactured by EYEGRAPHICS Co., Ltd.) under nitrogen purge. As a result, the coated layer is cured to form an antiglare layer having an average film thickness of 6.0 µm and having antiglare property, and the resulting film is coiled, thereby to manufacture an antiglare layer 101.

(Manufacturing of Antiglare Layers 102 and 103)

Antiglare layers 102 and 103 are manufactured in the same manner as with the antiglare layer 101, except that the amount of particles added in the coating solution for an antiglare layer 1 is changed so as to be 0.5 time, and 1.5 times in manufacturing of the antiglare layer 101.

(Manufacturing of Antiglare Layer 104)

An antiglare layer 104 is manufactured in the same manner as with the antiglare layer 101, except that the coating amount is changed so that the coating film thickness is 6.0 µm using the coating solution for an antiglare layer 2 in manufacturing of the antiglare layer 104.

(Manufacturing of Antiglare Layers 105 and 106)

Antiglare layers 105 and 106 are manufactured in the same manner as with the antiglare layer 104, except that the amount of particles added in the coating solution for an antiglare layer 2 is changed so as to be 0.5 time, and 3.0 times in manufacturing of the antiglare layer 104.

(Manufacturing of Antiglare Layer 107)

An antiglare layer 107 is manufactured in the same manner as with the antiglare layer 101, except that the coating amount is changed so that the coating film thickness is 4.0 µm using the coating solution for an antiglare layer 3 in manufacturing of the antiglare layer 101.

(Manufacturing of Antiglare Layers 108 to 110)

Antiglare layers 108, 109, and 110 are manufactured in the same manner as with the antiglare layer 107, except that the amount of particles added in the coating solution for an antiglare layer 3 is changed so as to be 0.1 time, 0.5 time, and 2.5 times in manufacturing of the antiglare layer 107.

On each of the antiglare layers, the coating solution for an intermediate refractive index layer, the coating solution for a high refractive index layer, and the coating solution for a low refractive index layer are directly extruded by means of a coater having a throttle die, and coated with each configuration shown in Table 4. As for the amount of the coating solution for each layer, such an amount of the solution as to result in a desirable film thickness when the same solution is coated on a PET film is also directly applied to the top of the antiglare layer. The film thickness on the PET film is described as the actual film thickness on the antiglare layer in Table 4. The film thickness on the PET film is calculated by means of a reflective film thickness monitor "FE-3000" (manufactured by OTSUKA ELECTRONICS Co., Ltd.). Incidentally, for the measurement of the refractive index of each layer, the coating solution for each layer is coated to a thickness of about 4 µm on a glass plate, and the measurement is carried out by means of an Abbe refractometer (manufactured by ATAGO).]

TABLE 4

| | Light | | | | Intermediate refractive index layer | | | |
| --- | --- | --- | --- | --- | --- | --- | --- | --- |
| Sample No. | transmissive particle particle diameter (µm) | Antiglare layer No. | Light transmissive particle content (mass %) | Film thickness (µm) | Coating solution | Refractive index | Film thickness (nm) | Metal oxide particle amount (%) |
| 1 | 3.5 | 101 | 6.8 | 6.0 | A | 1.62 | 110 | 46 |
| 2 | 3.5 | 102 | 3.4 | 6.0 | A | 1.62 | 110 | 46 |
| 3 | 3.5 | 103 | 10.2 | 6.0 | A | 1.62 | 110 | 46 |
| 4 | 6.2 | 104 | 2.0 | 6.0 | A | 1.62 | 110 | 46 |
| 5 | 6.2 | 105 | 1.0 | 6.0 | A | 1.62 | 110 | 46 |
| 6 | 6.2 | 106 | 6.0 | 6.0 | A | 1.62 | 110 | 46 |
| 7 | 6.0 | 107 | 0.2 | 4.0 | A | 1.62 | 110 | 46 |
| 8 | 6.0 | 108 | 0.02 | 4.0 | A | 1.62 | 110 | 46 |
| 9 | 6.0 | 109 | 0.1 | 4.0 | A | 1.62 | 110 | 46 |
| 10 | 6.0 | 110 | 0.5 | 4.0 | A | 1.62 | 110 | 46 |
| 11 | 6.2 | 104 | 2.0 | 6.0 | B | 1.62 | 110 | 46 |
| 12 | 6.2 | 104 | 2.0 | 6.0 | C | 1.57 | 110 | 0 |
| 13 | 6.2 | 104 | 2.0 | 6.0 | D | 1.62 | 110 | 26 |
| 14 | 6.2 | 104 | 2.0 | 6.0 | E | 1.64 | 110 | 32 |
| 15 | 6.0 | 107 | 0.2 | 4.0 | B | 1.62 | 110 | 46 |
| 16 | 6.0 | 107 | 0.2 | 4.0 | C | 1.57 | 110 | 0 |
| 17 | 6.0 | 107 | 0.2 | 4.0 | D | 1.62 | 110 | 26 |
| 18 | 6.0 | 107 | 0.2 | 4.0 | E | 1.64 | 110 | 32 |

TABLE 4-continued

| | | | | | | | | |
|---|---|---|---|---|---|---|---|---|
| 19 | 6.2 | 104 | 2.0 | 6.0 | A | 1.62 | 60 | 46 |
| 20 | 6.0 | 109 | 0.1 | 4.0 | A | 1.62 | 60 | 46 |
| 21 | 6.0 | 107 | 0.2 | 4.0 | A | 1.62 | 60 | 46 |

| | High refractive index layer | | | | Low refractive index layer | | |
|---|---|---|---|---|---|---|---|
| Sample No. | Coating solution | Refractive index | Film thickness (nm) | Metal oxide particle amount (%) | Coating solution | Refractive index | Film thickness (nm) |
| 1 | — | — | — | — | A | 1.36 | 87 |
| 2 | — | — | — | — | A | 1.36 | 87 |
| 3 | — | — | — | — | A | 1.36 | 87 |
| 4 | — | — | — | — | A | 1.36 | 87 |
| 5 | — | — | — | — | A | 1.36 | 87 |
| 6 | — | — | — | — | A | 1.36 | 87 |
| 7 | — | — | — | — | A | 1.36 | 87 |
| 8 | — | — | — | — | A | 1.36 | 87 |
| 9 | — | — | — | — | A | 1.36 | 87 |
| 10 | — | — | — | — | A | 1.36 | 87 |
| 11 | — | — | — | — | A | 1.36 | 87 |
| 12 | — | — | — | — | A | 1.36 | 87 |
| 13 | — | — | — | — | A | 1.36 | 87 |
| 14 | — | — | — | — | A | 1.36 | 87 |
| 15 | — | — | — | — | A | 1.36 | 87 |
| 16 | — | — | — | — | A | 1.36 | 87 |
| 17 | — | — | — | — | A | 1.36 | 87 |
| 18 | — | — | — | — | A | 1.36 | 87 |
| 19 | A | 1.72 | 112 | 70 | A | 1.36 | 90 |
| 20 | A | 1.72 | 112 | 70 | A | 1.36 | 90 |
| 21 | A | 1.72 | 112 | 70 | A | 1.36 | 90 |

In the table, the numerical value (mass %) of the content of the light transmissive particles is expressed based on the total solid content.

The drying conditions for the intermediate refractive index layer is set at 90° C. and 30 seconds. As for the ultraviolet ray curing conditions, while performing nitrogen purge so that the oxygen concentration is 1.0% by volume or less), an illuminance of 400 mW/cm$^2$ and a dose of 240 mJ/cm$^2$ are adopted by means of a 180 W/cm air cooled metal halide lamp (manufactured by EYEGRAPHICS Co.).

The drying conditions for the high refractive index layer is set at 90° C. and 30 seconds. As for the ultraviolet ray curing conditions, while performing nitrogen purge so that the oxygen concentration is 1.0% by volume or less), an illuminance of 400 mW/cm$^2$ and a dose of 240 mJ/cm$^2$ are adopted by means of a 240 W/cm air cooled metal halide lamp (manufactured by EYEGRAPHICS Co.).

The drying conditions for the low refractive index layer is set at 60° C. and 60 seconds. As for the ultraviolet ray curing conditions, while performing nitrogen purge so that the oxygen concentration is 0.1% by volume or less), an illuminance of 600 mW/cm$^2$ and a dose of 600 mJ/cm$^2$ are adopted by means of a 240 W/cm air cooled metal halide lamp (manufactured by EYEGRAPHICS Co.).

(Evaluation of Optical Film)

Various characteristics of the optical film is evaluated in the following manner. The results are shown in Table 2.

(Integral Reflectance)

The reflectance (integral reflectance) of the optical film is measured by the method described in this specification, and then, the average reflectance thereof at 450 nm to 650 nm is calculated to evaluate the antireflection property.

(Evaluation of Surface Shape)

With the method described in this specification, the arithmetic average roughness (Ra) and the average distance (Sm) of the unevenness are evaluated. As for Sm, for the measurement, the measurement length is set at 8 mm, and the cut-off value is set at 0.8 mm.

(Tilting Angle θ)

With the method described in this specification, the tilting angle θ is measured, and the frequency at a tilting angle of 0 to 0.5° is calculated therefrom.

(Evaluation of the Number Per Unit Area in the Antiglare Layer of the Light Transmissive Particles)

The number of the light transmissive particles having a larger average particle diameter than the average film thickness of the antiglare layer is evaluated with the method described in this specification.

(Cissing)

An oily black ink is coated on the back side of the optical film of the invention, and the film is observed using differential interference by means of an optical microscope. Thus, cissing on the coating film surface is evaluated in the following manner.

AA: No cissing is observed at all even when the film is carefully observed;

BB: Cissing is observed slightly when the film is carefully observed; and

CC: Severe cissing is observed over the entire surface of the coating film.

[Reflection]

A black ink is coated over the entire back side of the antiglare film. Then, the manner of reflection of light when light of a fluorescent light is reflected on the surface of the antiglare film is evaluated.

AA: Reflection is sufficiently suppressed, or light is sufficiently diffused, so that the reflection is not bothersome;

BB: Reflectin of the shape of the fluorescent light can be visually observed if being carefully observed, but the reflection is not bothersome;

CC: The shape of the fluorescent light is slightly reflected, but the reflection is not bothersome; and DD: The shape of the fluorescent light is clearly reflected, and the reflection is dazzling and bothersome.

The level equal to or higher than CC is rated as pass.

(Tightness of Black for Black Display (Display Performance))

The surface film on the viewing side provided in a liquid crystal display apparatus (32" TV: W32-L7000, manufactured by Hitachi Co., Ltd.) using an IPS system liquid crystal cell is released. In place of this, the optical film of the invention is bonded, with the coating side being the viewing side, to the back side via an adhesive. In a 1000 lux bright room, the liquid crystal display apparatus is set in a black display state, and visually evaluated. Thus, the following evaluation is carried out.

The rating is performed on a scale of 10. At point 10, whitish feeling due to external light is not felt at all, and the luminance is low as black display, and the contrast under bright room is perfectly high. On the other hand, at point 5 or less, the whitish feeling due to external light is too strong, and it is unacceptable (NG) as black display, and the contrast under bright room is low.

The evaluation results are shown in Table 5.

following fact. For the samples 12 and 16, each intermediate refractive index layer do not contain metal oxide particles. Therefore, cissing occurs, so that an optical film cannot be obtained. Therefore, the numerical values are not described.

The results of the samples 1 to 10, and 19 to 21 indicate the following fact. An optical film of which the arithmetic average roughness (Ra) is: 0.03 μm<Ra<0.4 μm, and the average distance of the unevenness (Sm) is: 80 μm<Sm<700 μm, and in which the region with a tilting angle θ: 0°<θ<0.5° (θ (0.5)) accounts for 40% or surprisingly has unevenness on the surface and has an integral reflectance of 1.5% or less even when two or more interference layers are stacked while keeping the antiglare property. As a result, such antireflection characteristics as to result in good tightness of black and prevention of reflection can be obtained. Particularly, for the samples 7 and 9 with a θ (0.5) of 70% or more, and a Sm of more than 200 μm, the following facts are found: the reflectance is low, the tightness of black is good, and the reflection prevention performance is excellent. For the samples 19 to 21, the interference layer is in a three-layered configuration, and hence excellent performances can be obtained. For the sample 8, θ (0.5) is large, but Sm is larger than 700 μm. Therefore, the reflectance is low, and the tightness of black is good, but the reflection prevention performance is bad.

TABLE 5

| Sample No. | Ra (μm) | Sm (μm) | θ [0.5] (%) | Number of light transmissive particles (particles/mm²) | Cissing | Integral reflectance (%) | Black tightness | Reflection | Remarks |
|---|---|---|---|---|---|---|---|---|---|
| 1 | 0.21 | 60 | 20 | 18200 | AA | 1.72 | 3 | BB | Comparative Example |
| 2 | 0.17 | 65 | 31 | 9000 | AA | 1.64 | 4 | BB | Comparative Example |
| 3 | 0.32 | 45 | 14 | 26900 | AA | 1.92 | 2 | BB | Comparative Example |
| 4 | 0.11 | 120 | 57 | — | AA | 1.19 | 6 | CC | Invention |
| 5 | 0.08 | 170 | 80 | — | AA | 0.97 | 7 | CC | Invention |
| 6 | 0.21 | 81 | 37 | — | AA | 1.52 | 5 | BB | Comparative Example |
| 7 | 0.23 | 400 | 71 | 71 | AA | 0.91 | 8 | BB | Invention |
| 8 | 0.04 | 710 | 98 | 8 | AA | 0.78 | 8 | DD | Comparative Example |
| 9 | 0.18 | 505 | 86 | 35 | AA | 0.88 | 8 | BB | Invention |
| 10 | 0.28 | 160 | 47 | 180 | AA | 1.31 | 6 | BB | Invention |
| 11 | 0.11 | 120 | 57 | — | AA | 1.05 | 7 | CC | Invention |
| 12 | — | — | — | — | CC | — | — | — | Comparative Example |
| 13 | 0.11 | 120 | 57 | — | AA | 1.35 | 6 | CC | Invention |
| 14 | 0.11 | 120 | 57 | — | AA | 1.00 | 7 | CC | Invention |
| 15 | 0.23 | 400 | 71 | 71 | AA | 0.89 | 8 | BB | Invention |
| 16 | — | — | — | — | CC | — | — | — | Comparative Example |
| 17 | 0.23 | 400 | 71 | 71 | AA | 1.16 | 7 | BB | Invention |
| 18 | 0.23 | 400 | 71 | 71 | AA | 0.86 | 8 | BB | Invention |
| 19 | 0.11 | 120 | 57 | — | AA | 0.78 | 8 | AA | Invention |
| 20 | 0.18 | 505 | 86 | 35 | AA | 0.55 | 10 | AA | Invention |
| 21 | 0.23 | 400 | 71 | 71 | AA | 0.57 | 10 | AA | Invention |

Incidentally, in the table, "-" in the column of the number of light transmissive particles denotes that the number cannot be measured with precision. Accordingly, the number of light transmissive particles is not described. The reason for this is as follows. For these samples, cohesive silica particles are used as the light transmissive particles. The particle diameter corresponds to the secondary particle diameter, so that the measurement of the number of light transmissive particles is difficult.

Incidentally, for the samples 12 and 16 in the table, no numerical values are described at some sites. This is due to the Further, the results of the samples 11 to 18 indicate as follows. By setting the amount of the metal oxide fine particles contained in the high refractive index layer at 30% or more, and allowing the high refractive index layer to contain a levelling agent, it is possible to obtain an antireflection film with no cissing of the coating film, and with a low reflectance and good tightness of black. For the samples 18 and 14, the metal oxide fine particle content is lower, but the refractive index of the intermediate refractive index layer is higher, and hence the reflectance is lower, relative to the samples 7 and 4, respectively.

Example 2

(1) Preparation of coating solution for antiglare layer

Composition of coating solution for antiglare layer 4

| | |
|---|---|
| PET-30 | 48.33 parts by mass |
| MX-1000 | 0.15 part by mass |
| IRGACURE 184 | 1.5 parts by mass |
| Methyl isobutyl ketone | 30.0 parts by mass |
| Methyl ethyl ketone | 20.0 parts by mass |
| SP-13 | 0.02 part by mass |

Composition of coating solution for antiglare layer 5

| | |
|---|---|
| PET-30 | 46.83 parts by mass |
| MXS-300 | 1.5 parts by mass |
| MX-1000 | 0.15 part by mass |
| IRGACURE 184 | 1.5 parts by mass |
| Methyl isobutyl ketone | 30.0 parts by mass |
| Methyl ethyl ketone | 20.0 parts by mass |
| SP-13 | 0.02 part by mass |

Composition of coating solution for antiglare layer 6

| | |
|---|---|
| PET-30 | 46.83 parts by mass |
| MXS-500 | 1.5 parts by mass |
| MX-1000 | 0.15 part by mass |
| IRGACURE 184 | 1.5 parts by mass |
| Methyl isobutyl ketone | 30.0 parts by mass |
| Methyl ethyl ketone | 20.0 parts by mass |
| SP-13 | 0.02 part by mass |

Composition of coating solution for antiglare layer 7

| | |
|---|---|
| PET-30 | 46.38 parts by mass |
| MX-600 | 0.1 part by mass |
| IRGACURE 184 | 1.5 parts by mass |
| Methyl isobutyl ketone | 30.0 parts by mass |
| Methyl ethyl ketone | 20.0 parts by mass |
| SP-13 | 0.02 part by mass |

Composition of coating solution for antiglare layer 8

| | |
|---|---|
| PET-30 | 47.38 parts by mass |
| MXS-300 | 1.0 part by mass |
| MX-600 | 0.1 part by mass |
| IRGACURE 184 | 1.5 parts by mass |
| Methyl isobutyl ketone | 30.0 parts by mass |
| Methyl ethyl ketone | 20.0 parts by mass |
| SP-13 | 0.02 part by mass |

Composition of coating solution for antiglare layer 9

| | |
|---|---|
| PET-30 | 38.7 parts by mass |
| Biscoat #360 | 9.7 parts by mass |
| MB30X-20 | 0.125 part by mass |
| IRGACURE 184 | 1.5 parts by mass |
| Methyl isobutyl ketone | 30.0 parts by mass |
| Methyl ethyl ketone | 20.0 parts by mass |
| SP-13 | 0.02 part by mass |

Composition of coating solution for antiglare layer 10

| | |
|---|---|
| PET-30 | 32.7 parts by mass |
| Biscoat #360 | 8.2 parts by mass |
| MX-800 | 7.5 parts by mass |
| MB30X-20 | 0.125 part by mass |
| IRGACURE 184 | 1.5 parts by mass |
| Methyl isobutyl ketone | 30.0 parts by mass |
| Methyl ethyl ketone | 20.0 parts by mass |
| SP-13 | 0.02 part by mass |

MX-1000: Polymethyl methacrylate fine particles, average particle diameter 10 μm, manufactured by Soken Chemicals & Engineering Co., Ltd., MXS-300: Polymethyl methacrylate fine particles, average particle diameter 3 μm, manufactured by Soken Chemicals & Engineering Co., Ltd., MX-500: Polymethyl methacrylate fine particles, average particle diameter 5 μm, manufactured by Soken Chemicals & Engineering Co., Ltd., MX-600: Polymethyl methacrylate fine particles, average particle diameter 6.0 μm, manufactured by Soken Chemicals & Engineering Co., Ltd., MX-800: Polymethyl methacrylate fine particles, average particle diameter 8 μm, manufactured by Soken Chemicals & Engineering Co., Ltd., MB30X-20: Polymethyl methacrylate fine particles, average particle diameter 20 μm, manufactured by SEKISUI CHEMICAL CO., LTD., Biscoat #360: trimethylolpropane EO-added triacrylate manufactured by Osaka Organic Chemical Industry, Ltd.

(Manufacturing of Antiglare Layers 111 to 113)

Antiglare layers 111 to 113 are manufactured in the same manner as with the antiglare layer 101, except that the coating amount is changed so that the coating film thickness is 8.0 μm using the coating solutions for an antiglare layer 4 to 6, respectively, in manufacturing of the antiglare layer 101.

(Manufacturing of Antiglare Layers 114 and 115)

Antiglare layers 114 and 115 are manufactured in the same manner as with the antiglare layer 101, except that the coating amount is changed so that the coating film thickness is 4.0 μm using the coating solutions for an antiglare layer 7 and 8, respectively, in manufacturing of the antiglare layer 101.

(Manufacturing of Antiglare Layers 116 and 117)

Antiglare layers 116 and 117 are manufactured in the same manner as with the antiglare layer 101, except that the coating amount is changed so that the coating film thickness is 18.0 μm using the coating solutions for an antiglare layer 9 and 10, respectively, in manufacturing of the antiglare layer 101.

The intermediate refractive index layer, the high refractive index layer, and the low refractive index layer are stacked on the antiglare layer as shown in Table 6. The coating conditions in this step are set as the same as the conditions shown in Example 1.

TABLE 6

| Sample No. | Antiglare layer No. | Light transmissive particle 1 | | Light transmissive particle 2 | | Film thickness (μm) | Intermediate refractive index layer | | |
|---|---|---|---|---|---|---|---|---|---|
| | | Particle diameter (μm) | Amount added (%) | Particle diameter (μm) | Amount added (%) | | Coating solution | Refractive index | Film thickness (nm) |
| 21 | 111 | 10 | 0.3 | — | — | 8.0 | A | 1.62 | 110 |
| 22 | 112 | 10 | 0.3 | 3 | 3 | 8.0 | A | 1.62 | 110 |
| 23 | 113 | 10 | 0.3 | 5 | 3 | 8.0 | A | 1.62 | 110 |
| 24 | 114 | 6 | 0.2 | — | — | 4.0 | A | 1.62 | 110 |
| 25 | 115 | 6 | 0.2 | 3 | 2 | 4.0 | A | 1.62 | 110 |

TABLE 6-continued

| | | | | | | | | | |
|---|---|---|---|---|---|---|---|---|---|
| 26 | 116 | 20 | 0.25 | — | — | 18.0 | A | 1.62 | 110 |
| 27 | 117 | 20 | 0.25 | 8 | 15 | 18.0 | A | 1.62 | 110 |
| 28 | 112 | 10 | 0.3 | 3 | 3 | 8.0 | A | 1.62 | 60 |
| 29 | 117 | 20 | 0.25 | 8 | 15 | 18.0 | A | 1.62 | 60 |

| | High refractive index layer | | | Low refractive index layer | | |
|---|---|---|---|---|---|---|
| Sample No. | Coating solution | Refractive index | Film thickness (nm) | Coating solution | Refractive index | Film thickness (nm) |
| 21 | — | — | — | A | 1.36 | 87 |
| 22 | — | — | — | A | 1.36 | 87 |
| 23 | — | — | — | A | 1.36 | 87 |
| 24 | — | — | — | A | 1.36 | 87 |
| 25 | — | — | — | A | 1.36 | 87 |
| 26 | — | — | — | A | 1.36 | 87 |
| 27 | — | — | — | A | 1.36 | 87 |
| 28 | A | 1.72 | 112 | A | 1.36 | 90 |
| 29 | A | 1.72 | 112 | A | 1.36 | 90 |

In the table, the numerical value of the amount (%) of light transmissive particles added is the content (mass %) of the light transmissive particles based on the total solid content of the antiglare layer.

(Evaluation of Optical Film)
<Glare Evaluation>

For evaluation, each manufactured optical film is mounted on a liquid crystal television, and the degree of glare (variations in luminance due to the lens effect of the surface projections of the optical film) is visually evaluated based on the following criteria.

No glare is observed at all: AA,

If being very carefully observed, glare can be visually observed slightly: BB,

Glare can be visually observed slightly, but it is not bothersome: CC, and

Uncomfortable glare occurs: DD

<Haze>

The haze of the film of the invention denotes the haze value specified according to JIS K-7105. The value automatically measured as haze=(diffused light/entire transmitted light)×100(%) measured by means of a turbidity meter "NDH-1001DP" manufactured by Nippon Denshoku Industries Co., Ltd. based on the measuring method specified according to JIS K-7361-1 is used.

The evaluation results are shown in Table 7.

As indicated, by using particles having a smaller particle size than the film thickness as described above, and imparting the internal scattering property, while keeping the antiglare property, the integral reflectance becomes 1.5% or less even when two or more interference layers are stacked. Accordingly, such reflection prevention characteristics as to result in good tightness of black and prevention of reflection and glare can be obtained Example 3

| (1) Preparation of coating solution for antiglare layer | |
|---|---|
| Composition of coating solution for antiglare layer 11 | |
| PET-30 | 38.7 parts by mass |
| Biscoat #360 | 9.7 parts by mass |
| MX-800 | 0.125 parts by mass |
| IRGACURE 184 | 1.5 parts by mass |
| Methyl isobutyl ketone | 30.0 parts by mass |
| Methyl ethyl ketone | 20.0 parts by mass |
| SP-13 | 0.02 part by mass |
| Composition of coating solution for antiglare layer 12 | |
| PET-30 | 38.7 parts by mass |
| Biscoat #360 | 9.7 parts by mass |
| MX-600 | 0.09 part by mass |
| IRGACURE 184 | 1.5 parts by mass |
| Methyl isobutyl ketone | 30.0 parts by mass |
| Methyl ethyl ketone | 20.0 parts by mass |
| SP-13 | 0.02 part by mass |

TABLE 7

| Sample No. | Ra (μm) | Sm (μm) | θ [0.5] (%) | Number of light transmissive particles (particles/mm$^2$) | Cissing | Integral reflectance (%) | Black tightness | Reflection | Haze | Glare | Remarks |
|---|---|---|---|---|---|---|---|---|---|---|---|
| 21 | 0.23 | 420 | 83 | 55 | AA | 0.88 | 8 | BB | 0.5 | CC | Invention |
| 22 | 0.23 | 330 | 70 | 55 | AA | 0.91 | 8 | BB | 5.0 | AA | Invention |
| 23 | 0.24 | 330 | 68 | 55 | AA | 0.92 | 8 | BB | 4.0 | AA | Invention |
| 24 | 0.21 | 400 | 72 | 70 | AA | 0.91 | 8 | BB | 0.5 | CC | Invention |
| 25 | 0.23 | 300 | 65 | 70 | AA | 0.94 | 8 | BB | 3.0 | AA | Invention |
| 26 | 0.24 | 520 | 88 | 17 | AA | 0.86 | 8 | BB | 0.4 | CC | Invention |
| 27 | 0.27 | 360 | 56 | 17 | AA | 1.08 | 7 | BB | 19.0 | AA | Invention |
| 28 | 0.23 | 330 | 70 | 55 | AA | 0.57 | 10 | AA | 5.0 | AA | Invention |
| 29 | 0.27 | 360 | 56 | 17 | AA | 0.79 | 8 | AA | 19.0 | AA | Invention |

Manufacturing of Antiglare Layers 118 and 119

Antiglare layers 118 and 119 are manufactured in the same manner as with the antiglare layer 101, except that the coating amount is changed so that the coating film thickness is 7.5 μm using the antiglare layer coating solution 11, and in the same manner as with the antiglare layer 101, except that the coating amount is changed so that the coating film thickness is 5 μm using the antiglare layer coating solution 12, respectively, in manufacturing of the antiglare layer 101.

The intermediate refractive index layer, the high refractive index layer, and the low refractive index layer are stacked on the antiglare layer as shown in Table 8. The coating conditions for this step are set to be the same as the conditions shown in Example 1.

TABLE 8

| Sample No. | Anti-glare layer | Light transmissive particle 1 | | | Intermediate refractive index layer | | | High refractive index layer | | | Low refractive index layer | | |
|---|---|---|---|---|---|---|---|---|---|---|---|---|---|
| | | Particle diameter (μm) | Amount added (%) | Film thickness (μm) | Coating solution | Refractive index | Film thickness (nm) | Coating solution | Refractive index | Film thickness (nm) | Coating solution | Refractive index | Film thickness (nm) |
| 30 | 118 | 8 | 0.25 | 7.5 | A | 1.62 | 110 | — | — | — | A | 1.36 | 87 |
| 31 | 119 | 6 | 0.18 | 5.0 | A | 1.62 | 110 | — | — | — | A | 1.36 | 87 |
| 32 | 118 | 8 | 0.25 | 7.5 | A | 1.62 | 60 | A | 1.72 | 112 | A | 1.36 | 90 |
| 33 | 119 | 6 | 0.18 | 5.0 | A | 1.62 | 60 | A | 1.72 | 112 | A | 1.36 | 90 |

The evaluation results are shown in Table 9.

TABLE 9

| Sample No. | Ra (μm) | Sm (μm) | θ [0.5] (%) | Number of light transmissive particles (particles/mm$^2$) | Cissing | Integral reflectance (%) | Black tightness | Reflection | Haze | Glare | Remarks |
|---|---|---|---|---|---|---|---|---|---|---|---|
| 9 | 0.18 | 505 | 86 | 35 | AA | 0.88 | 8 | BB | 0.5 | CC | Invention |
| 20 | 0.18 | 505 | 86 | 35 | AA | 0.55 | 10 | AA | 0.5 | CC | Invention |
| 30 | 0.10 | 510 | 91 | 74 | AA | 0.85 | 8 | BB | 0.5 | BB | Invention |
| 31 | 0.10 | 530 | 89 | 65 | AA | 0.86 | 8 | BB | 0.5 | BB | Invention |
| 32 | 0.10 | 510 | 91 | 74 | AA | 0.51 | 10 | AA | 0.5 | BB | Invention |
| 33 | 0.10 | 530 | 89 | 65 | AA | 0.53 | 10 | AA | 0.5 | BB | Invention |

The antireflection film is excellent in antiglare property, and glare, and good in tightness of black when external light is reflected. Even when two or more of the interference layers are stacked, the integral reflectance is as low as 1.5% or less, and excellent.

An optical film of the present invention has at least two layers of thin film interference layers on an antiglare layer, and undergoes less reflection of external light, and is excellent in tightness of black, and is excellent in film thickness uniformity, and has a very low reflectance.

The entire disclosure of each and every foreign patent application from which the benefit of foreign priority has been claimed in the present application is incorporated herein by reference, as if fully set forth.

What is claimed is:

1. An optical film comprising, in the following order:
a support;
an antiglare layer having an uneven surface;
a high refractive index layer; and
a low refractive index layer,
wherein
an arithmetic average roughness (Ra) of the optical film is: 0.03 μm<Ra<0.4 μm,
an average distance of unevenness (Sm) of the optical film is: 80 μm<Sm<700 μm,
a region of 0°<θ<0.5° of the optical film, where θ is a tilting angle of the unevenness, accounts for 40% or more, and wherein the region is determined as follows:
(i) a distribution of the tilting angle θ is determined using Model SXM520-AS150 manufactured by Micromap Corporation having an objective lens with a magnification of 10 times, a measurement unit of the tilting angle is 0.8 square micrometer, and a measurement range is 500,000 square micrometers (0.5 square millimeters) and using a method wherein
(a) apexes of a triangle having an area of 0.8 square micrometers are assumed to be on a transparent film base material, three perpendicular lines are extended vertically and upwardly from the apexes of the triangle, a second triangle is formed by three points at which the three perpendicular lines intersect with the film surface, an angle formed between a normal to a plane of the second triangle and a perpendicular line vertically and upwardly extended from the support is the tilting angle θ of the film surface;
(b) a part with an area of 500,000 square micrometers (0.5 square millimeters) or more of the top of the transparent film base material is divided into triangles to create measurement points for each triangle, and the tilting angle distribution of all measurement points is examined;
(ii) a frequency at a tilting angle of 0 to 0.5° is calculated from the obtained tilting angle distribution; and (iii) a measurement is carried out at five different sites, and an average value is calculated;

the antiglare layer contains at least one kind of light transmissive particles having an average particle diameter larger than an average film thickness of the antiglare layer by 0.01 to 4.0 μm, an amount of the light transmissive particles to be added is 0.01 to 1 mass % based on a total solid content of the antiglare layer, and an integral reflectance of the optical film is 1.5% or less.

2. The optical film of claim 1, wherein
the number per unit area in the antiglare layer of the light transmissive particles having a larger average particle diameter than the average film thickness of the antiglare layer is 10 to 1500 particles/mm².

3. The optical film of claim 1, wherein
the antiglare layer contains second light transmissive particles having a smaller average particle diameter than the average film thickness of the antiglare layer.

4. The optical film of claim 1, wherein
the antiglare layer contains at least one kind of fine particles, and
the fine particles are cohesive metal oxide fine particles.

5. The optical film of claim 4, wherein
an amount of the metal oxide fine particles to be added is 0.01 to 5 mass % based on a total solid content of the antiglare layer.

6. The optical film of claim 4, wherein
the antiglare layer contains second light transmissive particles having a smaller average particle diameter than an average film thickness of the antiglare layer.

7. The optical film of claim 1, wherein
the high refractive index layer contains fine particles of an oxide of at least one metal selected from Si, Al, Ti, Zr, Sb, Zn, Sn, and In.

8. The optical film of claim 7, wherein
the fine particles of the oxide of at least one metal are contained in an amount of 30 mass % or more based on a total solid content of the high refractive index layer.

9. The optical film of claim 1, wherein
the high refractive index layer comprises a fluorine type or silicone type levelling agent.

10. The optical film of claim 1, further comprising:
an intermediate refractive index layer having a refractive index higher than that of the antiglare layer and lower than that of the high refractive index layer, provided between the antiglare layer and the high refractive index layer.

11. The optical film of claim 10, wherein
the intermediate refractive index layer contains fine particles of an oxide of at least one metal selected from Si, Al, Ti, Zr, Sb, Zn, Sn, and In.

12. The optical film of claim 11, wherein
the fine particles of the oxide of at least one metal are contained in an amount of 30 mass % or more based on a total solid content of the intermediate refractive index layer.

13. The optical film of claim 10, wherein
the intermediate refractive index layer comprises a fluorine type or silicone type levelling agent.

14. A polarizing plate comprising:
a polarizing film; and
a pair of protective films provided on the both sides of the polarizing film,
wherein
at least one of the pair of the protective films is the optical film of claim 1.

15. An image display apparatus comprising:
the polarizing plate of claim 14 on an outermost surface of the display.

16. An image display apparatus comprising:
the optical film of claim 1 on an outermost surface of the display.

\* \* \* \* \*